(12) United States Patent
Wang et al.

(10) Patent No.: US 12,421,392 B2
(45) Date of Patent: Sep. 23, 2025

(54) IONIC POLYMERS AND COPOLYMERS

(71) Applicant: Twelve Benefit Corporation, Berkeley, CA (US)

(72) Inventors: Lihui Wang, Berkeley, CA (US); Ziyang Huo, Moraga, CA (US); Chengtian Shen, Irvine, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 822 days.

(21) Appl. No.: 17/451,628

(22) Filed: Oct. 20, 2021

(65) Prior Publication Data

US 2022/0119641 A1 Apr. 21, 2022

Related U.S. Application Data

(60) Provisional application No. 63/093,791, filed on Oct. 20, 2020.

(51) Int. Cl.
*C08G 10/00* (2006.01)
*C08G 61/02* (2006.01)
(Continued)

(52) U.S. Cl.
CPC ............ *C08L 101/02* (2013.01); *C08G 10/00* (2013.01); *C08G 61/02* (2013.01); *C25B 9/23* (2021.01);
(Continued)

(58) Field of Classification Search
None
See application file for complete search history.

(56) References Cited

U.S. PATENT DOCUMENTS

| 4,042,496 | A | 8/1977 | Tsushima et al. |
| 4,089,758 | A | 5/1978 | McAloon |

(Continued)

FOREIGN PATENT DOCUMENTS

| CA | 1071143 A | 2/1980 |
| CA | 2960595 A1 | 3/2016 |

(Continued)

OTHER PUBLICATIONS

AE Search Report and Examination Report dated Jun. 20, 2024 in AE Application No. P6000880 /2021.
(Continued)

*Primary Examiner* — David J Buttner
(74) *Attorney, Agent, or Firm* — Weaver Austin Villeneuve & Sampson LLP

(57) ABSTRACT

The present disclosure relates to compositions including a first polymeric structure having a structure of Formula (I), (II), (III), (IV), or (V):

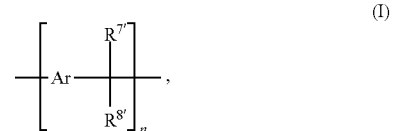

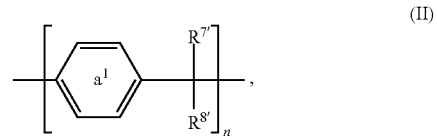

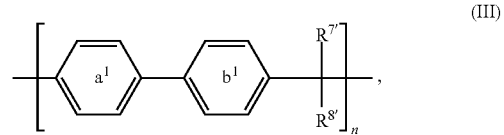

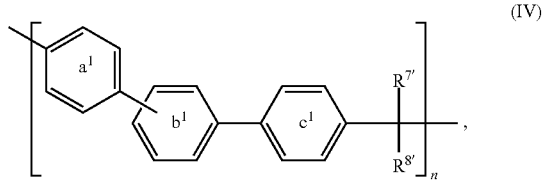

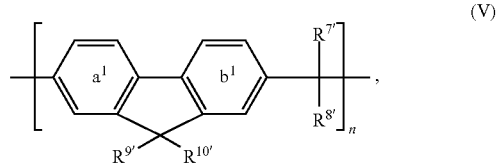

or a salt thereof, and a second polymeric structure having a structure of Formula (X) or Formula (XI):

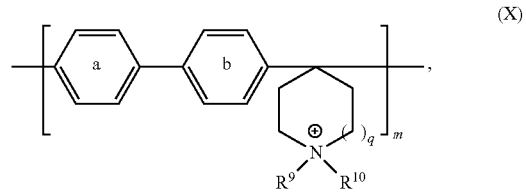

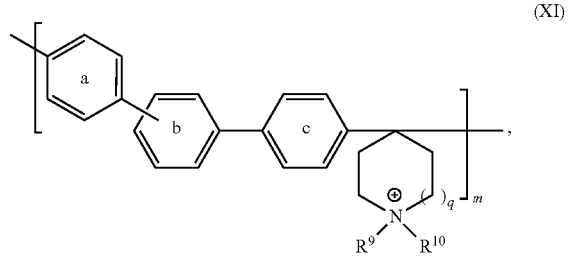

or a salt thereof, in which at least one of these can include an ionizable moiety or an ionic moiety, for use in an
(Continued)

electrochemical cell. Materials, devices, and methods using such compositions are also described.

21 Claims, No Drawings

(51) Int. Cl.
*C08L 101/02* (2006.01)
*C25B 9/23* (2021.01)
*C25B 13/08* (2006.01)
*H01M 8/10* (2016.01)
*H01M 8/103* (2016.01)
*H01M 8/1039* (2016.01)

(52) U.S. Cl.
CPC ........ *C25B 13/08* (2013.01); *C08G 2261/143* (2013.01); *C08G 2261/146* (2013.01); *C08G 2261/312* (2013.01); *C08G 2261/3142* (2013.01); *C08G 2261/45* (2013.01); *C08G 2261/516* (2013.01); *H01M 8/103* (2013.01); *H01M 8/1039* (2013.01); *H01M 2008/1095* (2013.01)

(56) References Cited

U.S. PATENT DOCUMENTS

| | | | |
|---|---|---|---|
| 4,116,889 A | 9/1978 | Chlanda et al. |
| 4,176,215 A | 11/1979 | Molnar et al. |
| 4,253,900 A | 3/1981 | Dege et al. |
| 4,355,116 A | 10/1982 | Lee et al. |
| 4,609,440 A | 9/1986 | Frese, Jr. et al. |
| 4,655,886 A | 4/1987 | Oda et al. |
| 4,766,161 A | 8/1988 | Chlanda et al. |
| 4,828,941 A | 5/1989 | Sterzel |
| 4,921,586 A | 5/1990 | Molter |
| 5,039,389 A | 8/1991 | McMichael |
| 5,601,937 A | 2/1997 | Isenberg |
| 5,992,008 A | 11/1999 | Kindler |
| 6,358,651 B1 | 3/2002 | Chen et al. |
| 7,605,293 B2 | 10/2009 | Olah et al. |
| 7,608,356 B2 | 10/2009 | Risen, Jr. et al. |
| 7,704,369 B2 | 4/2010 | Olah et al. |
| 7,883,817 B2 | 2/2011 | Hori et al. |
| 8,131,859 B2 | 3/2012 | Fujii et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,652,104 B2 | 2/2014 | Goral et al. |
| 8,652,704 B2 | 2/2014 | Sano et al. |
| 8,658,016 B2 | 2/2014 | Lakkaraju et al. |
| 8,721,866 B2 | 5/2014 | Sivasankar et al. |
| 8,845,875 B2 | 9/2014 | Teamey et al. |
| 8,845,878 B2 | 9/2014 | Cole et al. |
| 8,956,990 B2 | 2/2015 | Masel et al. |
| 9,012,345 B2 | 4/2015 | Masel et al. |
| 9,145,615 B2 | 9/2015 | Zhai et al. |
| 9,181,625 B2 | 11/2015 | Masel et al. |
| 9,193,593 B2 | 11/2015 | Masel et al. |
| 9,370,773 B2 | 6/2016 | Masel et al. |
| 9,464,359 B2 | 10/2016 | Masel et al. |
| 9,481,939 B2 | 11/2016 | Masel et al. |
| 9,555,367 B2 | 1/2017 | Masel et al. |
| 9,566,574 B2 | 2/2017 | Masel et al. |
| 9,580,824 B2 | 2/2017 | Masel et al. |
| 10,435,504 B2 | 10/2019 | Bae et al. |
| 10,648,091 B2 | 5/2020 | Kuhl et al. |
| 10,822,709 B2 | 11/2020 | Kuhl et al. |
| 10,975,480 B2 | 4/2021 | Masel |
| 10,975,481 B2 | 4/2021 | Guo et al. |
| 11,124,886 B2 | 9/2021 | Kuhl et al. |
| 11,299,810 B2 | 4/2022 | Suchsland et al. |
| 11,512,403 B2 | 11/2022 | Kuhl et al. |
| 11,578,415 B2 | 2/2023 | Cave et al. |
| 11,680,327 B2 | 6/2023 | Kuhl et al. |
| 11,680,328 B2 | 6/2023 | Huo et al. |
| 12,043,912 B2 | 7/2024 | Cave et al. |
| 2003/0059658 A1 | 3/2003 | Kohler et al. |
| 2004/0028992 A1 | 2/2004 | Jaouen |
| 2005/0147859 A1 | 7/2005 | Kiefer et al. |
| 2005/0239912 A1 | 10/2005 | Arcella et al. |
| 2006/0016685 A1 | 1/2006 | Hawkins et al. |
| 2008/0283411 A1 | 11/2008 | Eastman et al. |
| 2008/0318093 A1 | 12/2008 | Lee et al. |
| 2009/0004528 A1* | 1/2009 | Fritsch ............... H01M 8/1025 429/494 |
| 2009/0014336 A1 | 1/2009 | Olah et al. |
| 2009/0117436 A1 | 5/2009 | Choi et al. |
| 2009/0155102 A1 | 6/2009 | Park et al. |
| 2010/0028736 A1 | 2/2010 | Unlu et al. |
| 2010/0137457 A1 | 6/2010 | Kaplan |
| 2010/0159347 A1 | 6/2010 | Choi et al. |
| 2010/0273087 A1 | 10/2010 | Choi et al. |
| 2010/0324256 A1 | 12/2010 | Ooms et al. |
| 2011/0166241 A1 | 7/2011 | Choi et al. |
| 2012/0171583 A1 | 7/2012 | Bocarsly et al. |
| 2012/0252091 A1 | 10/2012 | Rasmussen et al. |
| 2012/0328942 A1 | 12/2012 | Thomas-Alyea et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0027303 A1 | 1/2014 | Cole et al. |
| 2014/0034506 A1 | 2/2014 | Teamey et al. |
| 2014/0093799 A1 | 4/2014 | Masel et al. |
| 2014/0151240 A1 | 6/2014 | Bedell et al. |
| 2014/0202875 A1 | 7/2014 | Mofakhami |
| 2014/0206894 A1 | 7/2014 | Cole et al. |
| 2014/0206896 A1 | 7/2014 | Sivasankar et al. |
| 2014/0287347 A1 | 9/2014 | Vincent et al. |
| 2015/0010804 A1 | 1/2015 | Laramie et al. |
| 2015/0030888 A1 | 1/2015 | Popat et al. |
| 2015/0064602 A1 | 3/2015 | Lee et al. |
| 2015/0232999 A1 | 8/2015 | Busskamp et al. |
| 2015/0329979 A1 | 11/2015 | Reytier et al. |
| 2016/0107154 A1 | 4/2016 | Masel et al. |
| 2016/0161869 A1 | 6/2016 | Avneri et al. |
| 2017/0037522 A1 | 2/2017 | Kaczur et al. |
| 2017/0113182 A1 | 4/2017 | Voskian et al. |
| 2017/0183789 A1 | 6/2017 | Matthews et al. |
| 2017/0259206 A1 | 9/2017 | Masel et al. |
| 2017/0321333 A1 | 11/2017 | Kuhl et al. |
| 2017/0321334 A1 | 11/2017 | Kuhl et al. |
| 2017/0327655 A1 | 11/2017 | Choi et al. |
| 2017/0328239 A1 | 11/2017 | Fleischer et al. |
| 2017/0355811 A1 | 12/2017 | Bae et al. |
| 2018/0057950 A1 | 3/2018 | Co et al. |
| 2018/0086985 A1 | 3/2018 | Von Olshausen et al. |
| 2018/0111083 A1 | 4/2018 | Masel |
| 2018/0194632 A1 | 7/2018 | Jakobsson et al. |
| 2018/0257057 A1 | 9/2018 | Motoshige et al. |
| 2018/0264429 A1 | 9/2018 | Sugano et al. |
| 2018/0265440 A1 | 9/2018 | Kudo et al. |
| 2018/0274109 A1 | 9/2018 | Kudo et al. |
| 2019/0032228 A1 | 1/2019 | Krause et al. |
| 2019/0036143 A1 | 1/2019 | Yan et al. |
| 2019/0062931 A1 | 2/2019 | Stark et al. |
| 2019/0093241 A1 | 3/2019 | Baldauf et al. |
| 2019/0127865 A1 | 5/2019 | Li et al. |
| 2019/0134570 A1 | 5/2019 | Pintauro et al. |
| 2019/0226103 A1 | 7/2019 | Kuhl et al. |
| 2019/0233350 A1 | 8/2019 | Sankaranarayanan et al. |
| 2019/0359894 A1 | 11/2019 | Heidel et al. |
| 2020/0080211 A1 | 3/2020 | Schmid et al. |
| 2020/0095124 A1 | 3/2020 | Rueger |
| 2020/0240023 A1 | 7/2020 | Cave et al. |
| 2020/0308341 A1* | 10/2020 | Yan ..................... C08G 10/00 |
| 2020/0308718 A1 | 10/2020 | Patru et al. |
| 2020/0358120 A1* | 11/2020 | Park ................... H01M 8/1065 |
| 2020/0376479 A1 | 12/2020 | Masel |
| 2021/0002775 A1 | 1/2021 | Matsumoto et al. |
| 2021/0047743 A1 | 2/2021 | Goetheer et al. |
| 2021/0164116 A1 | 6/2021 | Kuhl et al. |
| 2021/0207275 A1 | 7/2021 | Huo et al. |

(56) References Cited

U.S. PATENT DOCUMENTS

| | | |
|---|---|---|
| 2021/0299608 A1 | 9/2021 | Liu et al. |
| 2021/0381116 A1 | 12/2021 | Kashi et al. |
| 2021/0387139 A1 | 12/2021 | Voskian et al. |
| 2021/0395908 A1 | 12/2021 | Kuhl et al. |
| 2022/0119636 A1 | 4/2022 | Wang et al. |
| 2022/0136119 A1 | 5/2022 | Flanders et al. |
| 2022/0153656 A1 | 5/2022 | Flanders et al. |
| 2023/0136397 A1 | 5/2023 | Cave et al. |
| 2023/0175088 A1 | 6/2023 | Cintron et al. |
| 2023/0175146 A1 | 6/2023 | Kashi et al. |
| 2023/0202840 A1 | 6/2023 | Flanders et al. |
| 2023/0265568 A1 | 8/2023 | Kuhl et al. |
| 2023/0415104 A1 | 12/2023 | Huo et al. |
| 2024/0133058 A1 | 4/2024 | Huo et al. |
| 2024/0327999 A1 | 10/2024 | Cave et al. |
| 2024/0417510 A1 | 12/2024 | Huo et al. |

FOREIGN PATENT DOCUMENTS

| | | |
|---|---|---|
| CN | 101981744 A | 2/2011 |
| CN | 102308028 A | 1/2012 |
| CN | 102576902 A | 7/2012 |
| CN | 102912374 A | 2/2013 |
| CN | 102978653 A | 3/2013 |
| CN | 104619886 A | 5/2015 |
| CN | 104919088 A | 9/2015 |
| CN | 106148992 A | 11/2016 |
| CN | 106463743 A | 2/2017 |
| CN | 106715760 A | 5/2017 |
| CN | 107735512 A | 2/2018 |
| CN | 109921060 A | 6/2019 |
| DE | 102015201132 A1 | 7/2016 |
| DE | 102015214592 A1 | 2/2017 |
| DE | 102016207420 A1 | 10/2017 |
| EP | 3378968 A1 | 9/2018 |
| EP | 3434810 A1 | 1/2019 |
| EP | 3626861 A1 | 3/2020 |
| EP | 3670700 A1 | 6/2020 |
| EP | 4166586 A1 | 4/2023 |
| GB | 1269841 A | 4/1972 |
| JP | H01502673 A | 9/1989 |
| JP | H02166128 A | 6/1990 |
| JP | H04228591 A | 8/1992 |
| JP | H0625444 A | 2/1994 |
| JP | H06145379 A | 5/1994 |
| JP | 2000251906 A | 9/2000 |
| JP | 2002306975 A | 10/2002 |
| JP | 2002352810 A | 12/2002 |
| JP | 2009540130 A | 11/2009 |
| JP | 2010526214 A | 7/2010 |
| JP | 2014022249 A | 2/2014 |
| JP | 2014504424 A | 2/2014 |
| JP | 2014194079 A | 10/2014 |
| JP | 2015054994 A | 3/2015 |
| JP | 2015056315 A | 3/2015 |
| JP | 2015513615 A | 5/2015 |
| JP | 2015513616 A | 5/2015 |
| JP | 2015533944 A | 11/2015 |
| JP | 2016538420 A | 12/2016 |
| JP | 2017048442 A | 3/2017 |
| JP | 2017053013 A | 3/2017 |
| JP | 2017527701 A | 9/2017 |
| JP | 2018003059 A | 1/2018 |
| JP | 2019515142 A | 6/2019 |
| JP | 2021059788 A | 4/2021 |
| KR | 100962903 B1 | 6/2010 |
| WO | WO-2007041872 A1 | 4/2007 |
| WO | WO-2008124538 A1 | 10/2008 |
| WO | WO-2011108546 A1 | 9/2011 |
| WO | WO-2011136296 A1 | 11/2011 |
| WO | WO-2012006240 A1 | 1/2012 |
| WO | WO-2013006710 A2 | 1/2013 |
| WO | WO-2013016447 A2 | 1/2013 |
| WO | WO-2014018091 A1 | 1/2014 |
| WO | WO-2014032000 A1 | 2/2014 |
| WO | WO-2014042781 A2 | 3/2014 |
| WO | WO-2014043651 A2 | 3/2014 |
| WO | WO-2014046797 A2 | 3/2014 |
| WO | WO-2014154253 A1 | 10/2014 |
| WO | WO-2014160529 A1 | 10/2014 |
| WO | WO-2015035521 A1 | 3/2015 |
| WO | WO-2015184388 A1 | 12/2015 |
| WO | WO-2016039999 A1 | 3/2016 |
| WO | WO-2016064440 A1 | 4/2016 |
| WO | WO2016/081432 * | 5/2016 |
| WO | WO-2017014635 A1 | 1/2017 |
| WO | WO-2017021083 A1 | 2/2017 |
| WO | WO-2017144395 A1 | 8/2017 |
| WO | WO-2017169682 A1 | 10/2017 |
| WO | WO-2017171115 A1 | 10/2017 |
| WO | WO-2017176306 A1 | 10/2017 |
| WO | WO-2018001637 A1 | 1/2018 |
| WO | WO-2019020239 A1 | 1/2019 |
| WO | WO-2019051609 A1 | 3/2019 |
| WO | WO-2019136018 A2 | 7/2019 |
| WO | WO-2020057998 A1 | 3/2020 |
| WO | WO-2020112919 A1 | 6/2020 |
| WO | WO-2020245070 A1 | 12/2020 |
| WO | WO-2021108446 A1 | 6/2021 |
| WO | WO-2021252535 A2 | 12/2021 |
| WO | WO-2022031726 A2 | 2/2022 |

OTHER PUBLICATIONS

Aeshala, L.M. et al., "Effect of Cationic and Anionic Solid Polymer Electrolyte on Direct Electrochemical Reduction of Gaseous $CO_2$ to Fuel", Journal of $CO_2$ Utilization, Dec. 1, 2013, vol. 3-4, pp. 49-55.

BR Office Action dated Aug. 15, 2023, in Application No. BR1120210103686 with English translation.

CA Office Action dated Feb. 28, 2024 in CA Application No. 3120748.

CA Office Action dated Jan. 9, 2023 in Application No. CA20173022812.

CA Office Action dated Jun. 21, 2023, in Application No. CA20173124239.

CA Office Action dated May 3, 2022 in Application No. CA20173124239.

CN Office Action dated Feb. 7, 2022, in Application No. CN2017800357468.

CN Office Action dated Jul. 5, 2022 in Application No. CN20178035746 With English translation.

CN Office Action dated Jun. 27, 2024 in CN Application No. 201980086718.8 with English translation.

EP office action dated May 23, 2023, in application No. EP21152137.2.

Extended European search report dated May 27, 2022, in Application No. EP21181985.9.

IN Office Action dated Feb. 2, 2022 in Application No. IN202118009885.

IN Office Action dated Feb. 7, 2022 in Application No. IN202118007175.

IN Office Action dated Jan. 31, 2023 in Application No. IN202117028812.

International Preliminary Report on Patentability dated Jun. 10, 2021 in Application No. PCT/US2019/063471.

International Search Report and Written Opinion issued on Mar. 19, 2020, in PCT Application No. PCT/US2019/063471.

JP Office Action dated Dec. 5, 2023 in JP Application No. 2021-528976 with English translation.

JP Office Action dated Dec. 7, 2021 in JP Application No. JP2020-213422 with English translation.

JP Office Action dated Feb. 6, 2024 in JP Application No. 2022-187975, with English Translation.

JP Office Action dated Sep. 5, 2023, in Application No. JP2021-528976 with English translation.

Kortlever R., et al., "Catalysts and Reaction Pathways for the Electrochemical Reduction of Carbon Dioxide," The Journal of Physical Chemistry Letters, 2015, vol. 6(20), pp. 4073-4082.

(56) References Cited

OTHER PUBLICATIONS

Lobato, J. et al., "Study of the influence of the amount of PBI-H3PO4 in the catalytic layer of a high temperature PEMFC", International Journal of Hydrogen Energy, 2010, vol. 35, pp. 1347-1355.
Maheswari, S. et al., "Oxygen Reduction Catalysts for Alkaline Polymer Electrolyte Fuel Cells", ECS Transactions, 2010, vol. 33, No. 1, pp. 1795-1807.
Notice of Allowance dated Aug. 16, 2021, in U.S. Appl. No. 16/842,659.
Pickup, P. et al., "Electronically Conducting Cation-exchange Polymer Powders: Synthesis, Characterization and Applications in PEM Fuel Cells and Supercapacitors", Journal of New Materials for Electrochemical Systems, 2000, vol. 3. pp. 21-26.
SA Examination Report dated Aug. 8, 2023, in Application No. 521422124 with English Translation.
SA Examination Report dated Feb. 6, 2024, in SA Application No. 521422124, with English Translation.
SA Office Action dated Sep. 16, 2024 in SA Application No. 524452150 with English translation.
Shironita S., et al., "Methanol Generation by Co2 Reduction at a Pt-ru/c Electrocatalyst Using a Membrane Electrode Assembly," Journal of Power Sources, Oct. 2013, vol. 240(15), pp. 404-410.
U.S. Corrected Notice of Allowance dated Jan. 9, 2023 in U.S. Appl. No. 16/697,066.
U.S. Corrected Notice of Allowance dated Mar. 19, 2024 in U.S. Appl. No. 18/145,702.
U.S. Final Office Action dated Jul. 17, 2024 in U.S. Appl. No. 17/303,329.
U.S. Final Office Action dated Jul. 18, 2024 in U.S. Appl. No. 18/306,928.
U.S. Final Office Action dated Sep. 10, 2024 in U.S. Appl. No. 18/299,672.
U.S. Non Final Office Action dated Feb. 23, 2022 in U.S. Appl. No. 16/697,066.
U.S. Non-Final office Action dated Jan. 20, 2023 in U.S. Appl. No. 16/949,538.
U.S. Non-Final Office Action dated Jan. 22, 2024 in U.S. Appl. No. 17/369,952.
U.S. Non-Final Office Action dated Jan. 23, 2024 in U.S. Appl. No. 18/299,672.
U.S. Non-Final Office Action dated Jul. 5, 2024 in U.S. Appl. No. 17/369,952.
U.S. Non-Final Office Action dated Nov. 8, 2023 in U.S. Appl. No. 18/145,702.
U.S. Non-Final Office Action dated Sep. 25, 2024 in U.S. Appl. No. 18/324,929.
U.S. Notice of Allowance dated Mar. 6, 2024 in U.S. Appl. No. 18/145,702.
U.S. Notice of Allowance dated Mar. 8, 2023 in U.S. Appl. No. 16/949,538.
U.S. Notice of Allowance dated May 22, 2023 in U.S. Appl. No. 16/949,538.
U.S. Notice of Allowance dated May 24, 2024 in U.S. Appl. No. 17/451,630.
U.S. Notice of Allowance dated Sep. 29, 2022 in U.S. Appl. No. 16/697,066.
U.S. Appl. No. 17/030,172, inventors Kuhl et al., filed Sep. 23, 2020.
U.S. Appl. No. 18/735,025, inventors Huo Z, et al., filed Jun. 5, 2024.
U.S. Appl. No. 62/939,960, inventors Huo, et al., filed Nov. 25, 2019.
U.S. Appl. No. 63/060,583, inventors Kuhl, et al., filed Aug. 3, 2020.
U.S. Restriction Requirement dated Oct. 29, 2021, in U.S. Appl. No. 16/697,066.
Adabi, et al., "High-performing Commercial Fe—N—C Cathode Electrocatalyst for Anion-exchange Membrane Fuel Cells," Nature Energy, 2021, pp. 1-10.
Aeshala, L.M. et al., "Effect of solid polymer electrolyte on electrochemical reduction of CO2, Separation and Purification Technology," 94, (2012), pp. 131-137.
AU Office Action dated Sep. 7, 2022, in Application No. AU2019210132.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Balster, J. et al., "Tailoring the Interface Layer of the Bipolar Membrane", Journal of Membrane Science, vol. 365, No. 1-2, Dec. 2010, pp. 389-398.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
BR Office Action dated Nov. 28, 2022, in Application No. BR1120200149381 with English translation.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
Chen, et al., "Poly(Alkyl-terphenyl Piperidinium) Ionomers and Membranes With an Outstanding Alkaline-membrane Fuel-cell Performance of 2.58 Wcm@2," Fuel Cells Hot Paper, 2021, vol. 60, pp. 7710-7718.
Chen, et al., "Poly(Fluorenyl Aryl Piperidinium) Membranes and Ionomers for Anion Exchange Membrane Fuel Cells," Nature Communications, 2021, vol. 12, pp. 1-12.
CN Office Action dated Jan. 4, 2023, in CN Application No. CN201980021305.1 with English translation.
Delacourt et al., "Design of an Electrochemical Cell Making Syngas (CO+H2) from CO2 and H2O Reduction at Room Temperature," Journal of the Electrochemical Society, 155 (1), (2008), pp. B42-B49.
Digdaya, et al., "A Direct Coupled Electrochemical System for Capture and Conversion of Co2 From Oceanwater," Nature Communications, 2020, vol. 11, pp. 1-10.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
EP search report dated Sep. 14, 2021, in application No. EP19741371.9.
Fan, et al., "Poly(Bis-arylimidazoliums) Possessing High Hydroxide Ion Exchange Capacity and High Alkaline Stability," Nature Communications, 2019, vol. 10, pp. 1-10.
Ge, et al., "Oxygen Reduction in Alkaline Media: From Mechanisms to Recent Advances of Catalysts," ACS Catalysis, 2015, vol. 5, pp. 1-97.
Gerhardt, et al., "Along-the-channel Impacts ofwater Management and Carbon-dioxide Contamination in Hydroxide-exchange-membrane Fuel Cells: a Modeling Study," Journal of the Electrochemical Society, 2019, vol. 166(7), pp. F3180-F3192.
Gu, et al., "Electrochemical Energy Engineering: a New Frontier of Chemical Engineering Innovation," Annual Review of Chemical and Biomolecular Engineering, 2014, vol. 5, pp. 429-454.
Gurkan, B., et al., "Quinone Reduction in Ionic Liquids for Electrochemical CO 2 Separation," ACS Sustainable Chemistry & Engineering, Jun. 5, 2015, vol. 3(7), pp. 1394-1405.
Hao, J.H. et al., "Preparation of Solvent-resistant Anion-exchange Membranes", Desalination, Jun. 2000, vol. 129, No. 1, pp. 15-22.
Hassan, N., et al., "Achieving High-Performance and 2000 h Stability in Anion Exchange Membrane Fuel Cells by Manipulating Ionomer Properties and Electrode Optimization," Advanced Energy Materials, 2020, pp. 1-8.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.

(56) References Cited

OTHER PUBLICATIONS

Huang, et al., "Composite Poly(Norbornene) Anion Conducting Membranes for Achieving Durability, water Management and High Power 3.4 W/cm2) in Hydrogen/oxygen Alkaline Fuel Cells," Journal of the Electrochemical Society, 2019, vol. 10, pp. F637-F644.
IN Office Action dated Feb. 16, 2022, in Application No. IN202037034886.
Inaba, et al., "Effects of Carbon Dioxide on the Performance of Anion-exchange Membrane Fuel Cells," Electrochemistry, 2011, vol. 79(5), pp. 322-325.
International Preliminary Report on Patentability and Written opinion dated Jun. 9, 2022 in Application No. PCT/US2020/062080.
International Search Report and Written Opinion dated Feb. 23, 2022, in Application No. PCT/US2021/55902.
International Preliminary Report on Patentability dated Feb. 16, 2023 in PCT Application No. PCT/US2021/044378.
International Preliminary Report on Patentability dated May 4, 2023, in Application No. PCT/US2021/055900.
International Preliminary Report on Patentability dated May 4, 2023, in Application No. PCT/US2021/055902.
International Search Report and Written Opinion dated Apr. 10, 2023 in PCT Application No. PCT/US2022/079335.
International Search Report and Written Opinion dated Apr. 30, 2019, for application No. PCT/US19/014586.
International Search Report and Written Opinion dated Feb. 24, 2022, in Application No. PCT/US2021/055900.
International Search Report and Written Opinion dated Feb. 28, 2022, in Application No. PCT/US2021/044378.
International Search Report and Written Opinion dated Mar. 7, 2023 in PCT Application No. PCT/US2022/081034.
International Search Report and Written Opinion dated Nov. 27, 2023 in PCT Application No. PCT/US2023/024184.
International Search Report and Written Opinion issued in PCT Application No. PCT/US2020/062080 on Mar. 16, 2021.
James, B.D., et al. 2017 DOE Hydrogen and Fuel Cells Program Review, Fuel Cell Systems Analysis, Strategic Analysis, Project IDI FC163, Jun. 8, 2017, 34 pages.
JP Office Action dated Jan. 4, 2023, in Application No. JP2020-561577 with English translation.
Kang, J S., et al., "Redox-responsive Sorbents and Mediators for Electrochemically Based $Co_2$ Capture," Current Opinion in Green and Sustainable Chemistry, Oct. 1, 2021, vol. 31, p. 100504.
Keith, et al., "A Process for Capturing Co2 From the Atmosphere," Cell Press, 2018, vol. 2, pp. 1573-1594.
Kim, C., et al., "Impact of Pulsed Electrochemical Reduction of CO2 on the formation of C2+ Products over Cu," ACS Catal., 2020, 10, 12403-12413.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Kriescher, Stefanie M.A. et al, "A membrane electrode assembly for the electrochemical synthesis of hydrocarbons from C02(g) and Ho2(g), Electrochemistry Communications," 50 (2015), pp. 64-68.
Kungas R., "Review—Electrochemical CO2 Reduction for CO Production: Comparison of Low- and High-Temperature Electrolysis Technologies," Journal of the Electrochemical Society, 2020, vol. 167, 044508, 12 Pages.
Li, et al., "Electrolysis of Co2 to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Liew, F. et al., "Gas Fermentation—A Flexible Platform for Commercial Scale Production of Low-Carbon-Fuels and Chemicals from Waste and Renewable Feedstocks", Frontiers in Microbiology, May 11, 2016, vol. 7, No. 694, pp. 1-28.
Liu, Y., et al., "Electrochemically Mediated Carbon Dioxide Separation with Quinone Chemistry in Salt-concentrated Aqueous Media," Nature Communications, May 8, 2020, vol. 11(1), pp. 1-11.
Lu, et al., "Halloysite-derived Nitrogen Doped Carbon Electrocatalysts for Anion Exchange Membrane Fuel Cells," Journal of Power Sources, 2017, vol. 372, pp. 82-90.
Matz, et al., "Demonstration of Electrochemically-driven Co2 Separation Using Hydroxide Exchange Membranes," Journal of the Electrochemical Society, 2021, vol. 168, pp. 1-12.
Muroyama, et al., "Review—CO2 Separation and Transport via Electrochemical Methods," Journal of the Electrochemical Society, 2020, vol. 167, pp. 1-13.
Office Action issued on Apr. 1, 2021, in U.S. Appl. No. 16/254,255.
Peng, et al., "Nitrogen-doped Carbon-coox Nanohybrids: a Precious Metal Free Cathode That Exceeds 1.0 Wcm@2 Peak Power and 100 H Life in Anion-Exchange Membrane Fuel Cells," Angewandte Chemie, 2019, vol. 58(4), pp. 1058-1063.
Peng, et al., "Using Operando Techniques to Understand and Design High Performance and Stable Alkaline Membrane Fuel Cells," Nature Communications, 2020, vol. 11, pp. 1-10.
Sharifian, et al., "Electrochemical Carbon Dioxide Capture to Close the Carbon Cycle," Energy & Environmental Science, 2021, vol. 14, pp. 781 814.
Sharma, et al., "Electrocatalytic conversion of carbon dioxide to fuels: a review on the interaction between CO2 and the liquid electrolyte," WIREs Energy Environ 2017, 6:e239. doi: 10.1002/wene.239, pp. 1-21.
Shi, et al., "Editors' Choice—uncovering the Role of Alkaline Pretreatment for Hydroxide Exchange Membrane Fuel Cells," Journal of the Electrochemical Society, 2020, vol. 167, pp. 1-10.
Shi, L. et al., "A shorted membrane electrochemical cell powered by hydrogen to remove $CO_2$ from the air feed of hydroxide exchange membrane fuel cells", Nature Energy, Mar. 2022, vol. 7, 36 pages.
Shi, X., et al., "Sorbents for the Direct Capture of Co2 From Ambient Air," Angewandte Chemie, 2020, vol. 59(18), pp. 1-25.
Shu, Q., et al., "Electrochemical Regeneration of Spent Alkaline Absorbent from Direct Air Capture," Environmental science & technology, 2020, vol. 54(14), pp. 8990-8998.
Spets et al. "Direct Glucose Fuel Cell With Anion Exchange Membrane in the Near Neutral State Electrolyte, International Journal of Electrochemical Science," 7, 11696-11705, Dec. 1, 2012, entire document, http.electrochemsci .org/papers/vol? /71211696 .pdf.
Srinivasan, S. et al., "Advances in Solid Polymer Electrolyte Fuel Cell Technology with Low Platinum Loading Electrodes," Journal of Power Sources, 22 (1988) pp. 359-375.
U.S. Notice of Allowance dated Sep. 1, 2022 in U.S. Appl. No. 16/254,255.
U.S. Final Office Action dated Apr. 24, 2024 in U.S. Appl. No. 18/324,929.
U.S. Final Office Action dated Mar. 21, 2024 in U.S. Appl. No. 18/300,380.
U.S. Final office Action dated Nov. 21, 2022 in U.S. Appl. No. 17/247,036.
U.S. Non-Final office Action dated Jan. 20, 2023 in U.S. Appl. No. 17/452,395.
U.S. Non-Final Office Action dated Dec. 11, 2023 in U.S. Appl. No. 17/451,630.
U.S. Non-Final Office Action dated Jan. 19, 2024 in U.S. Appl. No. 17/303,329.
U.S. Non-Final Office Action dated Jan. 19, 2024 in U.S. Appl. No. 18/306,928.
U.S. Non-Final Office Action dated May 24, 2022 in U.S. Appl. No. 17/247,036.
U.S. Non-Final Office Action dated Nov. 15, 2023 in U.S. Appl. No. 18/324,929.
US Non-Final Office Action dated Oct. 22, 2021, in U.S. Appl. No. 16/254,255.
U.S. Notice of Allowance dated Apr. 4, 2024 in U.S. Appl. No. 17/451,630.
U.S. Notice of Allowance dated Feb. 10, 2023 in U.S. Appl. No. 17/247,036.

(56) References Cited

OTHER PUBLICATIONS

U.S. Notice of Allowance dated Mar. 2, 2023 in U.S. Appl. No. 17/247,036.
U.S. Appl. No. 18/051,944, inventors Kuhl et al., filed Nov. 2, 2022.
U.S. Appl. No. 18/300,380, inventors Ziyang Huo et al., filed Apr. 13, 2023.
U.S Restriction requirement dated Aug. 1, 2023 in U.S. Appl. No. 18/324,929.
U.S. Restriction Requirement dated Dec. 15, 2022 in U.S. Appl. No. 17/452,395.
U.S. Restriction requirement dated Jul. 28, 2023, in U.S. Appl. No. 17/451,630.
U.S. Restriction requirement dated Jun. 23, 2023, in U.S. Appl. No. 17/444,356.
Van Bavel, S., et al., "Integrating $CO_2$ Electrolysis into the Gas-to-Liquids-Power-to-Liquids Process," ACS Energy Letters, Jul. 24, 2020, vol. 5(8), pp. 2597-2601.
Verma, et al., "The effect of electrolyte composition on the electroreduction of CO2 to CO on Ag based gas diffusion electrodes," Phys. Chem. Chem. Phys., 2016, 18, pp. 7075-7084.
Voskian, S. et al., "Faradaic electro-swing reactive adsorption for $CO_2$ capture", Energy & Environmental Science, 2019, vol. 12, pp. 3530-3547.
Wallace, G G., et al., "Manipulating and Monitoring Biomolecular Interactions with Conducting Electroactive Polymers," Advanced Materials, VCH Publishers, DE, Jul. 4, 2002, vol. 14(13-14), pp. 953-960.
Wang, et al., "Approaches for the preparation of non-linear amphiphilic polymers and their applications to drug delivery", Advanced Drug Delivery Reviews, 2012, vol. 64, pp. 852-865.
Wang, L., et al., "A High Conductivity Ultrathin Anion-exchange Membrane With 500+ H Alkali Stability for Use in Alkaline Membrane Fuel Cells That Can Achieve 2 W $Cm^{-2}$ at 80 $^{\circ}C$," Journal of Materials Chemistry A, 2018, vol. 6, pp. 15404-15412.
Wang, L., "Radiation-grafted anion-exchange membranes: the switch from low- to high-density polyethylene leads to remarkably enhanced fuel cell performance," Energy and Environmental Science, 2019, vol. 12, 1575-1579.
Wang, Y., et al., "Synergistic Mn—Co Catalyst Outperforms Pt on High-rate Oxygen Reduction for Alkaline Polymer Electrolyte Fuel Cells," Nature Communications, 2019, vol. 10(1), pp. 1-8.
Woo, J., et al., "Promoting Oxygen Reduction Reaction Activity of Fe—N/C Electrocatalysts by Silica-Coating-Mediated Synthesis for Anion-Exchange Membrane Fuel Cells," Chemistry of Materials, 2018, vol. 30, pp. 6684-6701.
Wurzbacher, J., et al., "Concurrent Separation of Co2 and H2o From Air by a Temperature-vacuum Swing Adsorption/desorption Cycle," Environmental science & technology, 2012, vol. 46(16), pp. 9191-9198.
Xia, Chuan, et al., "Continuous production of pure liquid fuel solutions via electrocatalytic CO2 reduction using solid electrolyte devices," Nature Energy, http://www.nature.com/natureenergy ; https://doi.org/10.1038/s41560-019-0451-x.
Xin, L., et al., Carbon Supported Ag Nanoparticles as High Performance Cathode Catalyst for H2/O2 anion exchange membrane fuel cell, Frontiers in Chemistry, 2013, vol. 1(16), pp. 1-5.
Xu, C. et al., Preparation of PVA-GA-CS/PVA-Fe—SA Bipolar Membrane and Its Application in Electro-generation of 2,2-dimethyl-3-hydroxypropionic Acid, Journal of Membrane Science, vol. 307, No. 2, Jan. 2008, pp. 218-224.
Xu, Y., et al., "Self-Cleaning CO2 Reduction Systems: Unsteady Electrochemical Forcing Enables Stability," ACS Energy Letters, 2021, 6, pp. 809-815.
Yang, B. et al., "Preparation of a Bipolar Membrane by Photografting Polymerization", Frontiers of Chemistry in China, vol. 3, No. 1, Jan. 2008, pp. 10-13.
Zhan, et al., "Multiarm Star Poly(epsilon-caprolactone) with Hyperbranched Polyamidoamine as Core Capable of Selective Accommodating Cationic or Anionic Guests", Chinese Journal of Polymer Science, 2015. vol. 33, No. 6, pp. 920-930.
Zhang, J., et al., "Recent Insights on Catalyst Layers for Anion Exchange Membrane Fuel Cells," Advanced Science, 2021, vol. 8(15), pp. 1-26.
Zheng, et al., "Hyperbranched polymers: advances from synthesis to applications", Chemical Society Reviews, 2015, vol. 44, pp. 4091-4130.
Zheng, et al., "Editors' Choice—power-generating Electrochemical Co2 Scrubbing From Air Enabling Practical Aemfc Application," Journal of the Electrochemical Society, 2012, vol. 168, pp. 1-8.
Zheng, Y., et al., Quantifying and Elucidating the Effect of Co2 On the Thermodynamics, Kinetics and Charge Transport of AEMFC, Energy and Environmental Science, 2019, vol. 12, pp. 1-14.
Zhu, Wenlei et al., "Monodisperse Au Nanoparticles for Selective Electrocatalytic Reduction of CO2 to CO.Journal of the American Chemical Society," 2013, 135, pp. 16833-16836.
Ahlfield J., et al., "PEM/AEM Junction Design for Bipolar Membrane Fuel Cells," Journal of the Electrochemical Society, 2017, vol. 164 (12), pp. F1165-F1171.
Australian Examination Report dated Oct. 22, 2024, in AU Application No. 2019386085.
BR Office Action and Search Report dated Sep. 11, 2024 in BR Application No. 112022010144-9, with English Translation.
EP Extended European Search report dated Oct. 22, 2024 in EP Application No. 21883835.7.
Galvan, V., et al., "Ionomer Significance in Alkaline Direct Methanol Fuel Cell to Achieve High Power with a Quarternized Poly(terphenylene) Membrane," ACS Applied Energy Materials, 2021, vol. 4(6), pp. 5858-5867.
International Preliminary Report on Patentability and Written Opinion dated Jan. 2, 2025 in PCT Application No. PCT/US2023/024184.
International Search Report and Written Opinion dated Dec. 3, 2024, (Applicant first notified on Nov. 28, 2024) for Application No. PCT/US2024/032344.
International Search Report and Written Opinion dated Jan. 31, 2025, (Applicant first notified on Jan. 27, 2025) for Application No. PCT/US2024/052879.
Invitation to Pay Additional Fees dated Oct. 11, 2024 (Applicant first notified on Oct. 7, 2024) for Application No. PCT/US2024/032344.
Jiang, T., et al., "Highly Stable Poly(P-quaterphenylene Alkylene)-based Anion Exchange Membranes," Journal of Membrane Science, 2022, vol. 647, pp. 1-12.
JP Office Action dated Jan. 28, 2025 in JP Application No. 2022-530995, with English Translation.
JP Office Action dated Oct. 29, 2024 in JP Application No. 2022-187975 with English translation.
KR Office Action dated Oct. 16, 2024 in KR Application No. 10-2021-7019873 with English Translation.
Li, D., et al., "Highly Quaternized Polystyrene Ionomers for High Performance Anion Exchange Membrane Water Electrolysers," Nature Energy, 2020, vol. 5, pp. 378-385.
U.S. Corrected Notice of Allowance dated Dec. 16, 2024 in U.S. Appl. No. 17/303,329.
U.S. Non-Final Office Action dated Oct. 31, 2024 in U.S. Appl. No. 18/300,380.
U.S. Notice of Allowance dated Jan. 15, 2025 in U.S. Appl. No. 18/299,672.
U.S. Notice of Allowance dated Nov. 14, 2024 in U.S. Appl. No. 17/303,329.
U.S. Appl. No. 18/926,864, inventors Shen C, et al., filed Oct. 25, 2024.
CN Office Action dated Feb. 13, 2025 in CN Application No. 201980086718.8, with English Translation.
U.S. Final Office Action dated Feb. 27, 2025 in U.S. Appl. No. 18/324,929.

* cited by examiner

IONIC POLYMERS AND COPOLYMERS

STATEMENT OF GOVERNMENT SUPPORT

This invention was made with government support under Award Number DE-SC0022514 awarded by the Department of Energy. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The present disclosure relates to compositions including a first polymeric structure and a second polymeric structure, in which at least one of these can include an ionizable moiety or an ionic moiety. Materials, devices, and methods using such compositions are also described.

BACKGROUND

One component of an electrochemical cell includes a polymer-based electrolyte membrane. The physical and chemical characteristics of the polymeric membrane can affect performance of such cells.

SUMMARY

The present disclosure relates to compositions including a first polymeric structure and a second polymeric structure, in which at least one of these includes an ionizable moiety or an ionic moiety. The composition can include a polymer, a copolymer, a polymeric blend, a block copolymer, or other polymer-based forms.

Accordingly, in a first aspect, the present disclosure encompasses a composition including a first structure, wherein:
(i) the first structure includes:

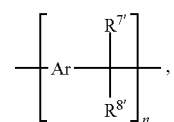
(I)

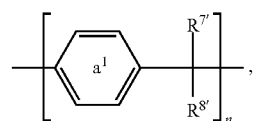
(II)

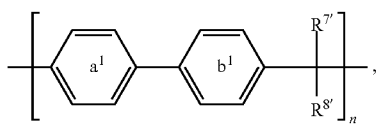
(III)

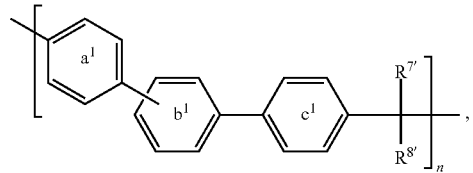
(IV)

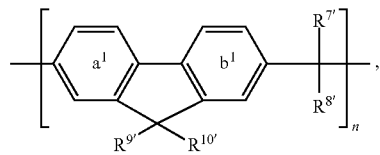
(V)

or a salt thereof, wherein:
each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ and $R^{8'}$ includes the electron-withdrawing moiety or wherein $R^{7'}$ and $R^{8'}$ can be taken together to form an optionally substituted cyclic group (e.g., which can optionally be substituted with an ionizable moiety or an ionic moiety);
each of $R^{9'}$ and $R^{10'}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^{9'}$ and $R^{10'}$ can be taken together to form an optionally substituted cyclic group (e.g., which can optionally be substituted with an ionizable moiety or an ionic moiety);
Ar includes or is an optionally substituted aromatic or optionally substituted arylene;
n is an integer of 1 or more;
each of ring $a^1$, ring $b^1$, and/or ring $c^1$ can be optionally substituted; and
wherein one or more of rings $a^1$-$c^1$, $R^{7'}$, $R^{8'}$, $R^{9'}$, and $R^{10'}$ can optionally include an ionizable moiety or an ionic moiety.

In a second aspect, the present disclosure encompasses a composition including a first structure and a second structure, wherein:
(i) the first structure includes:

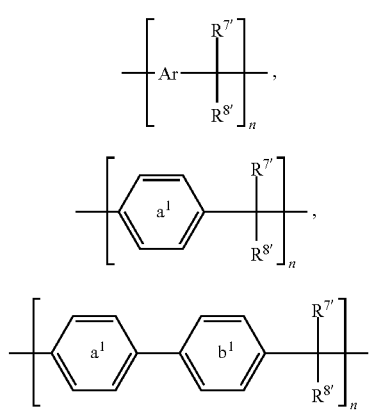

-continued

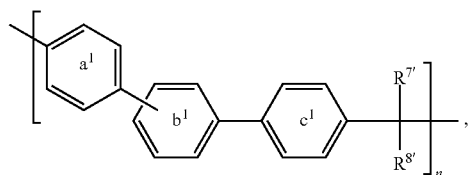
(IV)

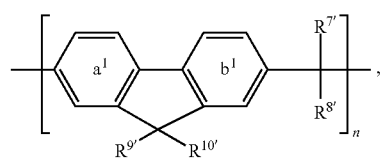
(V)

or a salt thereof, wherein:

each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ or $R^{8'}$ includes the electron-withdrawing moiety or wherein $R^{7'}$ and $R^{8'}$ can be taken together to form an optionally substituted cyclic group (e.g., which can optionally be substituted with an ionizable moiety or an ionic moiety);

each of $R^{9'}$ and $R^{10'}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^{9'}$ and $R^{10'}$ can be taken together to form an optionally substituted cyclic group (e.g., which can optionally be substituted with an ionizable moiety or an ionic moiety);

Ar includes or is an optionally substituted aromatic or optionally substituted arylene;

n is an integer of 1 or more;

each of ring $a^1$, ring $b^1$, and/or ring $c^1$ can be optionally substituted; and wherein one or more of rings $a^1$-$c^1$, $R^{7'}$, $R^{8'}$, $R^{9'}$, and $R^{10'}$ can optionally include an ionizable moiety or an ionic moiety; and (ii) the second structure includes an optionally substituted aromatic or an optionally substituted arylene.

In some embodiments (e.g., of (ii)), the second structure includes:

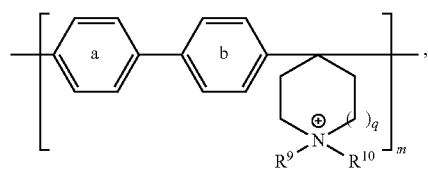
(X)

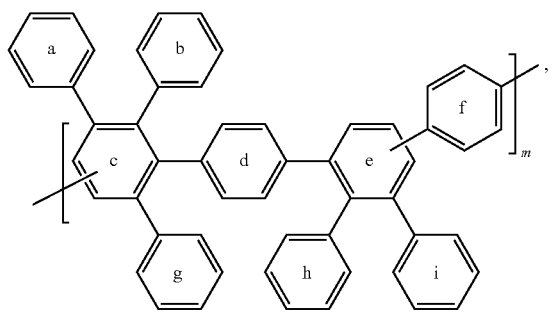
(XI)

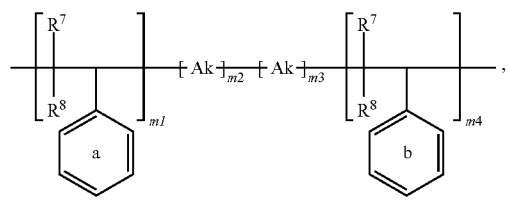
(XII)

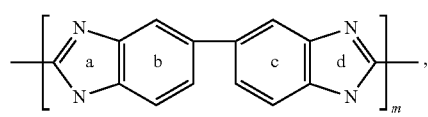
(XIV)

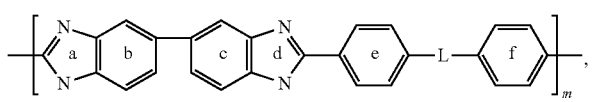
(XV)

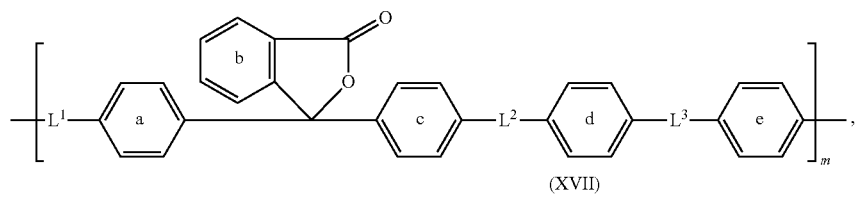
(XVI)

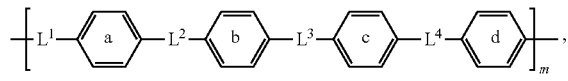
(XVII)

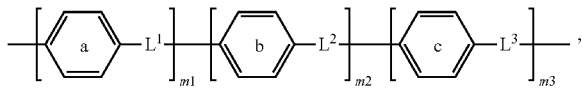
(XVIII)

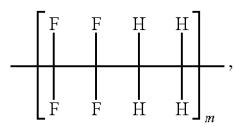  (XIX)
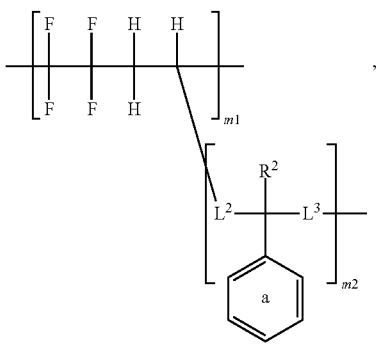  (XX)
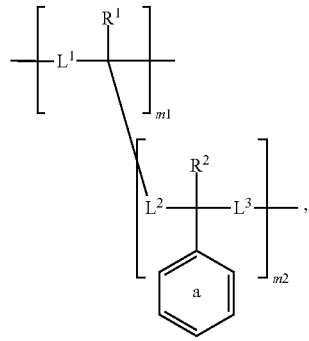  (XXI)
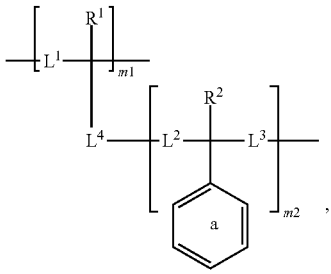  (XXII)
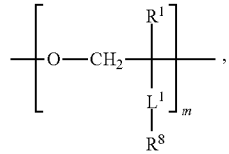  (XXIII)
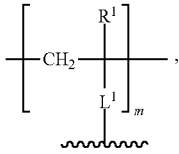  (XXXVI)
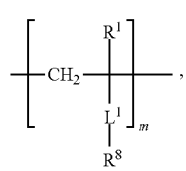  (XXV)
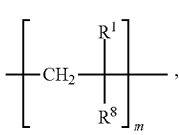  (XXVI)
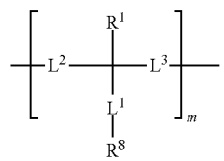  (XXVII)
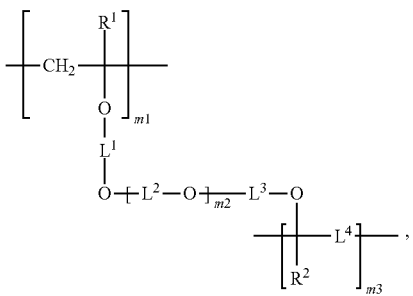  (XXVIII)
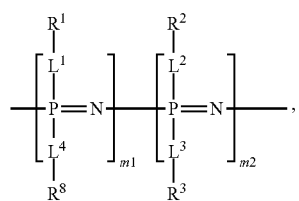  (XXIX)
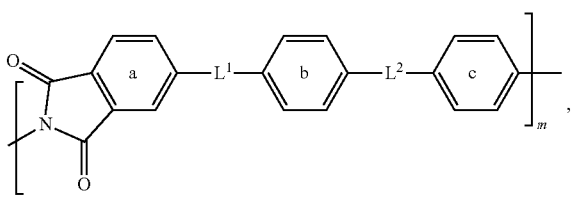  (XXX)

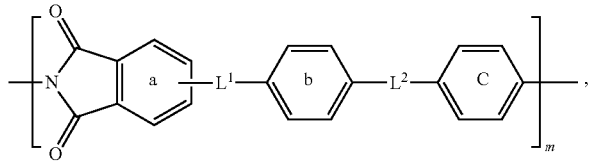

(XXXI)

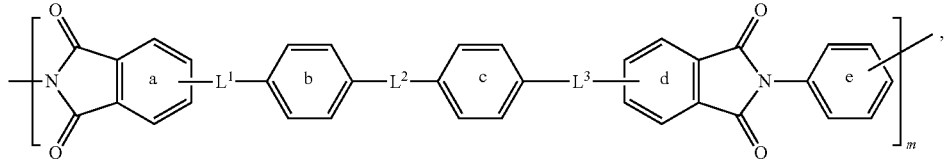

(XXXII)

or a salt thereof, wherein:
- each of $R^1$, $R^2$, $R^3$, $R^7$, $R^8$, $R^9$, and $R^{10}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^7$ and $R^8$ can be taken together to form an optionally substituted cyclic group (e.g., which can optionally be substituted with an ionizable moiety or an ionic moiety) or wherein $R^9$ and $R^{10}$ can be taken together to form an optionally substituted cyclic group (e.g., which can optionally be substituted with an ionizable moiety or an ionic moiety);
- each Ak includes or is an optionally substituted alkylene;
- each of L, $L^1$, $L^2$, $L^3$, and $L^4$ is, independently, a linking moiety;
- each of m, m1, m2, m3, and m4 is, independently, an integer of 1 or more;
- q is 0, 1, 2, or more;
- each of rings a-i can be optionally substituted; and
- wherein one or more of rings a-i, $R^7$, $R^8$, $R^9$, and $R^{10}$ can optionally include an ionizable moiety or an ionic moiety.

In any embodiment herein, the first structure includes an ionizable moiety or an ionic moiety. In particular embodiments, $R^{7'}$ is the electron-withdrawing moiety, and $R^{8'}$ includes the ionizable moiety or the ionic moiety.

In any embodiment herein, $R^{7'}$ and $R^{8'}$ can be taken together to form an optionally substituted cyclic group, or $R^{9'}$ and $R^{10'}$ can be taken together to form an optionally substituted cyclic group. In particular embodiments, the optionally substituted cyclic group can optionally be substituted with an ionizable moiety or an ionic moiety.

In any embodiment herein, the second structure includes an ionizable moiety or an ionic moiety. In yet other embodiments both of the first structure and second structure includes, independently, an ionizable moiety or an ionic moiety.

In any embodiment herein, at least one of rings a-i includes an ionizable moiety or an ionic moiety.

In any embodiment herein, $R^8$ includes an ionizable moiety or an ionic moiety.

In any embodiment herein, the linking moiety is or includes a covalent bond, —O—, —SO$_2$—, —NR$^{N1}$—, —C(O)—, optionally substituted aliphatic, optionally substituted alkylene, optionally substituted haloalkylene, optionally substituted hydroxyalkylene, optionally substituted alkyleneoxy, optionally substituted heteroaliphatic, optionally substituted heteroalkylene, optionally substituted aromatic, optionally substituted arylene, optionally substituted aryleneoxy, optionally substituted heterocycle, or optionally substituted heterocyclyldiyl.

In any embodiment herein, the electron-withdrawing moiety is an optionally substituted haloalkyl, cyano (CN), phosphate (e.g., —O(P=O)(OR$^{P1}$)(OR$^{P2}$) or —O—[P(=O)(OR$^{P1}$)—O]$_{P3}$—R$^{P2}$), sulfate (e.g., —O—S(=O)$_2$(OR$^{S1}$)), sulfonic acid (—SO$_3$H), sulfonyl (e.g., —SO$_2$CF$_3$), difluoroboranyl (—BF$_2$), borono (—B(OH)$_2$), thiocyanato (—SCN), or piperidinium.

In any embodiment herein, the ionizable moiety or the ionic moiety includes -$L^A$-$X^A$ or -$L^A$($L^{A'}$-$X^A$)$_{L2}$ or -$L^A$-($X^A$-$L^{A'}$-$X^{A'}$ or -$L^A$-$X^A$-$L^{A'}$-$X^{A'}$ or -$L^A$-$X^A$-$L^{A'}$-$X^{A'}$-$L^{A''}$- $X^{A''}$ wherein each $L^A$, $L^{A'}$, and $L^{A''}$- is a linking moiety; each $X^A$, $X^{A'}$, and $X^{A''}$ includes, independently, an acidic moiety, a basic moiety, or a multi-ionic moiety; and L2 is an integer of 1 or more. In some embodiments, each $L^A$, $L^{A'}$, and $L^{A''}$ includes, independently, an optionally substituted alkylene, optionally substituted alkyleneoxy, optionally substituted heteroalkylene, optionally substituted arylene, and/or optionally substituted aryleneoxy. In other embodiments, each $X^A$, $X^{A'}$, and $X^{A''}$ includes, independently, sulfo (—SO$_2$OH), sulfonate anion (—SO$_2$O$^-$), sulfonium cation (e.g., —SR$^{S1}$R$^{S2}$), carboxy (—CO$_2$H), carboxylate anion (—CO$_2^-$), phosphono (e.g., —P(=O)(OH)$_2$), phosphonate anion (e.g., —P(=O)(O$^-$)$_2$ or —P(=O)(OH)(O$^-$)), phosphonium cation (e.g., —P$^+$R$^{P1}$R$^{P2}$R$^{P3}$), phosphazenium cation (e.g., —P$^+$(=NR$^{N1}$R$^{N2}$)R$^{P1}$R$^{P2}$), amino (e.g., —NR$^{N1}$R$^{N2}$), ammonium cation (e.g., —N$^+$R$^{N1}$R$^{N2}$R$^{N3}$ or —N$^+$R$^{N1}$R$^{N2}$—), heterocyclic cation, piperidinium cation, azepanium cation, or a salt form thereof.

In any embodiment herein, the optionally substituted arylene or optionally substituted rings a-i is substituted with one or more substituents, and wherein the substituent is selected from the group consisting of alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

In any embodiment herein, the composition includes a polymer or a copolymer.

In any embodiment herein, the composition includes a film, a membrane, or a cross-linked polymeric matrix.

In a third aspect, the present disclosure features an electrochemical cell including: an anode; a cathode; and a polymer electrolyte membrane disposed between the anode and the cathode. In some embodiments, the polymer electrolyte membrane includes any composition described herein.

In a fourth aspect, the present disclosure features a method of making a polymer, the method including: providing a first polymeric unit and an optional second polymeric unit in the presence of a Friedel-Crafts alkylation agent, wherein the Friedel-Crafts alkylation agent includes an optional haloalkyl group and a reactive group, thereby forming an initial polymer having a reactive group; and substituting the reactive group with an ionic moiety, thereby providing an ionic polymer. In some embodiments, the ionic polymer includes any composition described herein.

In a fifth aspect, the present disclosure features a method of making a copolymer, the method including: providing a first polymeric unit and a second polymeric unit in the presence of a Friedel-Crafts alkylation agent, wherein the Friedel-Crafts alkylation agent includes an optional haloalkyl group and a reactive group, thereby forming an initial copolymer having a reactive group; and substituting the reactive group with an ionic moiety, thereby providing an ionic copolymer. In some embodiments, the ionic copolymer includes any composition described herein.

In a sixth aspect, the present disclosure features a method of making a copolymer, the method including: providing an initial copolymer having at least one aromatic group or an aryl group; reacting the aryl group with a haloalkylation agent or a Friedel-Crafts alkylation agent, wherein the Friedel-Crafts alkylation agent includes a reactive group, thereby forming an initial copolymer having a halo or a reactive group; and substituting the halo or the reactive group with an ionic moiety, thereby providing an ionic copolymer. In some embodiments, the ionic polymer includes any composition described herein. Additional details follow.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

By "aliphatic" is meant a hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Such an aliphatic can be unsubstituted or substituted with one or more groups, such as groups described herein for an alkyl group.

The term "acyl," or "alkanoyl," as used interchangeably herein, represents an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group. In particular embodiments, the alkanoyl group is —C(O)-Ak, in which Ak is an alkyl group, as defined herein.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-4}$ alkyl).

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy (e.g., —O-Ak, wherein Ak is optionally substituted $C_{1-6}$ alkyl); (2) $C_{1-6}$ alkylsulfinyl (e.g., —S(O)-Ak, wherein Ak is optionally substituted $C_{1-6}$ alkyl); (3) $C_{1-6}$ alkylsulfonyl (e.g., —SO$_2$-Ak, wherein Ak is optionally substituted $C_{1-6}$ alkyl); (4) amino (e.g., —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group); (5) aryl; (6) arylalkoxy (e.g., —O-L-Ar, wherein L is a bivalent form of optionally substituted alkyl and Ar is optionally substituted aryl); (7) aryloyl (e.g., —C(O)—Ar, wherein Ar is optionally substituted aryl); (8) azido (e.g., —N$_3$); (9) cyano (e.g., —CN); (10) carboxyaldehyde (e.g., —C(O)H); (11) $C_{3-8}$ cycloalkyl (e.g., a monovalent saturated or unsaturated non-aromatic cyclic $C_{3-8}$ hydrocarbon group); (12) halo (e.g., F, Cl, Br, or I); (13) heterocyclyl (e.g., a 5-, 6- or 7-membered ring, unless otherwise specified, containing one, two, three, or four non-carbon heteroatoms, such as nitrogen, oxygen, phosphorous, sulfur, or halo); (14) heterocyclyloxy (e.g., —O-Het, wherein Het is heterocyclyl, as described herein); (15) heterocyclyloyl (e.g., —C(O)—Het, wherein Het is heterocyclyl, as described herein); (16) hydroxyl (e.g., —OH); (17) N-protected amino; (18) nitro (e.g., —NO$_2$); (19) oxo (e.g., =O) or hydroxyimino (e.g., =N—OH); (20) $C_{3-8}$ spirocyclyl (e.g., an alkylene or heteroalkylene diradical, both ends of which are bonded to the same carbon atom of the parent group); (21) $C_{1-6}$ thioalkoxy (e.g., —S-Ak, wherein Ak is optionally substituted $C_{1-6}$ alkyl); (22) thiol (e.g., —SH); (23) —CO$_2$R$^A$, where R$^A$ is selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl group and Ar is optionally substituted aryl); (24) —C(O)NR$^B$R$^C$, where each of R$^B$ and R$^C$ is, independently, selected from the group consisting of (a) hydrogen, (b) $C_{1-6}$ alkyl, (c) $C_{4-8}$ aryl, and (d) ($C_{4-8}$ aryl) $C_{1-6}$ alkyl (e.g., -L-Ar, wherein L is a bivalent form of optionally substituted alkyl group and Ar is optionally substituted aryl); (25) —SO$_2$R$^D$, where R$^D$ is selected from the group consisting of (a) $C_{1-6}$ alkyl, (b) $C_{4-18}$ aryl, and (c) ($C_{4-8}$ aryl) $C_{1-6}$ alkyl (e.g., -L-Ar, wherein L is a bivalent form of optionally substituted alkyl group and Ar is optionally substituted aryl); (26) —SO$_2$NR$^E$R$^F$, where each of R$^E$ and R$^F$ is, independently, selected from the group consisting of (a) hydrogen, (b) $C_{1-6}$ alkyl, (c) $C_{4-18}$ aryl, and (d) ($C_{4-18}$ aryl) $C_{1-6}$ alkyl (e.g., -L-Ar, wherein L is a bivalent form of optionally substituted alkyl group and Ar is optionally substituted aryl); and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl (e.g., optionally substituted alkyl having one or more double bonds), (e) $C_{2-6}$ alkynyl (e.g., optionally substituted alkyl having one or more triple bonds), (f) $C_{4-18}$ aryl, (g) ($C_{4-18}$ aryl) $C_{1-6}$ alkyl (e.g., L-Ar, wherein L is a bivalent form of optionally substituted alkyl group and Ar is optionally substituted aryl), (h) $C_{3-8}$ cycloalkyl, and (i) ($C_{3-8}$ cycloalkyl) $C_{1-6}$ alkyl (e.g., -L-Cy, wherein L is a bivalent form of optionally substituted alkyl group and Cy is optionally substituted cycloalkyl, as described herein), wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a multivalent (e.g., bivalent, trivalent, tetravalent, etc.) form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can be saturated or unsaturated (e.g., having one or more double bonds or triple bonds). The alkylene group can also be substituted or unsubstituted. For example, the alkylene group can be substituted with one or more substitution groups, as described herein for alkyl. In one instance, a substituted alkylene group can include an optionally substituted haloalkylene (e.g., an optionally substituted alkylene substituted with one or more hydroxyl groups, as defined herein), an optionally substituted haloalkylene (e.g., an optionally substituted alkylene substituted with one or more halo groups, as defined herein), and the like.

By "alkyleneoxy" is meant an alkylene group, as defined herein, attached to the parent molecular group through an oxygen atom.

By "amino" is meant —$NR^{N1}R^{N2}$, where each of $R^{N1}$ and $R^{N2}$ is, independently, H, optionally substituted alkyl, optionally substituted cycloalkyl, or optionally substituted aryl; or $R^{N1}$ and $R^{N2}$, taken together with the nitrogen atom to which each are attached, form an optionally substituted heterocyclyl group or heterocycle, as defined herein; or $R^{N1}$ and $R^{N2}$, taken together, form an optionally substituted alkylene or heteroalkylene (e.g., as described herein).

By "aminoalkyl" is meant an alkyl group, as defined herein, substituted by an amino group, as defined herein. Non-limiting aminoalkyl groups include -L-$NR^{N1}R^{N2}$, where L is a multivalent alkyl group, as defined herein; each of $R^{N1}$ and $R^{N2}$ is, independently, H, optionally substituted alkyl, or optionally substituted aryl; or $R^{N1}$ and $R^{N2}$, taken together with the nitrogen atom to which each are attached, form a heterocyclyl group, as defined herein.

By "ammonium" is meant a group including a protonated nitrogen atom $N^+$. Exemplary ammonium groups include —$N^+R^{N1}R^{N2}R^{N3}$ where each of $R^{N1}$, $R^{N2}$, and $R^{N3}$ is, independently, H, optionally substituted alkyl, optionally substituted cycloalkyl, or optionally substituted aryl; or $R^{N1}$ and $R^{N2}$, taken together with the nitrogen atom to which each are attached, form an optionally substituted heterocyclyl group or heterocycle; or $R^{N1}$ and $R^{N2}$, taken together, form an optionally substituted alkylene or heteroalkylene (e.g., as described herein); or $R^{N1}$ and $R^{N2}$ and $R^{N3}$, taken together with the nitrogen atom to which each are attached, form an optionally substituted heterocyclyl group or heterocycle, such as a heterocyclic cation.

By "aromatic" is meant a cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Huckel rule (4n+2). The point of attachment to the parent structure typically is through an aromatic portion of the condensed ring system. Such an aromatic can be unsubstituted or substituted with one or more groups, such as groups described herein for an alkyl or aryl group. Yet other substitution groups can include aliphatic, haloaliphatic, halo, nitrate, cyano, sulfonate, sulfonyl, or others.

By "aryl" is meant a group that contains any carbon-based aromatic group including, but not limited to, phenyl, benzyl, anthracenyl, anthryl, benzocyclobutenyl, benzocyclooctenyl, biphenylyl, chrysenyl, dihydroindenyl, fluoranthenyl, indacenyl, indenyl, naphthyl, phenanthryl, phenoxybenzyl, picenyl, pyrenyl, terphenyl, and the like, including fused benzo-$C_{4-8}$ cycloalkyl radicals (e.g., as defined herein) such as, for instance, indanyl, tetrahydronaphthyl, fluorenyl, and the like. The term aryl also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term non-heteroaryl, which is also included in the term aryl, defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl (e.g., —C(O)-Ak, wherein Ak is optionally substituted $C_{1-6}$ alkyl); (2) $C_{1-6}$ alkyl; (3) $C_{1-6}$ alkoxy (e.g., —O-Ak, wherein Ak is optionally substituted $C_{1-6}$ alkyl); (4) $C_{1-6}$ alkoxy-$C_{1-6}$ alkyl (e.g., -L-O-Ak, wherein L is a bivalent form of optionally substituted alkyl group and Ak is optionally substituted $C_{1-6}$ alkyl); (5) $C_{1-6}$ alkylsulfinyl (e.g., —S(O)-Ak, wherein Ak is optionally substituted $C_{1-6}$ alkyl); (6) $C_{1-6}$ alkylsulfinyl-$C_{1-6}$ alkyl (e.g., -L-S(O)-Ak, wherein L is a bivalent form of optionally substituted alkyl group and Ak is optionally substituted $C_{1-6}$ alkyl); (7) $C_{1-6}$ alkylsulfonyl (e.g., —$SO_2$-Ak, wherein Ak is optionally substituted $C_{1-6}$ alkyl); (8) $C_{1-6}$ alkylsulfonyl-$C_{1-6}$ alkyl (e.g., -L-$SO_2$-Ak, wherein L is a bivalent form of optionally substituted alkyl group and Ak is optionally substituted $C_{1-6}$ alkyl); (9) aryl; (10) amino (e.g., —$NR^{N1}R^{N2}$, where each of $R^{N1}$ and $R^{N2}$ is, independently, H or optionally substituted alkyl, or $R^{N1}$ and $R^{N2}$, taken together with the nitrogen atom to which each are attached, form a heterocyclyl group); (11) $C_{1-6}$ aminoalkyl (e.g., an alkyl group, as defined herein, substituted by one or more —$NR^{N1}R^{N2}$ groups, as described herein); (12) heteroaryl (e.g., a subset of heterocyclyl groups (e.g., a 5-, 6- or 7-membered ring, unless otherwise specified, containing one, two, three, or four non-carbon heteroatoms), which are aromatic); (13) ($C_{4-18}$ aryl) $C_{1-6}$ alkyl (e.g., -L-Ar, wherein L is a bivalent form of optionally substituted alkyl and Ar is optionally substituted aryl); (14) aryloyl (e.g., —C(O)—Ar, wherein Ar is optionally substituted aryl); (15)

azido (e.g., —N$_3$); (16) cyano (e.g., —CN); (17) C$_{1-6}$ azidoalkyl (e.g., an alkyl group, as defined herein, substituted by one or more azido groups, as described herein); (18) carboxyaldehyde (e.g., —C(O)H); (19) carboxyaldehyde-C$_{1-6}$ alkyl (e.g., an alkyl group, as defined herein, substituted by one or more carboxyaldehyde groups, as described herein); (20) C$_{3-8}$ cycloalkyl (e.g., a monovalent saturated or unsaturated non-aromatic cyclic C$_{3-8}$ hydrocarbon group); (21) (C$_{3-8}$ cycloalkyl) C$_{1-6}$ alkyl (e.g., an alkyl group, as defined herein, substituted by one or more cycloalkyl groups, as described herein); (22) halo (e.g., F, Cl, Br, or I); (23) C$_{1-6}$ haloalkyl (e.g., an alkyl group, as defined herein, substituted by one or more halo groups, as described herein); (24) heterocyclyl (e.g., a 5-, 6- or 7-membered ring, unless otherwise specified, containing one, two, three, or four non-carbon heteroatoms, such as nitrogen, oxygen, phosphorous, sulfur, or halo); (25) heterocyclyloxy (e.g., —O-Het, wherein Het is heterocyclyl, as described herein); (26) heterocyclyloyl (e.g., —C(O)—Het, wherein Het is heterocyclyl, as described herein); (27) hydroxyl (e.g., —OH); (28) C$_{1-6}$ hydroxyalkyl (e.g., an alkyl group, as defined herein, substituted by one or more hydroxyl, as described herein); (29) nitro (e.g., —NO$_2$); (30) C$_{1-6}$ nitroalkyl (e.g., an alkyl group, as defined herein, substituted by one or more nitro, as described herein); (31) N-protected amino; (32) N-protected amino-C$_{1-6}$ alkyl (e.g., an alkyl group, as defined herein, substituted by one or more N-protected amino groups); (33) oxo (e.g., =O) or hydroxyimino (e.g., =N—OH); (34) C$_{1-6}$ thioalkoxy (e.g., —S-Ak, wherein Ak is optionally substituted C$_{1-6}$ alkyl); (35) thio-C$_{1-6}$ alkoxy-C$_{1-6}$ alkyl (e.g., -L-S-Ak, wherein L is a bivalent form of optionally substituted alkyl and Ak is optionally substituted C$_{1-6}$ alkyl); (36) —(CH$_2$)$_r$CO$_2$R$^A$, where r is an integer of from zero to four, and R$^A$ is selected from the group consisting of (a) hydrogen, (b) C$_{1-6}$ alkyl, (c) C$_{4-18}$ aryl, and (d) (C$_{4-18}$ aryl) C$_{1-6}$ alkyl (e.g., -L-Ar, wherein L is a bivalent form of optionally substituted alkyl and Ar is optionally substituted aryl); (37) —(CH$_2$)$_r$CONR$^B$R$^C$, where r is an integer of from zero to four and where each R$^B$ and R$^C$ is independently selected from the group consisting of (a) hydrogen, (b) C$_{1-6}$ alkyl, (c) C$_{4-18}$ aryl, and (d) (C$_{4-18}$ aryl) C$_{1-6}$ alkyl (e.g., -L-Ar, wherein L is a bivalent form of optionally substituted alkyl and Ar is optionally substituted aryl); (38) —(CH$_2$)$_r$SO$_2$R$^D$, where r is an integer of from zero to four and where R$^D$ is selected from the group consisting of (a) C$_{1-6}$ alkyl, (b) C$_{4-18}$ aryl, and (c) (C$_{4-18}$ aryl) C$_{1-6}$ alkyl (e.g., -L-Ar, wherein L is a bivalent form of optionally substituted alkyl and Ar is optionally substituted aryl); (39) —(CH$_2$)$_r$SO$_2$NR$^E$R$^F$, where r is an integer of from zero to four and where each of R$^E$ and R$^F$ is, independently, selected from the group consisting of (a) hydrogen, (b) C$_{1-6}$ alkyl, (c) C$_{1-6}$ is aryl, and (d) (C$_{4-18}$ aryl) C$_{1-6}$ alkyl (e.g., -L-Ar, wherein L is a bivalent form of optionally substituted alkyl and Ar is optionally substituted aryl); (40) —(CH$_2$)$_r$NR$^G$R$^H$, where r is an integer of from zero to four and where each of R$^G$ and R$^H$ is, independently, selected from the group consisting of (a) hydrogen, (b) an N-protecting group, (c) C$_{1-6}$ alkyl, (d) C$_{2-6}$ alkenyl (e.g., optionally substituted alkyl having one or more double bonds), (e) C$_{2-4}$ alkynyl (e.g., optionally substituted alkyl having one or more triple bonds), (f) C$_{4-18}$ aryl, (g) (C$_{4-18}$ aryl) C$_{1-6}$ alkyl (e.g., -L-Ar, wherein L is a bivalent form of optionally substituted alkyl and Ar is optionally substituted aryl), (h) C$_{3-8}$ cycloalkyl, and (i) (C$_{3-8}$ cycloalkyl) C$_{1-6}$ alkyl (e.g., -L-Cy, wherein L is a bivalent form of optionally substituted alkyl and Cy is optionally substituted cycloalkyl, as described herein), wherein in one embodiment no two groups are bound to the nitrogen atom through a carbonyl group or a sulfonyl group; (41) thiol (e.g., —SH); (42) perfluoroalkyl (e.g., an alkyl group having each hydrogen atom substituted with a fluorine atom); (43) perfluoroalkoxy (e.g., —OR$^f$, where R$^f$ is an alkyl group having each hydrogen atom substituted with a fluorine atom); (44) aryloxy (e.g., —OAr, where Ar is optionally substituted aryl); (45) cycloalkoxy (e.g., —O-Cy, wherein Cy is optionally substituted cycloalkyl, as described herein); (46) cycloalkylalkoxy (e.g., —O-L-Cy, wherein L is a bivalent form of optionally substituted alkyl and Cy is optionally substituted cycloalkyl, as described herein); and (47) arylalkoxy (e.g., —O-L-Ar, wherein L is a bivalent form of optionally substituted alkyl and Ar is optionally substituted aryl). In particular embodiments, an unsubstituted aryl group is a C$_{4-18}$, C$_{4-14}$, C$_{4-12}$, C$_{4-10}$, C$_{6-18}$, C$_{6-14}$, C$_{6-12}$, or C$_{6-10}$ aryl group.

By "arylalkoxy" is meant an arylalkylene group, as defined herein, attached to the parent molecular group through an oxygen atom. In some embodiments, the arylalkoxy group is —O-Ak-Ar, in which Ak is an optionally substituted alkylene, as defined herein, and Ar is an optionally substituted aryl, as defined herein.

By "(aryl)(alkyl)ene" is meant a bivalent form including an arylene group, as described herein, attached to an alkylene or a heteroalkylene group, as described herein. In some embodiments, the (aryl)(alkyl)ene group is -L-Ar— or -L-Ar-L- or —Ar-L-, in which Ar is an arylene group and each L is, independently, an optionally substituted alkylene group or an optionally substituted heteroalkylene group.

By "arylalkylene" is meant an aryl group, as defined herein, attached to the parent molecular group through an alkylene group, as defined herein. In some embodiments, the arylalkylene group is -Ak-Ar, in which Ak is an optionally substituted alkylene, as defined herein, and Ar is an optionally substituted aryl, as defined herein. The arylalkylene group can be substituted or unsubstituted. For example, the arylalkylene group can be substituted with one or more substitution groups, as described herein for aryl and/or alkyl. Exemplary unsubstituted arylalkylene groups are of from 7 to 16 carbons (C$_{7-16}$ arylalkylene), as well as those having an aryl group with 4 to 18 carbons and an alkylene group with 1 to 6 carbons (i.e., (C$_{4-18}$ aryl)C$_{1-6}$ alkylene).

By "arylene" is meant a multivalent (e.g., bivalent, trivalent, tetravalent, etc.) form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a C$_{4-18}$, C$_{4-14}$, C$_{4-12}$, C$_{4-10}$, C$_{6-18}$, C$_{6-14}$, C$_{6-12}$, or C$_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "aryloxy" is meant an aryl group, as defined herein, attached to the parent molecular group through an oxygen atom.

By "aryloyl" is meant an aryl group that is attached to the parent molecular group through a carbonyl group. In some embodiments, an unsubstituted aryloyl group is a C$_{7-11}$ aryloyl or C$_{5-19}$ aryloyl group. In particular embodiments, the aryloyl group is —C(O)—Ar, in which Ar is an aryl group, as defined herein.

By "boranyl" is meant a —BR$_2$ group, in which each R, independently, can be H, halo, or optionally substituted alkyl.

By "borono" is meant a —BOH$_2$ group.

By "carboxyl" is meant a —CO$_2$H group.

By "carboxylate anion" is meant a —CO$_2^-$ group.

By "covalent bond" is meant a covalent bonding interaction between two components. Non-limiting covalent bonds include a single bond, a double bond, a triple bond, or a spirocyclic bond, in which at least two molecular groups are bonded to the same carbon atom.

By "cyano" is meant a —CN group.

By "cyclic group" is used herein to refer to either aryl groups, non-aryl groups (e.g., cycloalkyl or heterocycloalkyl groups), or both. Cyclic groups have one or more ring systems that can be substituted or unsubstituted. A cyclic group can contain one or more aryl groups, one or more non-aryl groups, or one or more aryl groups and one or more non-aryl groups.

By "cycloalkyl" is meant a monovalent saturated or unsaturated non-aromatic cyclic hydrocarbon group of from three to ten carbons (e.g., C$_{3-8}$ or C$_{3-10}$), unless otherwise specified, and is exemplified by cyclopropyl, cyclobutyl, cyclopentyl, cyclohexyl, cycloheptyl, bicyclo[2.2.1.]heptyl, and the like. The term cycloalkyl also includes "cycloalkenyl," which is defined as a non-aromatic carbon-based ring composed of three to ten carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The cycloalkyl group can also be substituted or unsubstituted. For example, the cycloalkyl group can be substituted with one or more groups including those described herein for alkyl.

By "halo" is meant F, Cl, Br, or I.

By "haloalkyl" is meant an alkyl group, as defined herein, substituted with one or more halo.

By "haloalkylene" is meant an alkylene group, as defined herein, substituted with one or more halo.

By "heteroaliphatic" is meant an aliphatic group, as defined herein, including at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group.

By "heteroalkyl" is meant an alkyl group, as defined herein, containing one, two, three, or four non-carbon heteroatoms (e.g., independently selected from the group consisting of nitrogen, oxygen, phosphorous, sulfur, selenium, or halo).

By "heteroalkylene" is meant an alkylene group, as defined herein, containing one, two, three, or four non-carbon heteroatoms (e.g., independently selected from the group consisting of nitrogen, oxygen, phosphorous, sulfur, selenium, or halo). The heteroalkylene group can be saturated or unsaturated (e.g., having one or more double bonds or triple bonds). The heteroalkylene group can be substituted or unsubstituted. For example, the heteroalkylene group can be substituted with one or more substitution groups, as described herein for alkyl.

By "heteroaryl" is meant a subset of heterocyclyl groups, as defined herein, which are aromatic, i.e., they contain 4n+2 pi electrons within the mono- or multicyclic ring system.

The term "heterocycloalkyl" is a type of cycloalkyl group as defined above where at least one of the carbon atoms and its attached hydrogen atoms, if any, are replaced by O, S, N, or NH. The heterocycloalkyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

By "heterocycle" is meant a compound having one or more heterocyclyl moieties. Non-limiting heterocycles include optionally substituted imidazole, optionally substituted triazole, optionally substituted tetrazole, optionally substituted pyrazole, optionally substituted imidazoline, optionally substituted pyrazoline, optionally substituted imidazolidine, optionally substituted pyrazolidine, optionally substituted pyrrole, optionally substituted pyrroline, optionally substituted pyrrolidine, optionally substituted tetrahydrofuran, optionally substituted furan, optionally substituted thiophene, optionally substituted oxazole, optionally substituted isoxazole, optionally substituted isothiazole, optionally substituted thiazole, optionally substituted oxathiolane, optionally substituted oxadiazole, optionally substituted thiadiazole, optionally substituted sulfolane, optionally substituted succinimide, optionally substituted thiazolidinedione, optionally substituted oxazolidone, optionally substituted hydantoin, optionally substituted pyridine, optionally substituted piperidine, optionally substituted pyridazine, optionally substituted piperazine, optionally substituted pyrimidine, optionally substituted pyrazine, optionally substituted triazine, optionally substituted pyran, optionally substituted pyrylium, optionally substituted tetrahydropyran, optionally substituted dioxine, optionally substituted dioxane, optionally substituted dithiane, optionally substituted trithiane, optionally substituted thiopyran, optionally substituted thiane, optionally substituted oxazine, optionally substituted morpholine, optionally substituted thiazine, optionally substituted thiomorpholine, optionally substituted cytosine, optionally substituted thymine, optionally substituted uracil, optionally substituted thiomorpholine dioxide, optionally substituted indene, optionally substituted indoline, optionally substituted indole, optionally substituted isoindole, optionally substituted indolizine, optionally substituted indazole, optionally substituted benzimidazole, optionally substituted azaindole, optionally substituted azaindazole, optionally substituted pyrazolopyrimidine, optionally substituted purine, optionally substituted benzofuran, optionally substituted isobenzofuran, optionally substituted benzothiophene, optionally substituted benzisoxazole, optionally substituted anthranil, optionally substituted benzisothiazole, optionally substituted benzoxazole, optionally substituted benzthiazole, optionally substituted benzthiadiazole, optionally substituted adenine, optionally substituted guanine, optionally substituted tetrahydroquinoline, optionally substituted dihydroquinoline, optionally substituted dihydroisoquinoline, optionally substituted quinoline, optionally substituted isoquinoline, optionally substituted quinolizine, optionally substituted quinoxaline, optionally substituted phthalazine, optionally substituted quinazoline, optionally substituted cinnoline, optionally substituted naphthyridine, optionally substituted pyridopyrimidine, optionally substituted pyridopyrazine, optionally substituted pteridine, optionally substituted chromene, optionally substituted isochromene, optionally substituted chromenone, optionally substituted benzoxazine, optionally substituted quinolinone, optionally substituted isoquinolinone, optionally substituted carbazole, optionally substituted dibenzofuran, optionally substituted acridine, optionally substituted phenazine, optionally substituted phenoxazine, optionally substituted phenothiazine, optionally substituted phenoxathiine, optionally substituted quinuclidine, optionally substituted azaadamantane, optionally substituted dihydroazepine, optionally substituted azepine, optionally substituted diazepine, optionally substituted oxepane, optionally substituted thiepine, optionally substituted thiazepine, optionally substituted azocane, optionally substituted azocine, optionally substituted thiocane, optionally substituted azonane, optionally substituted azecine, etc. Optional substitutions include any described herein for aryl. Heterocycles can also include cations and/or salts of any of these (e.g., any described herein, such as optionally substituted piperidinium, optionally substituted pyrrolidinium, optionally substituted pyrazolium, optionally substituted imidazolium, optionally substituted pyridinium, optionally substituted quinolinium, optionally substituted isoquinolinium, optionally substituted acridinium, optionally substituted phenanthridinium, optionally substituted pyridazinium, optionally substituted pyrimidinium, optionally substituted pyrazinium, optionally substituted *phenazinium*, or optionally substituted morpholinium).

By "heterocyclyl" is meant a 3-, 4-, 5-, 6- or 7-membered ring (e.g., a 5-, 6- or 7-membered ring), unless otherwise specified, containing one, two, three, or four non-carbon heteroatoms (e.g., independently selected from the group consisting of nitrogen, oxygen, phosphorous, sulfur, selenium, or halo). The 3-membered ring has zero to one double bonds, the 4- and 5-membered ring has zero to two double bonds, and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include acridinyl, adenyl, alloxazinyl, azaadamantanyl, azabenzimidazolyl, azabicyclononyl, azacycloheptyl, azacyclooctyl, azacyclononyl, azahypoxanthinyl, azaindazolyl, azaindolyl, azecinyl, azepanyl, azepinyl, azetidinyl, azetyl, aziridinyl, azirinyl, azocanyl, azocinyl, azonanyl, benzimidazolyl, benzisothiazolyl, benzisoxazolyl, benzodiazepinyl, benzodiazocinyl, benzodihydrofuryl, benzodioxepinyl, benzodioxinyl, benzodioxanyl, benzodioxocinyl, benzodioxolyl, benzodithiepinyl, benzodithiinyl, benzodioxocinyl, benzofuranyl, benzophenazinyl, benzopyranonyl, benzopyranyl, benzopyrenyl, benzopyronyl, benzoquinolinyl, benzoquinolizinyl, benzothiadiazepinyl, benzothiadiazolyl, benzothiazepinyl, benzothiazocinyl, benzothiazolyl, benzothienyl, benzothiophenyl, benzothiazinonyl, benzothiazinyl, benzothiopyranyl, benzothiopyronyl, benzotriazepinyl, benzotriazinonyl, benzotriazinyl, benzotriazolyl, benzoxathiinyl, benzotrioxepinyl, benzoxadiazepinyl, benzoxathiazepinyl, benzoxathiepinyl, benzoxathiocinyl, benzoxazepinyl, benzoxazinyl, benzoxazocinyl, benzoxazolinonyl, benzoxazolinyl, benzoxazolyl, benzylsultamyl benzylsultimyl, bipyrazinyl, bipyridinyl, carbazolyl (e.g., 4H-carbazolyl), carbolinyl (e.g., β-carbolinyl), chromanonyl, chromanyl, chromenyl, cinnolinyl, coumarinyl, cytdinyl, cytosinyl, decahydroisoquinolinyl, decahydroquinolinyl, diazabicyclooctyl, diazetyl, diaziridinethionyl, diaziridinonyl, diaziridinyl, diazirinyl, dibenzisoquinolinyl, dibenzoacridinyl, dibenzocarbazolyl, dibenzofuranyl, dibenzophenazinyl, dibenzopyranonyl, dibenzopyronyl (xanthonyl), dibenzoquinoxalinyl, dibenzothiazepinyl, dibenzothiepinyl, dibenzothiophenyl, dibenzoxepinyl, dihydroazepinyl, dihydroazetyl, dihydrofuranyl, dihydrofuryl, dihydroisoquinolinyl, dihydropyranyl, dihydropyridinyl, dihydroypyridyl, dihydroquinolinyl, dihydrothienyl, dihydroindolyl, dioxanyl, dioxazinyl, dioxindolyl, dioxiranyl, dioxenyl, dioxinyl, dioxobenzofuranyl, dioxolyl, dioxotetrahydrofuranyl, dioxothiomorpholinyl, dithianyl, dithiazolyl, dithienyl, dithiinyl, furanyl, furazanyl, furoyl, furyl, guaninyl, homopiperazinyl, homopiperidinyl, hypoxanthinyl, hydantoinyl, imidazolidinyl, imidazolinyl, imidazolyl, indazolyl (e.g., 1H-indazolyl), indolenyl, indolinyl, indolizinyl, indolyl (e.g., 1H-indolyl or 3H-indolyl), isatinyl, isatyl, isobenzofuranyl, isochromanyl, isochromenyl, isoindazoyl, isoindolinyl, isoindolyl, isopyrazolonyl, isopyrazolyl, isoxazolidiniyl, isoxazolyl, isoquinolinyl, isoquinolinyl, isothiazolidinyl, isothiazolyl, morpholinyl, naphthindazolyl, naphthindolyl, naphthiridinyl, naphthopyranyl, naphthothiazolyl, naphthothioxolyl, naphthotriazolyl, naphthoxindolyl, naphthyridinyl, octahydroisoquinolinyl, oxabicycloheptyl, oxauracil, oxadiazolyl, oxazinyl, oxaziridinyl, oxazolidinyl, oxazolidonyl, oxazolinyl, oxazolonyl, oxazolyl, oxepanyl, oxetanonyl, oxetanyl, oxetyl, oxtenayl, oxindolyl, oxiranyl, oxobenzoisothiazolyl, oxochromenyl, oxoisoquinolinyl, oxoquinolinyl, oxothiolanyl, phenanthridinyl, phenanthrolinyl, phenazinyl, phenothiazinyl, phenothienyl (benzothiofuranyl), phenoxathiinyl, phenoxazinyl, phthalazinyl, phthalazonyl, phthalidyl, phthalimidinyl, piperazinyl, piperidinyl, piperidonyl (e.g., 4-piperidonyl), pteridinyl, purinyl, pyranyl, pyrazinyl, pyrazolidinyl, pyrazolinyl, pyrazolopyrimidinyl, pyrazolyl, pyridazinyl, pyridinyl, pyridopyrazinyl, pyridopyrimidinyl, pyridyl, pyrimidinyl, pyrimidyl, pyronyl, pyrrolidinyl, pyrrolidonyl (e.g., 2-pyrrolidonyl), pyrrolinyl, pyrrolizidinyl, pyrrolyl (e.g., 2H-pyrrolyl), pyrylium, quinazolinyl, quinolinyl, quinolizinyl (e.g., 4H-quinolizinyl), quinoxalinyl, quinuclidinyl, selenazinyl, selenazolyl, selenophenyl, succinimidyl, sulfolanyl, tetrahydrofuranyl, tetrahydrofuryl, tetrahydroisoquinolinyl, tetrahydroisoquinolyl, tetrahydropyridinyl, tetrahydropyridyl (piperidyl), tetrahydropyranyl, tetrahydropyronyl, tetrahydroquinolinyl, tetrahydroquinolyl, tetrahydrothienyl, tetrahydrothiophenyl, tetrazinyl, tetrazolyl, thiadiazinyl (e.g., 6H-1,2,5-thiadiazinyl or 2H,6H-1,5,2-dithiazinyl), thiadiazolyl, thianthrenyl, thianyl, thianaphthenyl, thiazepinyl, thiazinyl, thiazolidinedionyl, thiazolidinyl, thiazolyl, thienyl, thiepanyl, thiepinyl, thietanyl, thietyl, thiiranyl, thiocanyl, thiochromanonyl, thiochromanyl, thiochromenyl, thiodiazinyl, thiodiazolyl, thioindoxyl, thiomorpholinyl, thiophenyl, thiopyranyl, thiopyronyl, thiotriazolyl, thiourazolyl, thioxanyl, thioxolyl, thymidinyl, thyminyl, triazinyl, triazolyl, trithianyl, urazinyl, urazolyl, uretidinyl, uretinyl, uricyl, uridinyl, xanthenyl, xanthinyl, xanthionyl, and the like, as well as modified forms thereof (e.g., including one or more oxo and/or amino) and salts thereof. The heterocyclyl group can be substituted or unsubstituted. For example, the heterocyclyl group can be substituted with one or more substitution groups, as described herein for aryl.

By "heterocyclyldiyl" is meant a bivalent form of a heterocyclyl group, as described herein. In one instance, the heterocyclyldiyl is formed by removing a hydrogen from a heterocyclyl group. Exemplary heterocyclyldiyl groups include piperdylidene, quinolinediyl, etc. The heterocyclyldiyl group can also be substituted or unsubstituted. For example, the heterocyclyldiyl group can be substituted with one or more substitution groups, as described herein for heterocyclyl.

By "hydroxyl" is meant an —OH group.

By "hydroxyalkyl" is meant an alkyl group, as defined herein, substituted with one or more hydroxyl.

By "hydroxyalkylene" is meant an alkylene group, as defined herein, substituted with one or more hydroxy.

By "nitro" is meant an —NO$_2$ group.

By "phosphate" is meant a group derived from phosphoric acid. One example of phosphate includes a —O—P(=O)(OR$^{P1}$)(OR$^{P2}$) or —O—[P(=O)(OR$^{P1}$)—O]$_{P3}$—R$^{P2}$ group, where each of R$^{P1}$ and R$^{P2}$, is, independently, H, optionally substituted alkyl, optionally substituted alkenyl, optionally substituted aryl, or optionally substituted arylalkylene, and where P3 is an integer from 1 to 5. Yet other examples of phosphate include orthophosphoric acid, pyrophosphoric acid, tripolyphosphoric acid, tetrapolyphosphoric acid, trimetaphosphoric acid, and/or phosphoric anhydride, or combinations thereof.

By "phosphono" or "phosphonic acid" is meant a —P(O)(OH)$_2$ group.

By "spirocyclyl" is meant an alkylene diradical, both ends of which are bonded to the same carbon atom of the parent group to form a spirocyclyl group and also a heteroalkylene diradical, both ends of which are bonded to the same atom. Non-limiting alkylene and heteroalkylene groups for use within a spirocyclyl group includes C$_{2-12}$, C$_{2-11}$, C$_{2-10}$, C$_{2-9}$, C$_{2-8}$, C$_{2-7}$, C$_{2-6}$, C$_{2-5}$, C$_{2-4}$, or C$_{2-3}$ alkylene groups, as well as C$_{1-12}$, C$_{1-11}$, C$_{1-10}$, C$_{1-9}$, C$_{1-8}$, C$_{1-7}$, C$_{1-6}$, C$_{1-5}$, C$_{1-4}$, C$_{1-3}$, or C$_{1-2}$ heteroalkylene groups having one or more heteroatoms.

By "sulfate" is meant a group derived from sulfuric acid. One example of sulfate includes a —O—S(=O)$_2$(OR$^{S1}$) group, where R$^{S1}$ is H, optionally substituted alkyl, optionally substituted alkenyl, optionally substituted aryl, or optionally substituted arylalkylene.

By "sulfo" or "sulfonic acid" is meant an —S(O)$_2$OH group.

By "sulfonyl" is meant an —S(O)$_2$— or —S(O)$_2$R group, in which R can be H, optionally substituted alkyl, or optionally substituted aryl. Non-limiting sulfonyl groups can include a trifluoromethylsulfonyl group (—SO$_2$—CF$_3$ or Tf).

By "thiocyanato" is meant an —SCN group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," $J.$ $Pharm.$ $Sci.$ 1977 January; 66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, gluconate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other salts include ammonium, sulfonium, sulfoxonium, phosphonium, iminium, imidazolium, benzimidazolium, amidinium, guanidinium, phosphazinium, phosphazenium, pyridinium, etc., as well as other cationic groups described herein (e.g., optionally substituted isoxazolium, optionally substituted oxazolium, optionally substituted thiazolium, optionally substituted pyrrolium, optionally substituted furanium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinum, optionally substituted quinolizinium, optionally substituted dehydroquinolizinium, optionally substituted quinolinium, optionally substituted isoindolinium, optionally substituted benzimidazolinium, and optionally substituted purinium). Yet other salts can include an anion, such as a halide (e.g., F$^-$, Cl$^-$, Br$^-$, or I$^-$), a hydroxide (e.g., OH$^-$), a borate (e.g., tetrafluoroborate (BF$_4^-$), a carbonate (e.g., CO$_3^{2-}$ or HCO$_3^-$), or a sulfate (e.g., SO$_4^{2-}$).

By "leaving group" is meant an atom (or a group of atoms) with electron withdrawing ability that can be displaced as a stable species, taking with it the bonding electrons, or an atom (or a group of atoms) that can be replaced by a substitution reaction. Examples of suitable leaving groups include H, halides, and sulfonates including, but not limited to, triflate (-OTf), mesylate (-OMs), tosylate (-OTs), brosylate (-OBs), acetate, Cl, Br, and I.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, x bond interactions, hydrophobic interactions, inclusion complexes, clathration, van der Waals interactions, and combinations thereof.

DETAILED DESCRIPTION

The present disclosure relates to a composition including a first polymeric structure and a second polymeric structure, in which at least one of these structures includes an ionizable moiety or an ionic moiety. In some embodiments, both of the first and second structures include an ionizable or ionic moiety. In use, the first and second structures are different, thus forming a copolymer, a polymer blend, or other heterogenous polymeric composition. Charge conduction through the material can be controlled by the type and amount of charge (e.g., anionic and/or cationic charge on the first and/or second structure) provided by the ionizable/ionic moieties.

The composition can include any combination of a first structure (e.g., one or more of formulas (I-V)) and a second structure (e.g., one or more of formulas (X)—(XXXIV)), as described herein. By using two different structures, the properties of the composition can be tuned based on the selection of the first and second structures. Each of the first and second structures can, independently, include a polymeric unit. The polymeric unit can be a homopolymer, a copolymer, a block copolymer, or other useful combinations of repeating monomeric units.

The composition can include a polymeric unit selected from a first structure (e.g., any described herein, such as one or more of formulas (I-V)). For instance, the composition can include a plurality of first structures, in which each first structure is the same (e.g., each Ar, $R^{7'}$—$R^{10'}$, and rings $a^1$-$c^1$, if present, is identical in each monomeric unit). In another instance, the composition can include a plurality of first structures, in which at least two of the first structures are different (e.g., at least one of Ar, $R^{7'}$—$R^{10'}$, and rings $a^1$-$c^1$, if present, is different between two monomeric units). Accordingly, even if the composition only includes polymeric units that are characterized as a first structure, the composition can be a homopolymer, a copolymer, a block copolymer, or other useful combinations of repeating monomeric units.

Accordingly, in one embodiment, the composition includes a plurality of first structures, wherein:

(i) the first structure is selected from the group of:

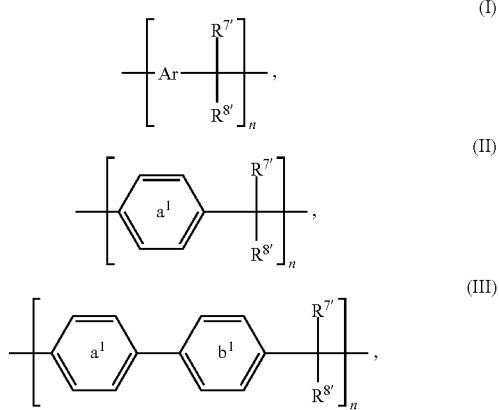

-continued

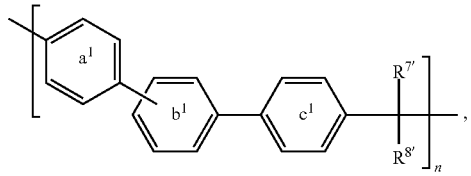

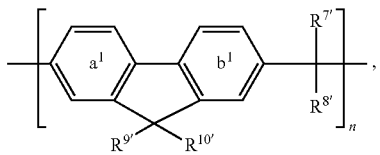

or a salt thereof, wherein:
  each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ or $R^{8'}$ comprises the electron-withdrawing moiety or wherein $R^{7'}$ and $R^{8'}$ can be taken together to form an optionally substituted cyclic group;
  each of $R^{9'}$ and $R^{10'}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^{9'}$ and $R^{10'}$ can be taken together to form an optionally substituted cyclic group;
  Ar comprises or is an optionally substituted arylene;
  n is an integer of 1 or more;
  each of ring $a^1$, ring $b^1$, and/or ring $c^1$ can be optionally substituted; and wherein one or more of rings $a^1$-$c^1$, $R^{7'}$, $R^{8'}$, $R^{9'}$, and $R^{10'}$ can optionally comprise an ionizable moiety or an ionic moiety.

In some embodiments, each of the first structures is the same. In other embodiments, at least two of the first structures are different (e.g., in which the composition includes a copolymer).

The compositions herein can include any useful combination of repeating monomeric units. In one instance, the composition can include -A-A-A- or -[A]-, in which A represent a monomeric unit and [A] represents a block including solely A monomeric units. A can be selected from those provided as a first or a second structure.

In another instance, the composition includes -[A]-[A-combination-B]-[B]-, in which A and B represents different monomeric units. [A] and [B] represent polymer blocks comprised solely of A monomeric units and solely B monomeric units, respectively. The [A-combination-B]block implies a block including some combination of A and B monomeric units. Each of A and B can be selected from those provided as a first and/or a second structure. In some embodiments, A and B are both first structures (e.g., selected from formulas (I-V)). In other embodiments, A is a first structure (e.g., selected from formulas (I-V)), and B is a second structure (e.g., selected from formulas (X)—(XXXIV)).

In another instance, the composition includes at least one alternating/periodic block, in which the different monomers have an ordered sequence, e.g., -[A-B-A-B- ... ]-, -[A-B-C-A-B-C- ... ]-, -[A-A-B-B-A-A-B-B- ... ]-, -[A-A-B-A-

A-B- . . . ]-, -[A-B-A-B-B-A-A-A-B-B-B- . . . ]-, etc. A, B, and C represent different monomeric units. The square bracketed examples represent polymer blocks, wherein the monomer sequence is repeated throughout the block. Each of A, B, and C can be selected from those provided as a first and/or a second structure (e.g., each of A, B, and C includes or is, independently, a structure of formulas (I)—(V) or (X)—(XXXIV)). In some embodiments, each of A, B, and C is a first structure (e.g., selected from formulas (I-V)). In other embodiments, A is a first structure (e.g., selected from formulas (I-V)), B is a second structure (e.g., selected from formulas (X)—(XXXIV)), and C is a first or second structure (e.g., selected from formulas (I-V) or (X)—(XXXIV)).

In yet another instance, the composition includes a particular unit that is covalently bonded between at least one pair of blocks, e.g., [A]-D-[B] or [A]-D-[B]-[C], in which D can be a monomeric unit or a linking moiety (e.g., any described herein). More than one D can be present, such as in [A]-D-D-[B] or [A]-D-D-D-[B], in which each C can be the same or different. [A] represents a block comprising solely A monomeric units; [B] represents a block comprising solely B monomeric units; [C] represents a block comprising solely C monomeric units; and D can represent individual monomer units (e.g., any described herein) or linking moieties (any described herein). Each of A, B, and C can be selected from those provided as a first and/or a second structure (e.g., each of A, B, and C includes or is, independently, a structure of formulas (I)—(V) or (X)—(XXXIV)). D can be selected from those provided as a first and/or a second structure (e.g., selected from formulas (I)—(V) or (X)—(XXXIV)) or provided as a linking moiety (e.g., L).

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein The compositions herein can be characterized by a first molecular weight (MW) of the first structure (e.g., as a polymeric unit), a second MW of the second structure (e.g., as a polymeric unit), or a total MW of the composition. In one embodiments, the first MW, second MW, or total M is a weight-average molecular weight (Mw) of at least 10,000 g/mol, at least 20,000 g/mol, or at least 50,000 g/mol; or from about 5,000 to 2,500,000 g/mol, such as from 10,000 to 2,500,000 g/mol, from 50,000 to 2,500,000 g/mol, from 10,000 to 250,000 g/mol, from 20,000 to 250,000 g/mol, or from 20,000 to 200,000 g/mol. In another embodiment, the first MW, second MW, or total MW is a number average molecular weight (Mn) of at least 20,000 g/mol or at least 40,000 g/mol; or from about 2,000 to 2,500,000 g/mol, such as from 5,000 to 750,000 g/mol or from 10,000 to 400,000 g/mol.

The compositions can include any useful number n, m, m1, m2, m3, or m4 of monomeric units. Non-limiting examples for each of n, m, m1, m2, m3, and m4 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

First Structures

Within the composition, the first structure can include a polymeric unit, which in turn can include one or more ionizable or ionic moieties. In non-limiting embodiments, the polymeric unit can have an arylene-containing backbone, which provides an organic scaffold upon which ionizable/ionic moieties can be added.

An arylene-containing backbone can also provide an aromatic group that facilitates the addition of a reactive carbocation (e.g., by reacting with a Friedel-Crafts alkylation reagent). In this way, monomeric units having aromatic groups can be reacted together to form a polymeric unit. Such addition/polymerization reactions can be promoted in any useful manner, e.g., by including an electron-withdrawing group in proximity to that carbocation. Thus, in some non-limiting instances, the first structure can include both optionally substituted aromatic groups and electron-withdrawing groups.

The reactive carbocation can also provide functional groups that can be further modified. For instance, the reactive carbocation can be attached to a -$L^A$-RG group, in which $L^A$ is a linking moiety (e.g., any herein) and RG is a reactive group (e.g., halo). After adding the carbocation and -$L^A$-RG group to the polymeric unit, the RG group can be further reacted with an ionizable reagent (e.g., such as an amine, $NR^{N1}R^{N2}R^{N3}$) to provide an ionic moiety (e.g., such as an ammonium, $-N^+R^{N1}R^{N2}R^{N3}$).

Accordingly, in some non-limiting embodiments, the first structure includes a polymeric unit (e.g., any described herein) having an ionizable/ionic moiety and an electron-withdrawing group. In some instances, the polymeric unit is formed by using one or more monomeric units. Non-limiting monomeric units can include one or more of the following:

in which Ar is an optionally substituted arylene or optionally substituted aromatic; Ak is an optionally substituted alkylene, optionally substituted haloalkylene, optionally substituted heteroalkylene, optionally substituted aliphatic, or optionally substituted heteroaliphatic; and L is a linking moiety (e.g., any described herein) or can be $-C(R^{7'})(R^{8'})-$ (e.g., for any $R^{7'}$ and $R^{8'}$ groups described herein). In particular examples, Ar, L, and/or Ak can be optionally substituted with one or more ionizable or ionic moieties and/or one or more electron-withdrawing groups.

In some embodiments, the first structure includes a polymeric unit selected from the following:

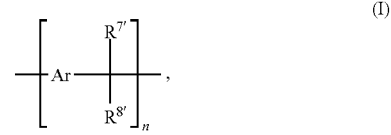

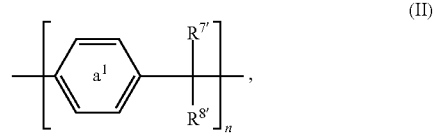

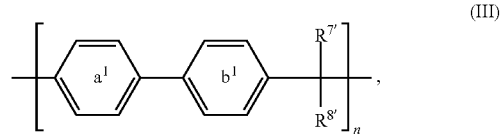

-continued

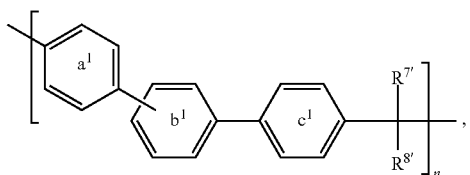
(IV)

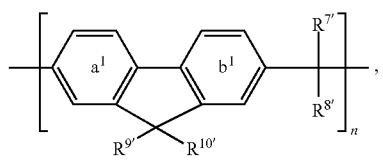
(V)

and a salt thereof, wherein:
   each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ or $R^{8'}$ includes the electron-withdrawing moiety or wherein $R^{7'}$ and $R^{8'}$ can be taken together to form an optionally substituted cyclic group;
   Ar comprises or is an optionally substituted aromatic or optionally substituted arylene (e.g., any described herein);
   each of n is, independently, an integer of 1 or more;
   each of ring $a^1$, ring $b^1$, and/or ring $c^1$ can be optionally substituted; and
   wherein one or more of rings $a^1$-$c^1$, $R^{7'}$, and $R^{8'}$ can optionally include an ionizable moiety or an ionic moiety.

Further substitutions for ring $a^1$, ring $b^1$, ring $c^1$, $R^{7'}$, and $R^{8'}$ can include one or more optionally substituted arylene, as well as any described herein for alkyl or aryl. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein.

The first structure can include polymeric units having an electron-withdrawing moiety and a fluorenyl-based backbone. For instance, the first structure can include a polymeric unit as follows:

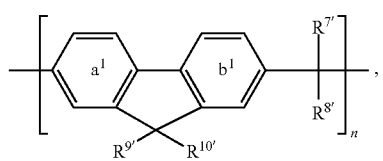
(V)

or a salt thereof, wherein:
   each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ or $R^{8'}$ includes the electron-withdrawing moiety or wherein $R^{7'}$ and $R^{8'}$ can be taken together to form an optionally substituted cyclic group;
   each of $R^{9'}$ and $R^{10'}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^{9'}$ and $R^{10'}$ can be taken together to form an optionally substituted cyclic group;
   n is, independently, an integer of 1 or more;
   each of ring $a^1$, ring $b^1$, and/or ring $c^1$ can be optionally substituted; and
   wherein one or more of rings $a^1$-$b^1$, $R^{7'}$, $R^{8'}$, $R^{9'}$, and $R^{10'}$ can optionally include an ionizable moiety or an ionic moiety.

In particular embodiments, each of $R^{9'}$ and $R^{10'}$ includes, independently, an ionizable/ionic moiety.

In some embodiments (e.g., of formulas (I)—(V)), ring $a^1$, ring $b^1$, and/or ring $c^1$ includes an ionizable moiety or an ionic moiety. In other embodiments, $R^{8'}$ includes an ionizable moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety. Non-limiting examples of $X^A$ include amino, ammonium cation, heterocyclic cation, piperidinium cation, azepanium cation, phosphonium cation, phosphazenium cation, or others herein.

In other embodiments (e.g., of formulas (I)—(V)), $R^{7'}$ includes the electron-withdrawing moiety. Non-limiting electron-withdrawing moieties can include or be an optionally substituted haloalkyl, cyano (CN), phosphate (e.g., —O(P=O)(OR$^{P1}$)(OR$^{P2}$) or —O—[P(=O)(OR$^{P1}$)—O]$_{P3}$—R$^{P2}$), sulfate (e.g., —O—S(=O)$_2$(OR$^{S1}$)), sulfonic acid (—SO$_3$H), sulfonyl (e.g., —SO$_2$—CF$_3$), difluoroboranyl (—BF$_2$), borono (—B(OH)$_2$), thiocyanato (—SCN), or piperidinium. In further embodiments, $R^{7'}$ includes the electron-withdrawing moiety, and $R^{8'}$ includes the ionizable/ionic moiety. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

In some embodiments (e.g., for any structure herein, such as in formulas (I)—(V)), $R^{7'}$ includes an optionally substituted aliphatic group. In one embodiment, $R^{7'}$ includes an optionally alkyl group.

In other embodiments (e.g., for any structure herein, such as in formulas (I)—(V)), $R^{8'}$ includes an optionally substituted aliphatic group or an optionally substituted heteroaliphatic group. In particular embodiments, the aliphatic or heteroaliphatic group is substituted with an oxo group (=O) or an hydroxyimino group (=N—OH). In one embodiment, $R^{8'}$ is —C(=X)—R$^{8'}$, in which X is O or N—OH; and $R^{8'}$ is optionally substituted aliphatic, optionally substituted alkyl, optionally substituted heteroaliphatic, optionally substituted heteroalkyl, optionally substituted alkoxy, optionally substituted haloalkyl, or optionally substituted alkanoyl.

In yet other embodiments (e.g., for any structure herein, such as in formulas (I)—(V)), $R^{7'}$ and $R^{8'}$ are taken together to form an optionally substituted cyclic group. For instance, $R^{7'}$ and $R^{8'}$ can be taken together to form an optionally substituted spirocyclyl group, as defined herein. In particular embodiments, the spirocyclyl group is substituted, independently, with one or more ionizable moieties or ionic moieties (e.g., any described herein). In some embodiments, the formulas of (I)—(V) can be represented as follows:

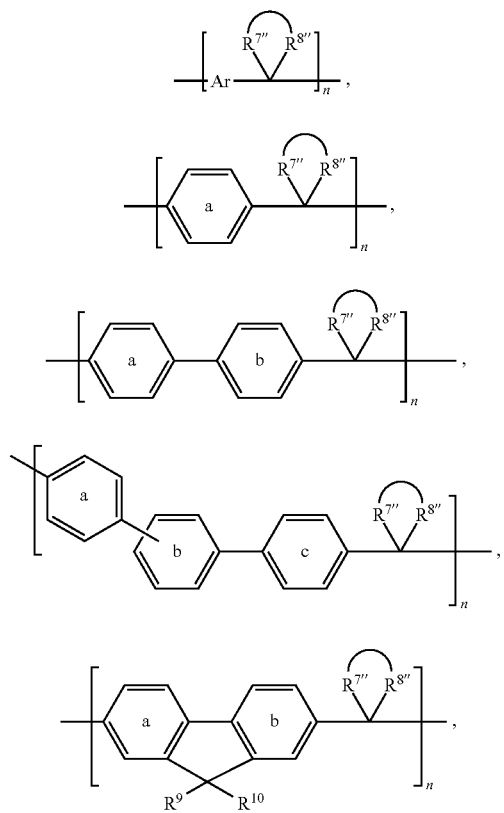

or a salt thereof, wherein $R^{7'}$ and $R^{8'}$ are taken together to form an optionally substituted alkylene group or an optionally substituted heteroalkylene group. In particular embodiments, the optionally substituted alkylene group or the optionally substituted heteroalkylene group is substituted, independently, with one or more ionizable moieties or ionic moieties.

Further non-limiting polymeric units can include a structure of any one or more of the following:

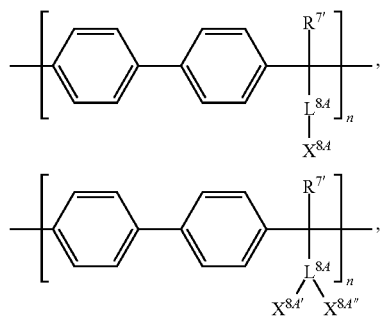

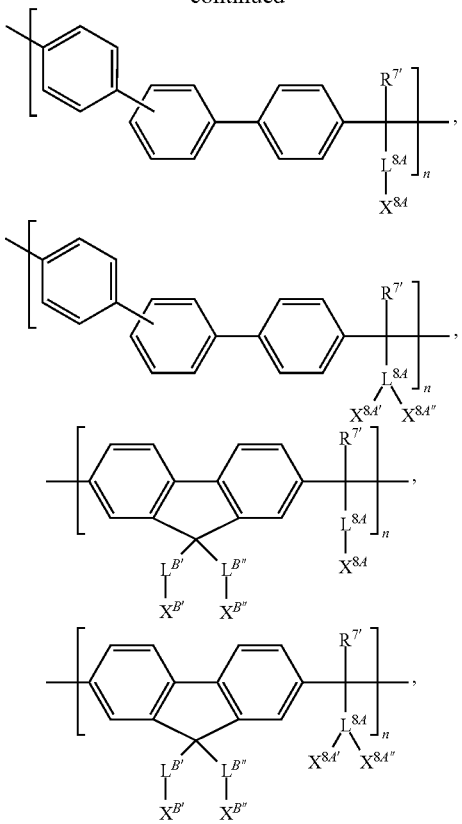

or a salt thereof, wherein:
n is from 1 or more;
each $L^{8A}$, $L^{B'}$, and $L^{B''}$ is, independently, a linking moiety; and
each $X^{8A}$, $X^{8A'}$, $X^{8A''}$, $X^{B'}$, and $X^{B''}$ is, independently, an acidic moiety or a basic moiety.

In any embodiment herein, ring $a^1$, ring $b^1$, and ring $c^1$, Ak, $R^{7'}$, $R^{8'}$, $R^{9'}$, and $R^{10'}$ can optionally include an ionizable moiety or an ionic moiety. Further substitutions for ring $a^1$, ring $b^1$, ring $c^1$, $R^{7'}$, $R^{8'}$, $R^{9'}$, and $R^{10'}$ can include one or more optionally substituted arylene.

In any embodiment herein, the electron-withdrawing moiety can be an optionally substituted haloalkyl (e.g., $C_{1-6}$ haloalkyl, including halomethyl, perhalomethyl, haloethyl, perhaloethyl, and the like), cyano (CN), phosphate (e.g., —O(P=O)(OR$^{P1}$)(OR$^{P2}$) or —O—[P(=O)(OR$^{P1}$)—O]$_{P3}$—R$^{P2}$), sulfate (e.g., —O—S(=O)$_2$(OR$^{S1}$)), sulfonic acid (—SO$_3$H), sulfonyl (e.g., —SO$_2$—CF$_3$), difluoroboranyl (—BF$_2$), borono (B(OH)$_2$), thiocyanato (—SCN), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

In some embodiments (e.g., for any structure herein, such as in formulas (I)—(V)), non-limiting haloalkyl groups include fluoroalkyl (e.g., —C$_x$F$_y$H$_z$), perfluoroalkyl (e.g., —C$_x$F$_y$), chloroalkyl (e.g., —C$_x$Cl$_y$H$_z$), perchloroalkyl (e.g., —C$_x$Cl$_y$), bromoalkyl (e.g., —C$_x$Br$_y$H$_z$), perbromoalkyl (e.g., —C$_x$Br$_y$), iodoalkyl (e.g., —C$_x$I$_y$H$_z$), or periodoalkyl (e.g., —C$_x$I$_y$). In some embodiments, x is from 1 to 6, y is from 1 to 13, and z is from 0 to 12. In particular embodiments, z=2x+1−y. In other embodiments, x is from 1 to 6, y is from 3 to 13, and z is 0 (e.g., and y=2x+1).

The polymeric unit can include one or more substitutions to a ring portion of the unit (e.g., as provided by an aromatic or arylene group) or to a linear portion (e.g., as provided by an aliphatic or alkylene group). Non-limiting substitutions can include lower unsubstituted alkyl (e.g., $C_{1-6}$ alkyl), lower substituted alkyl (e.g., optionally substituted $C_{1-6}$ alkyl), lower haloalkyl (e.g., $C_{1-6}$ haloalkyl), halo (e.g., F, Cl, Br, or I), unsubstituted aryl (e.g., phenyl), halo-substituted aryl (e.g., 4-fluoro-phenyl), substituted aryl (e.g., substituted phenyl), and others.

Second Structures

The second structure is typically different than the first structure but can also include a polymeric unit. In use, the first and second structure, together, can provide a composition having beneficial chemical and physical properties (e.g., beneficial ion exchange capacity (IEC), ionic conductivity, water uptake, swelling degree, specific conductivity, mechanical stability, etc.).

The selection of particular polymer components (e.g., first structure, second structure, polymeric units, ionic moieties, crosslinkers, etc.) can provide useful properties for the composition. In one instance, polymer components can be selected to minimize water uptake, in which excessive water can result in flooding of an electrochemical cell. In another instance, polymer components can be selected to provide resistance to softening or plasticization. In other embodiments, the composition can be an ion-conducting polymer having greater than about 1 mS/cm specific conductivity for anions and/or cations.

In one embodiment, the second structure can include one or more of the following: optionally substituted aliphatic, optionally substituted alkylene, optionally substituted aromatic, optionally substituted arylene, optionally substituted haloalkylene, optionally substituted alkyleneoxy, optionally substituted aryleneoxy, optionally substituted phosphazene (e.g., —P($R^{P1}R^{P2}$)=N—), and combinations thereof.

The second structure can include a polymeric unit formed by using one or more of the following monomeric units:

in which Ar is an optionally substituted arylene or optionally substituted aromatic; Ak is an optionally substituted alkylene, optionally substituted haloalkylene, optionally substituted aliphatic, optionally substituted heteroalkylene, or optionally substituted heteroaliphatic; L is a linking moiety (e.g., any described herein); and Ar, L, or Ak can be optionally substituted with one or more ionizable or ionic moieties. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein.

Any portion of the second structure may optionally include an ionizable moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety. Non-limiting examples of $X^A$ include amino, ammonium cation, heterocyclic cation, phosphonium cation, phosphazenium cation, or others herein.

The second structure can include other polymeric units having a cyclic cation group. For instance, the second structure can include a polymeric unit selected from the following:

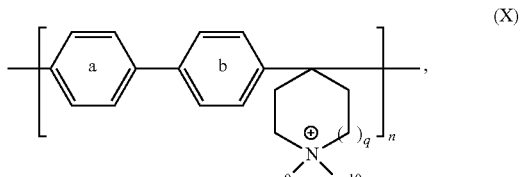

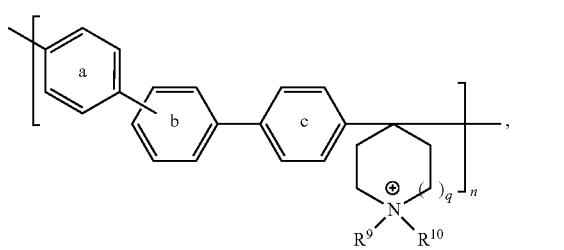

or a salt thereof, wherein:

each of $R^9$ and $R^{10}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^9$ and $R^{10}$ can be taken together to form an optionally substituted cyclic group;

n is an integer of 1 or more;

q is 0, 1, 2, or more;

each of rings a-c can be optionally substituted; and wherein one or more of rings a-c, $R^9$, and $R^{10}$ can optionally include an ionizable moiety or an ionic moiety.

In other embodiments (e.g., for any structure herein, such as in formulas (X)—(XI)), $R^9$ and $R^{10}$ are taken together to form an optionally substituted cyclic group. For instance, $R^9$ and $R^{10}$ can be taken together to form an optionally substituted spirocyclyl group, as defined herein. In particular embodiments, the spirocyclyl group is substituted, independently, with one or more ionizable moieties or ionic moieties (e.g., any described herein). In some embodiments, the formulas of (X)—(XI) can be represented as follows:

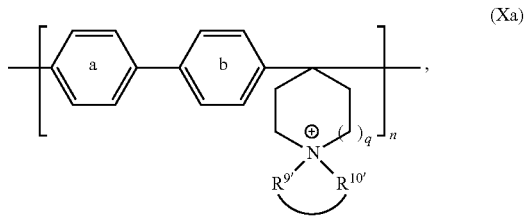

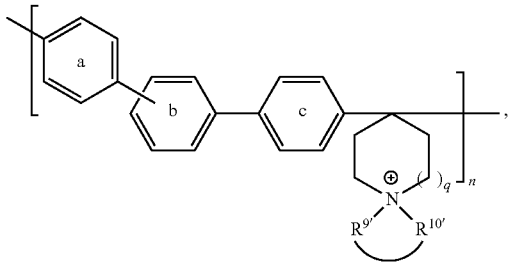

(XIa)

or a salt thereof, wherein $R^{9'}$ and $R^{10'}$ are taken together to form an optionally substituted alkylene group or an optionally substituted heteroalkylene group. In particular embodiments, the optionally substituted alkylene group or the optionally substituted heteroalkylene group is substituted, independently, with one or more ionizable moieties or ionic moieties. In other embodiments, the optionally substituted alkylene group or the optionally substituted heteroalkylene group is substituted, independently, with one or more aliphatic groups or alkyl groups. Without wishing to be limited be mechanism, substitution of the alkylene or heteroalkylene groups to provide a bulky substituents may shield the cationic nitrogen moiety from being degraded.

The second structure can include a combination of soft and hard segments. For instance, the second structure can include a polymeric unit as follows:

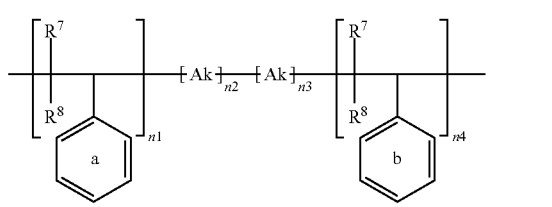

(XII)

or a salt thereof, wherein:
each of $R^7$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^7$ or $R^8$ comprises the electron-withdrawing moiety;
each Ak is an optionally substituted alkylene;
each of n1, n2, n3, and n4 is, independently, an integer of 1 or more;
each of ring a or ring b can be optionally substituted; and
wherein one or more of rings a-b, $R^7$, and $R^8$ can optionally comprise an ionizable moiety or an ionic moiety.

In some embodiments (e.g., for any structure herein, such as in formula (XII), $R^7$ includes an optionally substituted aliphatic group. In one embodiment, $R^7$ includes an optionally alkyl group.

In some embodiments (e.g., for any structure herein, such as in formula (XII)), the electron-withdrawing moiety is a haloalkyl group. Non-limiting haloalkyl groups include fluoroalkyl (e.g., $—C_xF_yH_z$), perfluoroalkyl (e.g., $—C_xF_y$), chloroalkyl (e.g., $—C_xCl_yH_z$), perchloroalkyl (e.g., $—C_xCl_y$), bromoalkyl (e.g., $—C_xBr_yH_z$), perbromoalkyl (e.g., $—C_xBr_y$), iodoalkyl (e.g., $—C_xI_yH_z$), or periodoalkyl (e.g., $—C_xI_y$). In some embodiments, x is from 1 to 6, y is from 1 to 13, and z is from 0 to 12. In particular embodiments, z=2x+1−y. In other embodiments, x is from 1 to 6, y is from 3 to 13, and z is 0 (e.g., and y=2x+1).

The second structure can include a polyphenylene. For instance, the second structure can include a polymeric unit as follows:

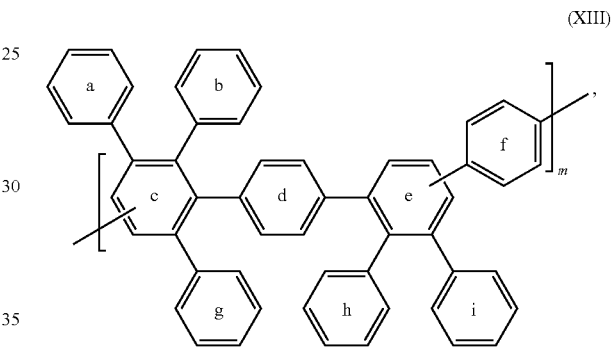

(XIII)

or a salt thereof, wherein:
m is an integer of 1 or more; and
each of rings a-i can be optionally substituted and/or can optionally include an ionizable moiety or an ionic moiety.

In particular embodiments, the ionizable/ionic moiety is present on one or more of rings a, b, f, g, h, or i. In some embodiments, the ionic moiety includes or is $-L^A-X^A$, in which $L^A$ is a linking moiety (e.g., optionally substituted aliphatic, alkylene, heteroaliphatic, or heteroalkylene); and $X^A$ is an acidic moiety, a basic moiety, a multi-ionic moiety, a cationic moiety, or an anionic moiety (e.g., include amino, ammonium cation, heterocyclic cation, or others herein).

The second structure can include a polybenzimidazole that is optionally combined with other arylene-containing monomeric units. In one instance, the second structure can include a polymeric unit selected from the following:

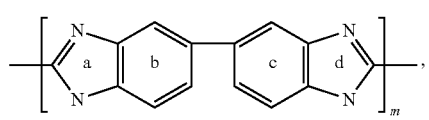

(XIV)

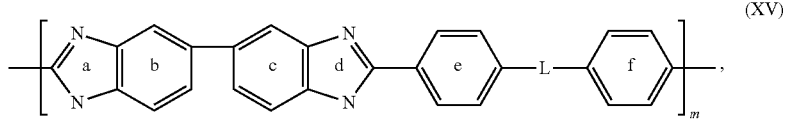

(XV)

or a salt thereof, wherein:
each L is, independently, a linking moiety;
m is an integer of 1 or more; and
each of rings a-f can be optionally substituted and/or can optionally include an ionizable moiety or an ionic moiety.

In particular embodiments, each of the nitrogen atoms on rings a and/or b are substituted with optionally substituted aliphatic, optionally substituted alkyl, optionally substituted aromatic, optionally substituted aryl, an ionizable moiety, or an ionic moiety. In other embodiments, one nitrogen atom in each of rings a and/or b is substituted with optionally substituted aliphatic, optionally substituted alkyl, optionally substituted aromatic, optionally substituted aryl, an ionizable moiety, or an ionic moiety. In particular embodiments, the ionic moiety includes or is -$L^A$-$X^A$, in which $L^A$ is a linking moiety (e.g., optionally substituted aliphatic, alkylene, or heteroaliphatic, such as $C_{1-12}$, $C_{3-12}$, $C_{4-12}$, or $C_{6-12}$ forms thereof); and $X^A$ is an acidic moiety, a basic moiety, a multi-ionic moiety, a cationic moiety, or an anionic moiety (e.g., amino, ammonium cation, heterocyclic cation, or others herein).

In yet other embodiments, the linking moiety (e.g., L) is a covalent bond, —O—, —$SO_2$—, —C(O)—, optionally substituted aliphatic, optionally substituted alkylene (e.g., —$CR_2$—, in which R is H, alkyl, or haloalkyl), optionally substituted haloalkylene, or any other linking moiety described herein.

Other second structures include those having a plurality of arylene groups. In some embodiments, the second structure includes a polymeric unit selected from the following:

moiety or an ionic moiety. In particular embodiments, the ionic moiety includes or is -$L^A$-$X^A$, in which $L^A$ is a linking moiety (e.g., optionally substituted aliphatic, alkylene, heteroaliphatic, or heteroalkylene, such as $C_{1-12}$, $C_{1-6}$, $C_{4-12}$, or $C_{6-12}$ forms thereof); and $X^A$ is an acidic moiety, a basic moiety, a multi-ionic moiety, a cationic moiety, or an anionic moiety (e.g., amino, ammonium cation, heterocyclic cation, or others herein).

In some embodiments, the linking moiety (e.g., $L^1$, $L^2$, $L^3$, or $L^4$) is a covalent bond, —O—, —$SO_2$—, —C(O)—, optionally substituted aliphatic, optionally substituted alkylene (e.g., —$CR_2$—, in which R is H, alkyl, or haloalkyl), optionally substituted haloalkylene, optionally substituted alkyleneoxy, optionally substituted heteroaliphatic, optionally substituted heteroalkylene, or any other linking moiety described herein.

Segments of arylene-containing groups can also be employed. For instance, the second structure can include a polymeric unit as follows:

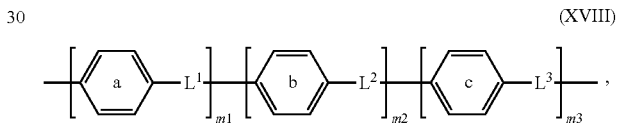

(XVIII)

or a salt thereof, wherein:
each of $L^1$, $L^2$, and $L^3$ is, independently, a linking moiety;
each of m1, m2, and m3 is, independently, an integer of 1 or more; and

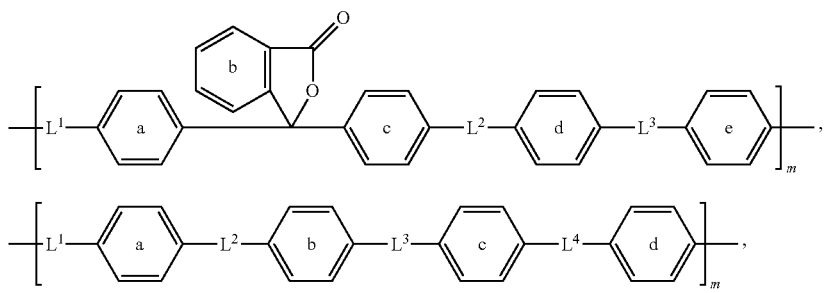

(XVI)

(XVII)

or a salt thereof, wherein:
each of $L^1$, $L^2$, $L^3$, and $L^4$ is, independently, a linking moiety;
m is an integer of 1 or more; and
each of rings a-e can be optionally substituted and/or can optionally include an ionizable moiety or an ionic moiety.

In particular embodiments, at least one of rings a-e is substituted with optionally substituted aliphatic, optionally substituted alkyl, optionally substituted aromatic, optionally substituted aryl, an ionizable moiety, or an ionic moiety. In some embodiments, at least ring a is substituted an ionizable each of rings a-c can be optionally substituted and/or can optionally include an ionizable moiety or an ionic moiety.

In particular embodiments, at least one of rings a-c is substituted with halo, optionally substituted aliphatic, optionally substituted alkyl, optionally substituted aromatic, optionally substituted aryl, an ionizable moiety, or an ionic moiety. In some embodiments, at least one of rings a-c is substituted with both halo and optionally substituted alkyl. In other embodiments, at least one of rings a-c is substituted with both optionally substituted alkyl and an ionizable/ionic moiety. In particular embodiments, the ionic moiety includes or is -L$^A$-X$^A$, in which L$^A$ is a linking moiety (e.g., optionally substituted aliphatic, alkylene, heteroaliphatic, or heteroalkylene, such as C$_{1-12}$, C$_{1-6}$, C$_{4-12}$, or C$_{6-12}$ forms thereof); and X$^A$ is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., L$^1$, L$^2$, or L$^3$) is a covalent bond, —O—, —SO$_2$—, —C(O)—, optionally substituted alkylene (e.g., —CR$_2$—, in which R is H, alkyl, or haloalkyl), or any other linking moiety described herein. In yet other embodiments, each linking moiety (e.g., L$^1$, L$^2$, and L$^3$) is —O—.

The second structure can include halogenated polymeric units. In some embodiments, the second structure includes a polymeric unit as follows:

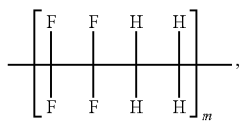

(XIX)

wherein m is an integer of 1 or more. In some embodiments, one or more hydrogen or fluorine atoms can be substituted to include an ionizable moiety or an ionic moiety. In particular embodiments, the ionic moiety includes or is -L$^A$-X$^A$ or -L$^A$-CH(-L$^{A'}$-X$^A$)—, in which each of L$^A$ and L$^{A'}$ is, independently, a linking moiety (e.g., optionally substituted aliphatic, alkylene, heteroaliphatic, heteroalkylene, aromatic, arylene, or —Ar-L-, in which Ar is an optionally substituted arylene and Ak is an optionally substituted alkylene); and X$^A$ is an acidic moiety, a basic moiety, a multi-ionic moiety, a cationic moiety, or an anionic moiety (e.g., amino, ammonium cation, heterocyclic cation, or others herein).

In other embodiments, the second structure includes a polymeric unit selected from the following:

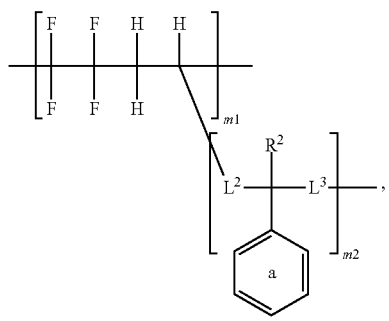

(XX)

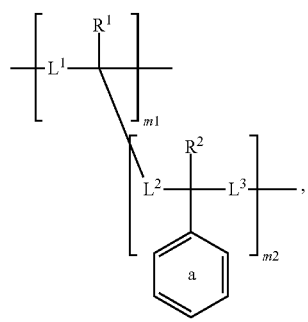

(XXI)

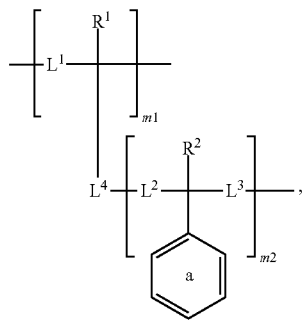

(XXII)

or a salt thereof, wherein:
- each of R$^1$ and R$^2$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
- each of L$^1$, L$^2$, L$^3$, and L$^4$ is, independently, a linking moiety;
- each of m1 and m2 is, independently, an integer of 1 or more; and
- ring a can be optionally substituted and/or can optionally comprise an ionizable moiety or an ionic moiety.

In particular embodiments, ring a is substituted with halo, optionally substituted aliphatic, optionally substituted alkyl, optionally substituted aromatic, optionally substituted aryl, an ionizable moiety, or an ionic moiety. In some embodiments, at least one of ring a is substituted with both optionally substituted alkyl and an ionizable/ionic moiety. In particular embodiments, the ionic moiety includes or is -L$^A$-X$^A$, in which L$^A$ is a linking moiety (e.g., optionally substituted aliphatic, alkylene, heteroaliphatic, or heteroalkylene); and X$^A$ is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., L$^1$, L$^2$, L$^3$, or L$^4$) is a covalent bond, —O—, —SO$_2$—, —C(O)—, optionally substituted alkylene (e.g., —CR$_2$—, in which R is H, alkyl, or haloalkyl), optionally substituted haloalkylene, or any other linking moiety described herein. In particular embodiments, R$^2$ is H; and each of L$^2$ and L$^3$ is, independently, a covalent bond, optionally substituted alkylene, or optionally substituted alkyleneoxy. L$^1$ can be an optionally substituted alkylene or optionally substituted haloalkylene. L$^4$, if present, can be a covalent bond, —O—, optionally substituted alkylene, or optionally substituted alkyleneoxy.

The second structure can include epoxy-derived or vinyl alcohol-derived polymeric units. In some embodiments, the second structure includes a polymeric unit selected from the following:

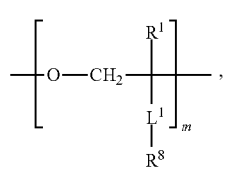

(XXIII)

-continued

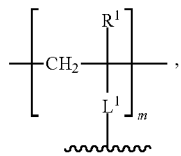
(XXIV)

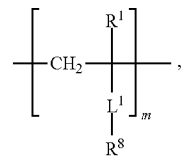
(XXV)

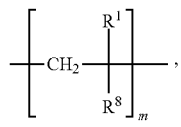
(XXVI)

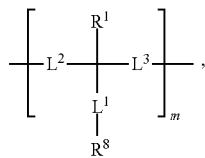
(XXVII)

or a salt thereof, wherein:
each of $R^1$ and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
each of $L^1$, $L^2$, and $L^3$ is, independently, a linking moiety; and
each of m is, independently, an integer of 1 or more;
wherein $R^8$ can optionally comprise an ionizable moiety or an ionic moiety.

In particular embodiments, $R^8$ and/or the ionic moiety includes or is $-L^A$-X in which each of $L^A$ and $L^{A'}$ is, independently, a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety (e.g., amino, ammonium cation, heterocyclic cation, or others herein).

In some embodiments, $R^1$ is H; and $L^1$ includes a covalent bond, —O—, —C(O)—, optionally substituted alkylene, or optionally substituted heteroalkylene. In some embodiments, $R^8$ includes an ionizable moiety or an ionic moiety. In other embodiments, each of $L^2$ and $L^3$ is, independently, a covalent bond, —O—, optionally substituted alkylene, or optionally substituted heteroalkylene.

In some embodiments, the second structure includes a polymeric unit as follows:

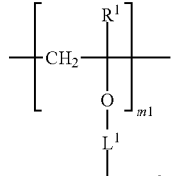
(XXVIII)

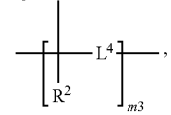

or a salt thereof, wherein:
each of $R^1$ and $R^2$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene;
each of $L^1$, $L^2$, $L^3$, and $L^4$ is, independently, a linking moiety; and
each of m1, m2, and m3 is, independently, an integer of 1 or more.

In particular embodiments, the oxygen atoms present in the second structure can be associated with an alkali dopant (e.g., $K^+$). In other embodiments, the linking moiety (e.g., $L^1$, $L^2$, $L^3$, or $L^4$) is optionally substituted alkylene (e.g., —$CR_2$—, in which R is H, alkyl, or haloalkyl), optionally substituted hydroxyalkylene, or any other linking moiety described herein.

The second structure can include phosphazene-based polymers. In some embodiments, the second structure includes a polymeric unit as follows:

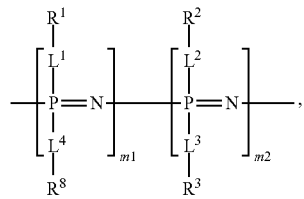
(XXIX)

or a salt thereof, wherein:
each of $R^1$, $R^2$, $R^3$, and $R^8$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene;
each of $L^1$, $L^2$, $L^3$, and $L^4$ is, independently, a linking moiety; and
each of m1 and m2 is, independently, an integer of 1 or more;
wherein $R^8$ can optionally comprise an ionizable moiety or an ionic moiety.

In particular embodiments, $R^8$ and/or the ionic moiety includes or is $-L^A$-X in which $L^A$ is a linking moiety (e.g., optionally substituted aliphatic, alkylene, heteroaliphatic, heteroalkylene, aromatic, or arylene); and $X^A$ is an acidic moiety, a basic moiety, a multi-ionic moiety, a cationic moiety, or an anionic moiety (e.g., heterocyclic cation, phosphonium cation, phosphazenium cation, or others herein).

In some embodiments, each of R¹, R², and R³ is optionally substituted aromatic, optionally substituted aryl, optionally substituted aryloxy, or optionally substituted arylalkylene. In other embodiments, the linking moiety (e.g., L¹, L², L³, or L⁴) is a covalent bond, —O—, —SO₂—, —C(O)—, optionally substituted alkylene (e.g., —CR₂—, in which R is H, alkyl, or haloalkyl), optionally substituted haloalkylene, or any other linking moiety described herein.

The second structure can include polyimide-based polymers. In some embodiments, the second structure includes a polymeric unit selected from the following:

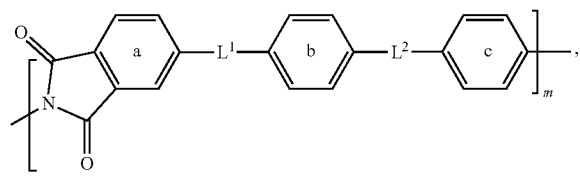
(XXX)

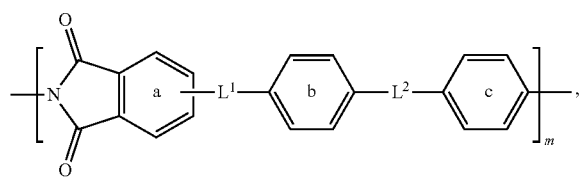
(XXXI)

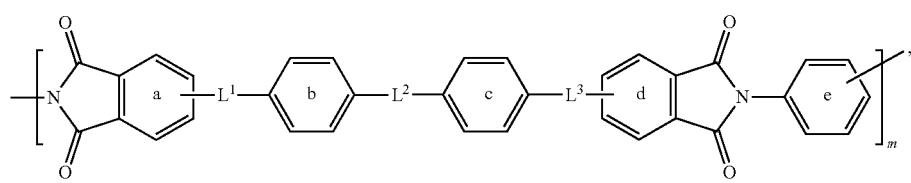
(XXXII)

and a salt thereof, wherein:
each of L¹, L², and L³ is, independently, a linking moiety;
m is an integer of 1 or more; and
each of rings a-e can be optionally substituted and/or can optionally include an ionizable moiety or an ionic moiety.

In particular embodiments, at least one of rings a-e is substituted with optionally substituted aliphatic, optionally substituted alkyl, optionally substituted aromatic, optionally substituted aryl, an ionizable moiety, or an ionic moiety. In some embodiments, at least ring b or c is substituted an ionizable moiety or an ionic moiety. In particular embodiments, the ionic moiety includes or is -L^A-X^A, in which L^A is a linking moiety (e.g., optionally substituted aliphatic, alkylene, heteroaliphatic, or heteroalkylene, such as C₁₋₁₂, C₁₋₆, C₄₋₁₂, or C₆₋₁₂ forms thereof); and X^A is an acidic moiety, a basic moiety, a multi-ionic moiety, a cationic moiety, or an anionic moiety (e.g., amino, ammonium cation, heterocyclic cation, or others herein).

In other embodiments, the linking moiety (e.g., L¹, L², or L³) is a covalent bond, —O—, —SO₂—, —C(O)—, optionally substituted aliphatic, optionally substituted alkylene (e.g., —CR₂—, in which R is H, alkyl, or haloalkyl), optionally substituted haloalkylene, optionally substituted alkyleneoxy, optionally substituted heteroaliphatic, optionally substituted heteroalkylene, or any other linking moiety described herein.

The second structure can include polyether. Non-limiting second structure can include a polymeric unit as follows:

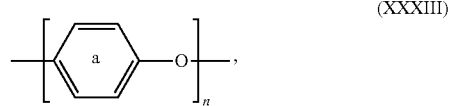
(XXXIII)

wherein:
n is an integer of 1 or more; and
ring a can be optionally substituted and/or can optionally include an ionizable moiety or an ionic moiety. Non-limiting substituents for ring a include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

The second structure can be aromatic. Non-limiting second structure can include a polymeric unit as follows:

(XXXIV)

in which Ar is an optionally substituted arylene or optionally substituted aromatic; Ak is an optionally substituted alkylene, optionally substituted haloalkylene, optionally substituted aliphatic, optionally substituted heteroalkylene, or optionally substituted heteroaliphatic; L is a linking moiety (e.g., any described herein); and Ar, L, or Ak can be optionally substituted with one or more ionizable or ionic moieties. Non-limiting examples of Ar include, e.g., phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), triphenylene, diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like, as well as others described herein. Non-limiting substituents for Ar include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

For any second structure described herein, each of m, m1, m2, and m3 is, independently, an integer of 1 or more. In any embodiment herein (e.g., for a second structure), the linking moiety (e.g., L, $L^1$, $L^2$, $L^3$, and $L^4$) is or comprises a covalent bond, —O—, —$SO_2$—, —$NR^{N1}$—, —C(O)—, optionally substituted aliphatic, optionally substituted alkylene (e.g., —$CR_2$—, in which R is H, alkyl, or haloalkyl), optionally substituted haloalkylene, optionally substituted hydroxyalkylene, optionally substituted alkyleneoxy, optionally substituted heteroaliphatic, optionally substituted heteroalkylene, optionally substituted aromatic, optionally substituted arylene, optionally substituted aryleneoxy, optionally substituted heterocycle, or optionally substituted heterocyclyldiyl.

For any first or second structure described herein, one or more haloalkyl groups may be present (e.g., attached to the backbone group, an aryl group, or another portion of the structure). Non-limiting haloalkyl groups include fluoroalkyl (e.g., —$C_xF_yH_z$), perfluoroalkyl (e.g., —$C_xF_y$), chloroalkyl (e.g., —$C_xCl_yH_z$), perchloroalkyl (e.g., —$C_xCl_y$), bromoalkyl (e.g., —$C_xBr_yH_z$), perbromoalkyl (e.g., —$C_xBr_y$), iodoalkyl (e.g., —$C_xI_yH_z$), or periodoalkyl (e.g., —$C_xI_y$). In some embodiments, x is from 1 to 6, y is from 1 to 13, and z is from 0 to 12. In particular embodiments, $z=2x+1-y$. In other embodiments, x is from 1 to 6, y is from 3 to 13, and z is 0 (e.g., and $y=2x+1$).

Further Polymeric Units

The compositions, first structure(s), and second structure(s) herein can include two or more polymeric units, which are attached directly or indirectly (e.g., by way of a linking moiety) to each other. The polymeric unit can be a homopolymer, a copolymer, a block copolymer, a polymeric blend, or other useful combinations of repeating monomeric units. The following provides further monomeric and polymeric units that can be employed within the first and/or second structures.

Monomeric units can include an optionally substituted aliphatic group, an optionally substituted aromatic group, and combinations thereof. Non-limiting monomeric units can include optionally substituted arylene, optionally substituted aryleneoxy, optionally substituted alkylene, or combinations thereof, such as optionally substituted (aryl)(alkyl)ene (e.g., -Ak-Ar— or -Ak-Ar-Ak- or —Ar-Ak-, in which Ar is an optionally substituted arylene and Ak is an optionally substituted alkylene).

Yet other monomeric units can include:

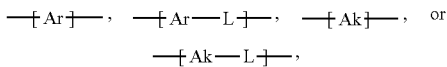

in which Ar is an optionally substituted arylene or optionally substituted aromatic; Ak is an optionally substituted alkylene or optionally substituted haloalkylene, optionally substituted heteroalkylene, optionally substituted aliphatic, or optionally substituted heteroaliphatic; and L is a linking moiety (e.g., any described herein) or can be —C($R^7$)($R^8$)—. One or more monomeric units can be optionally substituted with one or more ionizable or ionic moieties (e.g., as described herein). In particular embodiments, at least one monomeric unit is substituted with one or more ionizable or ionic moieties.

One or more monomeric units can be combined to form a polymeric unit. Non-limiting polymeric units include any of the following:

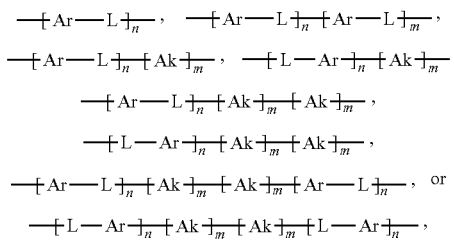

in which Ar is an optionally substituted arylene or an optionally substituted aromatic, Ak is an optionally substituted alkylene or optionally substituted aliphatic, L is a linking moiety (e.g., any described herein), each n is independently an integer of 1 or more, and each m is independently 0 or an integer of 1 or more. Any number and type of monomeric units can be combined to form the polymeric unit.

In particular embodiments, the polymeric unit includes more than one arylene group. For instance, in a polymeric unit having this structure:

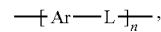

n can be greater than 1 and/or Ar can include two or more aromatic or arylene groups. The presence of such aromatic groups may be used to build linear chains within the composition.

In other embodiments, L is an optionally substituted $C_{1-6}$ aliphatic, optionally substituted $C_{1-6}$ alkylene, optionally substituted $C_{1-6}$ heteroalkylene. The use of short linkers could provide more extensive polymeric networks, as shorter linkers could minimize self-cyclization reactions.

The polymeric unit can include one or more substitutions to a ring portion of the unit (e.g., as provided by an aromatic or arylene group) or to a linear portion (e.g., as provided by an aliphatic or alkylene group). Non-limiting substitutions can include lower unsubstituted alkyl (e.g., $C_{1-6}$ alkyl), lower substituted alkyl (e.g., optionally substituted $C_{1-6}$ alkyl), lower haloalkyl (e.g., $C_{1-6}$ haloalkyl), halo (e.g., F, Cl, Br, or I), unsubstituted aryl (e.g., phenyl), halo-substituted aryl (e.g., 4-fluoro-phenyl), substituted aryl (e.g., substituted phenyl), and others.

In some embodiments of the polymeric unit, L is a covalent bond, —O—, —$NR^{N1}$—, —C(O)—, —$SO_2$—, optionally substituted alkylene (e.g., —$CH_2$— or —$C(CH_3)_2$—), optionally substituted alkyleneoxy, optionally substituted haloalkylene (e.g., —$CF_2$— or —$C(CF_3)_2$—), optionally substituted heteroalkylene, optionally substituted arylene, optionally substituted aryleneoxy, optionally substituted heterocyclyldiyl, —$SO_2$—$NR^{N1}$-Ak-, —(O-Ak)$_{L1}$-$SO_2$—$NR^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, as well as combinations thereof. In particular embodiments, Ak is an optionally substituted alkylene or optionally substituted haloalkylene; $R^{N1}$ is H or optionally substituted alkyl or optionally substituted aryl; Ar is an optionally substituted arylene; and L1 is an integer from 1 to 3.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties including cationic, anionic, and multi-ionic group, as described herein.

Yet other polymeric units can include poly(benzimidazole) (PBI), polyphenylene (PP), polyimide (PI), poly(ethyleneimine) (PEI), sulfonated polyimide (SPI), polysulfone (PSF), sulfonated polysulfone (SPSF), poly(ether ether ketone) (PEEK), PEEK with cardo groups (PEEK-WC), polyethersulfone (PES), sulfonated polyethersulfone (SPES), sulfonated poly(ether ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly(epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly(phosphazene), poly(aryloxyphosphazene), polyetherimide, as well as combinations thereof.

Crosslinkers

Further crosslinking within the material can be promoted by use of crosslinking reagents. For instance, the composition can include polymeric units, and a crosslinking reagent can be used to provide crosslinking between polymeric units. For instance, if the polymeric units (P1 and P2) include a leaving group, then a diamine crosslinking reagent (e.g., $H_2N$-Ak-$NH_2$) can be used to react with the polymeric units by displacing the leaving group and forming an amino-containing crosslinker within the composition (e.g., thereby forming P1-NH-Ak-NH—P2). Such crosslinkers can be formed between a combination of first and second structures (e.g., between two first structures, between two second structures, between a first and a second structure, etc.). Crosslinkers can be introduced by forming a polymer composition and then exposing the composition to a crosslinking reagent to form crosslinker.

In some instances, the crosslinking reagent is a multivalent amine, such as diamine, triamine, tetraamine, pentaamine, etc. Non-limiting amine-containing crosslinking reagents can include:

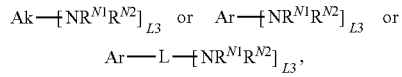

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and each of $R^{N1}$ and $R^{N2}$ is, independently, H or optionally substituted alkyl. Yet further examples of amine-containing linkers include 1,6-diaminohexane (hexanediamine), 1,4-diaminobutane, 1,8-diaminooctane, propane-1,2,3-triamine, [1,1':3',1''-terphenyl]-4,4'',5'-triamine, and others.

Depending on the functional group present in the material, the crosslinking reagent can include a nucleophilic group (e.g., an amine or a hydroxyl) or an electrophilic group (e.g., a carbonyl). Thus, non-limiting crosslinking reagents can include amine-containing reagents, hydroxyl-containing reagents, carboxylic acid-containing reagents, acyl halide-containing reagents, or others. Further crosslinking reagents can include:

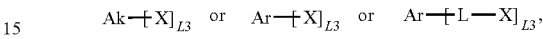

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and X is halo, hydroxyl, optionally substituted amino, hydroxyl, carboxyl, acyl halide (e.g., —C(O)—R, in which R is halo), carboxyaldehyde (e.g., —C(O)H), or optionally substituted alkyl. Non-limiting crosslinking reagents can include terephthalaldehyde, glutaraldehyde, ortho-xylene, para-xylene, or meta-xylene.

After reacting the crosslinking reagent, the composition can include one or more crosslinkers within the composition. If the crosslinking reagent is bivalent, then a crosslinker can be present between two of any combination of first structure(s), second structure(s), polymeric units, and ionizable/ionic moieties (e.g., between two polymeric units, between two ionizable/ionic moieties, etc.). If the crosslinking reagent is trivalent or of higher n valency, then the crosslinker can be present between any n number of polymeric units, linking moieties, ionizable moieties, and/or ionic moieties. Non-limiting crosslinkers present in the composition include those formed after reacting a crosslinking reagent. Thus, examples of crosslinkers can include:

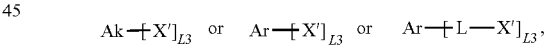

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and X' is a reacted form of X. In some embodiments, X' is absent, —O—, —$NR^{N1}$—, —C(O)—, or -Ak-, in which $R^{N1}$ is H or optionally substituted alkyl, and Ak is optionally substituted alkylene, optionally substituted heteroalkylene, optionally substituted aliphatic, or optionally substituted heteroaliphatic.

Ionizable and Ionic Moieties

The compositions herein can include one or more ionizable or ionic moieties. Such moieties can include an anionic or cationic charge, such as in an ionic moiety. Alternatively, an ionizable moiety includes a functional group that can be readily converted into an ionic moiety, such as an ionizable moiety of a carboxy group (—$CO_2H$) that can be readily deprotonated to form a carboxylate anion ($-CO_2^-$). As used herein, the terms "ionizable" and "ionic" are used interchangeably.

Ionizable or ionic moieties can be provided in the composition in any useful way. In one embodiment, at least one of the first and second structures, independently, includes one or more ionizable/ionic moieties. In another embodiment, both of the first and second structures, independently, include one or more ionizable/ionic moieties.

Moieties can be characterized as an acidic moiety (e.g., a moiety can be deprotonated or can carry a negative charge) or a basic moiety (e.g., a moiety that can be protonated or carry a positive charge). In particular embodiments, the moiety can be a multi-ionic moiety, which can include a plurality of acidic moieties, a plurality of basic moieties, or a combination thereof (e.g., such as in a zwitterionic moiety). Further moieties can include a zwitterionic moiety, such as those including an anionic moiety (e.g., hydroxyl or a deprotonated hydroxyl) and a cationic moiety (e.g., ammonium).

The ionic moieties herein can be connected to the parent structure by way of one or more linking moieties. Furthermore, a single ionic moiety can be extended from a single linking moiety, or a plurality of ionic moieties can have one or more linking moieties therebetween.

For instance, the ionic moiety can have any of the following structures: $-L^A-X^A$ or $-L^A-(L^{A'}-X^A)_{L2}$ or $-L^A-(X^A-L^{A'}-X^A)_{L2}-L^A-X^A-L^{A'}-X^{A'}-L^{A''}-X^{A''}-$, in which each $L^A$, $L^{A'}$ and $L^{A''}-$ is a linking moiety; each $X^A$, $X^{A'}$, and $X^{A''}$ includes, independently, an acidic moiety, a basic moiety, or a multi-ionic moiety; and L2 is an integer of 1, 2, 3, or more (e.g., from 1 to 20).

Non-limiting linking moieties (e.g., for $L^A$, $L^{A'}$, and $L^{A''}$) include a covalent bond, a spirocyclic bond, $-O-$, $-NR^{N1}-$, $-SO_2-NR^{N1}-Ak-$, $-(O-Ak)_{L1}-SO_2-NR^{N1}-Ak-$, $-Ak-$, $-Ak-(O-Ak)_{L1}-$, $-(O-Ak)_{L1}-$, $-(Ak-O)_{L1}-$, $-C(O)O-Ak-$, $-Ar-$, or $-Ar-O-$, in which Ak is an optionally substituted alkylene or optionally substituted haloalkylene, $R^{N1}$ is H or optionally substituted alkyl, Ar is an optionally substituted arylene, and L1 is an integer from 1 to 3. In particular embodiments, $L^A$ is $-(CH_2)_{L1}-$, $-O(CH_2)_{L1}-$, $-(CF_2)_{L1}-$, $-O(CF_2)_{L1}-$, or $-S(CF_2)_{L1}-$, in which L1 is an integer from 1 to 3.

In some instances, a linker is attached to two or more ionic moieties. In some embodiments, the ionic moiety can be $-L^A(L^{A'}-X^A)_{L2}$, in which $L^A$ and $L^{A'}$ are linking moieties and $X^A$ is an acidic moiety, a basic moiety, or a multi-ionic moiety. In one instance, $L^A$ provides one, two, or three linkages. Non-limiting $L^A$ can be $-CX_2(CX_2-)-$, $-CX(CX_2-)_2$, or $-C(CX_2-)_3$, in which X is H, alkyl, or halo. $L^{A'}$ can then provide an attachment point to the ionic moiety. For instance, $L^{A1'}$ can be $-(CH_2)_{L1}-$, $-O(CH_2)_{L1}-$, $-(CF_2)_{L1}-$, $-O(CF_2)_{L1}-$, or $-S(CF_2)_{L1}-$, in which L1 is an integer from 1 to 3; and $X^A$ is any ionizable or ionic moiety described herein.

Non-limiting ionic moieties include carboxy ($-CO_2H$), carboxylate anion ($-CO_2^-$), a guanidinium cation (e.g., $-NR^{N1}-C(=NR^{N2}R^{N3})(NR^{N4}R^{N5})$ or $>N=C(NR^{N2}R^{N3})(R^{N4}R^{N5})$), or a salt form thereof. Non-limiting examples of each of $R^{N1}$, $R^{N2}$, $R^{N3}$, $R^{N4}$, and $R^{N5}$ is, independently, H, optionally substituted alkyl, optionally substituted aryl, or optionally substituted amino; or $R^{N1}$ and $R^{N2}$, $R^{N2}$ and $R^{N3}$, $R^{N3}$ and $R^{N4}$, $R^{N1}$ and $R^{N2}$, or $R^{N1}$ and $R^{N4}$ taken together with the nitrogen atom to which each are attached, form an optionally substituted heterocyclyl, heterocycle, or heterocyclic cation, as defined herein.

Some ionic moieties can include one or more sulfur atoms. Non-limiting sulfur-containing moieties include sulfo ($-SO_2OH$), sulfonate anion ($-SO_2O^-$), sulfonium cation (e.g., $-SR^{S1}R^{S2}$), sulfate (e.g., $-O-S(=O)_2(OR^{S1})$), sulfate anion ($-O-S(=O)_2O^-$), or a salt form thereof. Non-limiting examples of each of $R^{S1}$ and $R^{S2}$ is, independently, H, optionally substituted alkyl, optionally substituted aryl, or optionally substituted amino; or $R^{S1}$ and $R^{S2}$, taken together with the sulfur atom to which each are attached, form an optionally substituted heterocyclyl, heterocycle, or heterocyclic cation, as defined herein; or $R^{S1}$ and $R^{S2}$, taken together, form an optionally substituted alkylene or heteroalkylene (e.g., as described herein).

Other ionic moieties can include one or more phosphorous atoms. Non-limiting phosphorous-containing moieties include phosphono (e.g., $-P(=O)(OH)_2$), phosphonate anion (e.g., $-P(=O)(O^-)_2$ or $-P(=O)(OH)(O^-)$), phosphate (e.g., $-O-P(=O)(OR^{P1})(OR^{P2})$ or $-O-[P(=O)(OR^{P1})-O]_{P3}-R^{P2}$), phosphate anion (e.g., $-O-P(=O)(OR^{P1})(O^-)$ or $-O-P(=O)(O^-)_2$), phosphonium cation (e.g., $-P^+R^{P1}R^{P2}R^{P3}$), phosphazenium cation (e.g., $-P^+(=NR^{N1}R^{N2})R^{P1}R^{P2}$, in which each of $R^{N1}$ and $R^{N2}$ is, independently, optionally substituted alkyl or optionally substituted aryl), or a salt form thereof. Non-limiting examples of each of $R^{P1}$, $R^{P2}$, and $R^{P3}$ is, independently, H, optionally substituted alkyl, optionally substituted aryl, or optionally substituted amino; or $R^{P1}$ and $R^{P2}$, taken together with the phosphorous atom to which each are attached, form an optionally substituted heterocyclyl, heterocycle, or heterocyclic cation, as defined herein; or $R^{P1}$ and $R^{P2}$ and $R^{P3}$, taken together with the phosphorous atom to which each are attached, form an optionally substituted heterocyclyl, heterocycle, or heterocyclic cation, as defined herein; or a single, double, or non-localized pi bond, provided that a combination of bonds result in a tetravalent phosphorous; or wherein two of $R^{P1}$, $R^{P2}$, and $R^{P3}$, taken together, form an optionally substituted alkylene or heteroalkylene (e.g., as described herein).

Yet other ionic moieties can include one or more nitrogen atoms. Non-limiting nitrogen-containing moieties include amino (e.g., $-NR^{N1}R^{N2}$), ammonium cation (e.g., $-N^+R^{N1}R^{N2}R^{N3}$ or $-N^+R^{N1}R^{N2}-$), heterocyclic cation (e.g., piperidinium, 1,1-dialkyl-piperidinium, pyrrolidinium, 1,1-dialkyl-pyrrolidinium, pyridinium, 1-alkylpyridinium, (1,4-diazabicyclo[2.2.2]octan-1-yl) (DABCO), 4-alkyl-(1,4-diazabicyclo[2.2.2]octan-1-yl), etc.), or a salt form thereof. Non-limiting examples of each of $R^{N1}$, $R^{N2}$, and $R^{N3}$ is, independently, H, optionally substituted alkyl, optionally substituted cycloalkyl, or optionally substituted aryl; or $R^{N1}$ and $R^{N2}$, taken together with the nitrogen atom to which each are attached, form an optionally substituted heterocyclyl, heterocycle, or heterocyclic cation, as defined herein; or $R^{N1}$ and $R^{N2}$ and $R^{N3}$, taken together with the nitrogen atom to which each are attached, form an optionally substituted heterocyclyl, heterocycle, or heterocyclic cation, as defined herein; or wherein two of $R^{N1}$, $R^{N2}$, and $R^{N3}$, taken together, form an optionally substituted alkylene or heteroalkylene (e.g., as described herein); or a single, double, or non-localized pi bond, provided that a combination of bonds result in a tetravalent nitrogen.

Yet other heterocyclic cations include piperidinium cations, such as dimethyl piperidinium, methyl piperidinium (e.g., 1-methyl-piperidinium-1-yl), ethylmethyl piperidinium, ethyl piperidinium (e.g., 1-ethyl-piperidinium-1-yl), propylmethyl piperidinium, propyl piperidinium (e.g., 1-propyl-piperidinium-1-yl), butylmethyl piperidinium, butyl piperidinium (e.g., 1-butyl-piperidinium-1-yl), diethyl piperidinium, propylethyl piperidinium, butylethyl piperidinium, butylpropyl piperidinium, or spiro-1,1'-bipiperidinium; pyrrolidinium cations, such as dimethyl pyrrolidinium, ethylmethyl pyrrolidinium, propylmethyl pyrrolidinium, butylmethyl pyrrolidinium, diethyl pyrrolidinium, propylethyl pyrrolidinium, butylethyl pyrrolidinium, butylpropyl pyrrolidinium, spiro-1,1'-bipyrrolidinium, spiro-1-pyrrolidinium-1'-piperidinium, or spiro-1-pyrrolidinium-1'-morpholinium; pyrazolium cations, such as dimethyl pyrazolium, ethylmethyl pyrazolium, or butylmethyl pyrazolium; imidazolium cations, such as 3-alkyl imidazolium, 1,2-dialkylimidazolium, such as 1,2-dimethyl-1H-imidazol-3-ium; those having one nitrogen and five or six carbon ring members, such as pyridinium, 2-methylpyridinium, 3-methylpyridinium, 4-methylpyridinium, 2,6-dimethylpyridinium, quinolinium, isoquinolinium, acridinium, or phenanthridinium; those having two nitrogen and four carbon ring members, such as pyridazinium, pyrimidinium, pyrazinium or *phenazinium*; or those having one nitrogen and one oxygen ring member, such as morpholinium, 2-methyl morpholinium, or 3-methyl morpholinium.

Any of the heterocyclic cations can be attached to the polymer either directly or indirectly (e.g., by way of a linker or a linking moiety). Furthermore, any atom within the heterocyclic cation (e.g., within the ring of the heterocyclic cation) can be attached to the polymer. For instance, taking piperidinium as the non-limiting heterocyclic cation, such a cation can be attached to the polymer by way of the cationic center or by way of an atom within the ring, and such attachments can be direct by way of a covalent bond or indirect by way of $L^A$ (a linking moiety, such as any described herein):

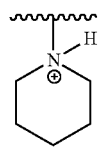

(piperidin-1-ium-1-yl),

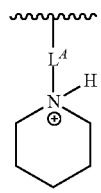

(piperidin-1-ium-1-yl attached by way of $L^A$),

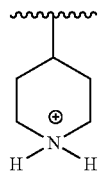

(piperidin-1-ium-4-yl), or

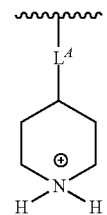

(piperidin-1-ium-4-yl attached by way of $L^A$). In addition to attachment at the 1- or 4-position of piperidin-1-ium, other attachment sites can be implemented at any point on the ring.

In some embodiments, the heterocyclic cations is or comprises a piperidinium cation or an azepanium cation. In one embodiments, the heterocyclic cation includes the following structure:

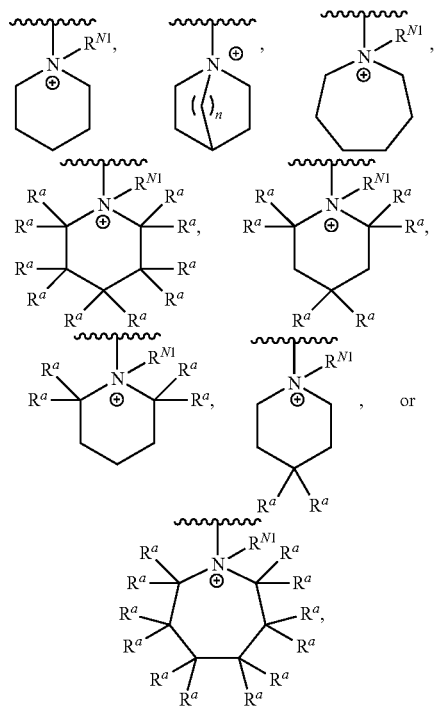

herein:
$R^{N1}$ is H, optionally substituted aliphatic, optionally substituted alkyl, optionally substituted heteroaliphatic, optionally substituted heteroalkyl, optionally substituted aromatic, or optionally substituted aryl;
n is 1, 2, 3, 4, or 5; and
each $R^a$ is, independently, H, optionally substituted aliphatic, optionally substituted alkyl, optionally substituted heteroaliphatic, optionally substituted heteroalkyl, optionally substituted aromatic, optionally substituted aryl, an ionizable moiety, or an ionic moiety;
wherein $R^{N1}$ and at least one $R^a$ can be taken together to form an optionally substituted cyclic group or an optionally substituted heterocyclic group, and/or
wherein at least two $R^a$ groups can be taken together to form an optionally substituted cyclic group or an optionally substituted heterocyclic group.

In one instance, $R^{N1}$ and $R^a$ can be taken together to form an optionally substituted alkylene group or an optionally substituted heteroalkylene group. In particular embodiments, the alkylene or heteroalkylene group is substituted, independently, with one or more ionizable moieties or ionic moieties (e.g., any described herein).

In another instance, at least one $R^a$ is optionally substituted aliphatic or optionally substituted alkyl. Non-limiting examples of $R^a$ include methyl, ethyl, n-propyl, isopropyl, n-butyl, sec-butyl, isobutyl, tert-butyl, n-pentyl, sec-pentyl, isopentyl, tert-pentyl, neopentyl, 3-pentyl, sec-isopentyl, and the like. In other embodiments, the heterocyclic cation has a ring having one, two, three, four, five, or six $R^a$ groups that is not H. In yet other embodiments, the heterocyclic cation has a ring having one, two, three, four, five, or six $R^a$ groups that is, independently, optionally substituted aliphatic or optionally substituted alkyl. Without wishing to be limited by mechanism, the presence of bulky substituents may provide more stable cations. In other embodiments, any ionizable moiety or ionic moiety herein can be substituted with one or more $R^a$ groups.

Yet other non-limiting piperidinium cations or azepanium cations include any of the following:

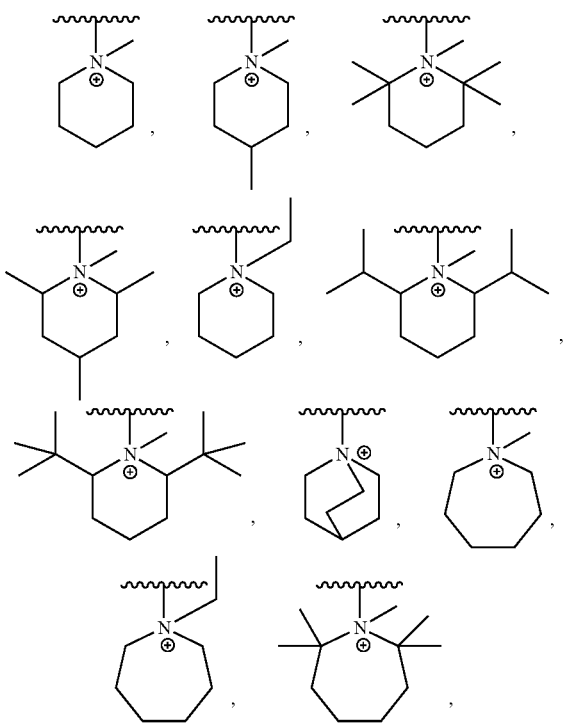

and the like.

Other moieties can include -$L^A$-$L^{A'}$-$X^A$, in which $L^A$ is or includes optionally substituted aromatic, optionally substituted arylene, optionally substituted heterocycle, or optionally substituted heterocyclyl (e.g., optionally substituted phenylene or optionally substituted aryleneoxy); $L^{A'}$ is or includes optionally substituted aliphatic, optionally substituted alkylene, optionally substituted heteroaliphatic, or optionally substituted heteroalkylene (e.g., optionally substituted $C_{1-6}$ alkylene or optionally substituted $C_{1-6}$ heteroalkylene); and $X^A$ is or includes an ionic moiety including one or more nitrogen atoms. Non-limiting ionic moieties include pyridinium (e.g., pyridinum-1-yl, Pyrd; alkylpyridinium, such as 2-methylpyridinum-1-yl, 2MPyrd; or aromatic pyridinium, such as 1-benzylpyridinium-4-yl), imidazolium (e.g., 1,2-dialkylimidazolium-3-yl, including 1,2-dimethylimidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2]octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl) ammonium, such as dimethyl(phenylhexyl)ammonium-1-yl), and piperidinium (e.g., aliphatic piperidinium, such as 1-methyl-piperidinium-1-yl (Mepip), 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Yet other moieties can include -$L^A$-$X^A$, in which $L^A$ is a covalent bond (including a spirocyclic bond), optionally substituted aliphatic, optionally substituted alkylene, optionally substituted heteroaliphatic, optionally substituted heteroalkylene, optionally substituted aromatic, optionally substituted arylene, optionally substituted heterocycle, or optionally substituted heterocyclyl (e.g., optionally substituted $C_{1-6}$ alkylene, optionally substituted $C_{1-6}$ heteroalkylene, optionally substituted phenylene, or optionally substituted aryleneoxy); and $X^A$ is or includes an ionic moiety including one or more nitrogen atoms. Non-limiting ionic moieties include pyridinium (e.g., pyridinum-1-yl, Pyrd; alkylpyridinium, such as 2-methylpyridinum-1-yl, 2MPyrd; or aromatic pyridinium, such as 1-benzylpyridinium-4-yl), imidazolium (e.g., 1,2-dialkylimidazolium-3-yl, including 1,2-dimethylimidazolium-3-yl (1,2-DMim)), 4-aza-1-azoniabicyclo[2.2.2]octan-1-yl (or 1,4-diazabicyclo[2.2.2]octane (DABCO) cation), 4-alkyl-1,4-diazoniabicyclo[2.2.2]octan-1-yl (e.g., 4-methyl-1,4-diazoniabicyclo[2.2.2]octan-1-yl (MAABCO) cation), 4-benzyl-1,4-diazoniabicyclo[2.2.2]octan-1-yl (or 1-benzyl-1,4-diazoniabicyclo[2.2.2]octane (BABCO) cation), aliphatic ammonium (e.g., hexyldimethylammonium-1-yl (DMHA), dicyclohexylmethylammonium-1-yl (MCH), methyldi-n-propylammonium-1-yl (MnPr), trimethylammonium-1-yl (TMA), or triethylammonium-1-yl (TEA)), aromatic ammonium (e.g., dialkylbenzylammonium, such as benzyldimethylammonium-1-yl, benzyldiethylammonium-1-yl, benzylhexylmethylammonium-1-yl, benzyldi-n-propylammonium-1-yl, benzylmethyl-n-propylammonium-1-yl, benzyldicyclohexylammonium-1-yl, benzylcyclohexylmethylammonium-1-yl, (3-nitrobenzyl)dimethylammonium-1-yl, or (3-methoxybenzyl)dimethylammonium-1-yl; or dialkyl(phenylalkyl) ammonium, such as dimethyl(phenylhexyl)ammonium-1-yl), and piperidinium (e.g., aliphatic piperidinium, such as 1-methyl-piperidinium-1-yl, 1,2-dialkyl-piperidinium, or 1,2-dimethyl-piperidinium-4-yl (DMP); or aromatic piperidinium, such as or 1-benzyl-1-methyl-piperidinium-4-yl (BMP), as well as any piperidinium cation described herein).

Such moieties can be associated with one or more counterions. For instance, a cationic moiety can be associated with one or more anionic counterions, and an anionic moiety can be associated with one or more cationic counterions.

Arylene Groups

Particular moieties herein (e.g., polymeric units, linking moieties, and others) can include an optionally substituted arylene. Such arylene groups include any multivalent (e.g., bivalent, trivalent, tetravalent, etc.) groups having one or more aromatic groups, which can include heteroaromatic groups. Non-limiting aromatic groups can include any of the following:

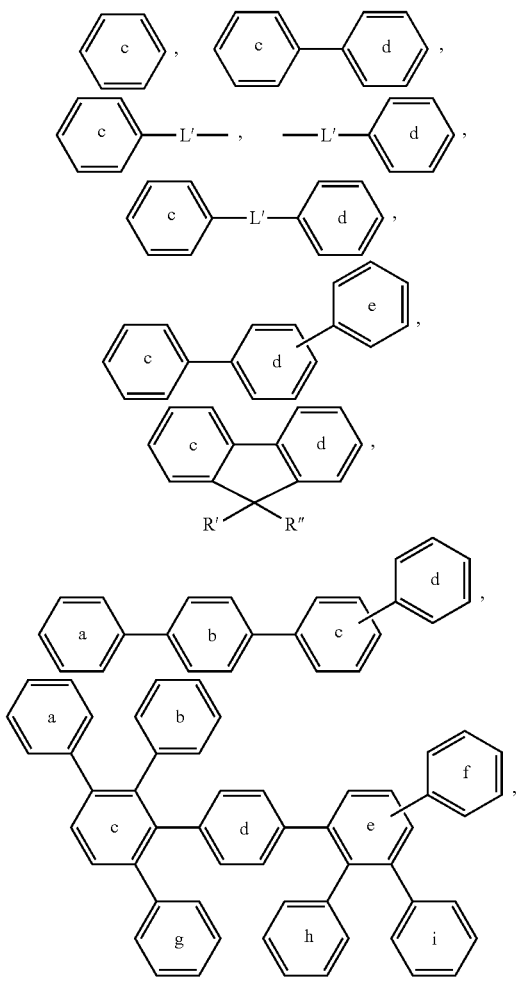

in which each of rings a-i can be optionally substituted (e.g., with any optional substituents described herein for alkyl or aryl; or with any ionic moiety described herein); L' is a linking moiety (e.g., any described herein); and each of R' and R" is, independently, H, optionally substituted alkyl, optionally substituted aryl, or an ionic moiety, as described herein. Non-limiting substituents for rings a-i include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl. In some embodiments, L' is a covalent bond, —O—, —NR$^{N1}$—, —C(O)—, optionally substituted alkylene, optionally substituted heteroalkylene, or optionally substituted arylene.

Yet other non-limiting arylene can include phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), 9,10-anthracene, naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like.

Non-limiting examples of linking moieties for arylene include any herein. In some embodiments, L' is substituted one or more ionizable or ionic moieties described herein. In particular embodiments, L' is optionally substituted alkylene. Non-limiting substitutions for L' can include -L$^A$-X$^A$, in which L$^A$ is a linking moiety (e.g., any described herein, such as, -Ak-, —O-Ak-, -Ak-O—, —Ar—, —O—Ar—, or —Ar—O—, in which Ak is optionally substituted alkylene and Ar is optionally substituted arylene), and X$^A$ is an acidic moiety, a basic moiety, or a multi-ionic moiety.

Linking Moieties

Particular chemical functionalities herein can include a linking moiety, either between the parent structure and another moiety (e.g., an ionic moiety) or between two (or more) other moieties. Linking moieties (e.g., L, L$^1$, L$^2$, L$^3$, L$^4$, L$^A$, L$^{A'}$ L$^{A''}$, L$^B$L$^{B''}$, L$^{8A}$, and others) can be any useful multivalent group, such as multivalent forms of optionally substituted aliphatic, optionally substituted heteroaliphatic, optionally substituted aromatic, or optionally substituted heteroaromatic.

Non-limiting linking moieties (e.g., L) include a covalent bond, a spirocyclic bond, —O—, —NR$^{N1}$—, —C(O)—, —C(O)O—, —OC(O)—, —SO$_2$—, optionally substituted alkylene, optionally substituted alkyleneoxy, optionally substituted haloalkylene, optionally substituted heteroalkylene, optionally substituted arylene, optionally substituted aryleneoxy, optionally substituted heterocyclyldiyl, —SO$_2$—NR$^{N1}$-Ak-, —(O-Ak)$_{L1}$-SO$_2$—NR$^{N1}$-Ak-, -Ak-, -Ak-(O-Ak)$_{L1}$-, —(O-Ak)$_{L1}$-, -(Ak-O)$_{L1}$—, —C(O)O-Ak-, —Ar—, or —Ar—O—, as well as combinations thereof. In particular embodiments, Ak is an optionally substituted aliphatic, optionally substituted alkylene, or optionally substituted haloalkylene; R$^{N1}$ is H or optionally substituted alkyl or optionally substituted aryl; Ar is an optionally substituted aromatic or optionally substituted arylene; and L1 is an integer from 1 to 3.

In some embodiments, the linking moiety is —(CH$_2$)$_{L1}$—, —O(CH$_2$)$_{L1}$—, —(CF$_2$)$_{L1}$—, —O(CF$_2$)$_{L1}$—, or —S(CF$_2$)$_{L1}$— in which L1 is an integer from 1 to 3. In other embodiments, the linking moiety is -Ak-O—Ar-Ak-O-Ak- or -Ak-O—Ar—, in which Ak is optionally substituted alkylene or optionally substituted haloalkylene, and Ar is an optionally substituted arylene. Non-limiting substituted for Ar includes —SO$_2$-Ph, in which Ph can be unsubstituted or substituted with one or more halo.

Methods of Making a Polymer

The present disclosure also encompasses methods of making a polymer. One non-limiting method can include forming an initial polymer having a reactive group (e.g., halo or another leaving group) and substituting the reactive group with an ionic moiety, thereby providing an ionic polymer. Any useful synthetic scheme can be employed to provide such ionizable or ionic moieties, such as by way of sulfonation or oxidation to introduce such ionizable/ionic moieties, catalytic polymerization with monomers having such ionizable/ionic moieties, and the like.

A further step can include exchanging a counterion present in the ionic polymer with another counterion (e.g., exchanging a halide counterion for a hydroxide counterion).

Yet other steps can include exposing the ionic polymer to a crosslinking reagent to form one or more crosslinker between a combination of polymeric units, ionizable moieties, or ionic moieties.

The initial polymer can be a homopolymer or a copolymer formed in any useful manner. In one embodiment, the method includes providing one or more polymeric units (or monomeric units), thereby forming the polymer. In particular embodiments, a Friedel-Crafts alkylation agent is employed to react between the monomeric units (e.g., same or different monomeric units). For instance, the Friedel-Crafts alkylation agent can provide a carbocation intermediate having an electron-withdrawing moiety and a reactive group, in which the carbocation center reacts with an aryl group of the monomeric unit. The resulting initial polymer can then include the electron-withdrawing moiety (e.g., $R^7$ in formula (I)) and the reactive group attached to the polymer.

—Ar2-) and leaving groups (LG, e.g., H). Also provided is a non-limiting Friedel-Crafts alkylation agent (3) in the optional presence of a strong acid (e.g., methanesulfonic acid), which can be employed to react between the monomeric units (provided by 1 and 2). For instance, the Friedel-Crafts alkylation agent can provide a carbocation intermediate having a haloalkyl or other electron-withdrawing moiety (e.g., $R^7$) and a reactive group (RG, e.g., halo) attached to the carbonyl carbon by way of a linking moiety ($L^A$). After the electrophilic addition reaction, the resulting initial polymer (4) includes the electron-withdrawing moiety (e.g., $R^7$) and the reactive group (RG) attached by way of a linking moiety $L^A$ to a carbon in proximity to the arylene groups (—Ar1- and —Ar2-).

Further reactions can include substituting the reactive group RG with an example ionizable reagent (5), thereby providing an ionic polymer (6) having an ionic moiety ($—X^{A+}$). Yet another step can include exchanging a counterion ($RG^-$) present in the ionic polymer (6) with another counterion ($A^-$) (7), thereby providing a further ionic polymer (8). As can be seen, ionic polymer (8) includes a non-limiting first structure (S1) and a non-limiting second structure (S2).

Other steps can include exposing the initial polymer (4) or the ionic polymer (6, 8) to a crosslinking reagent to form one or more crosslinker between a combination of polymeric units, ionizable moieties, or ionic moieties.

Scheme 1

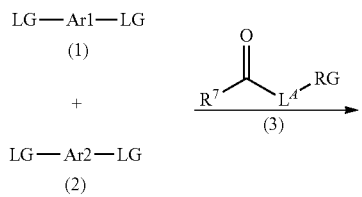

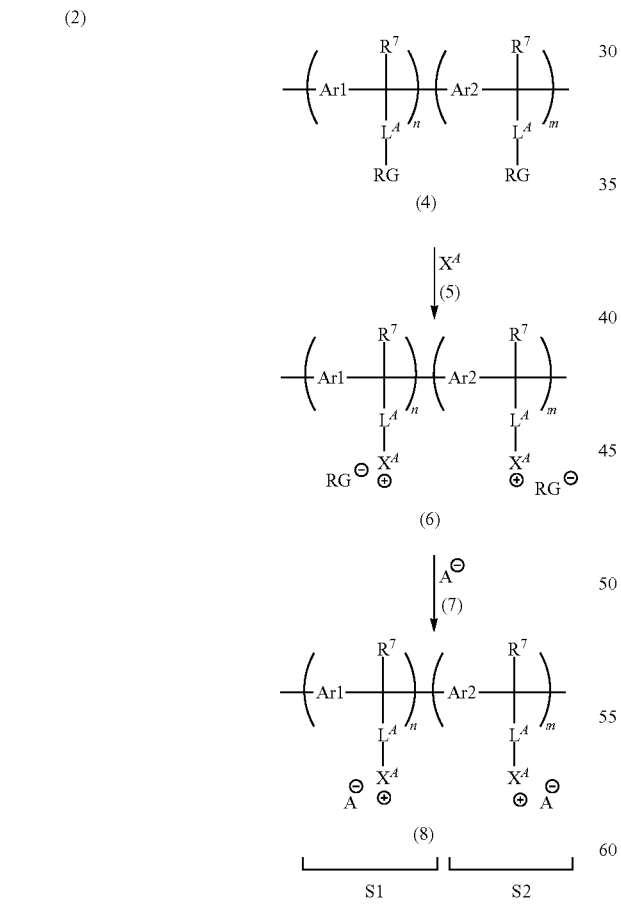

Scheme 2

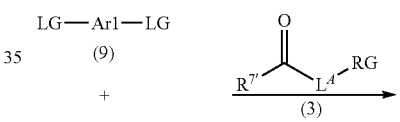

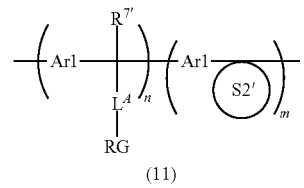

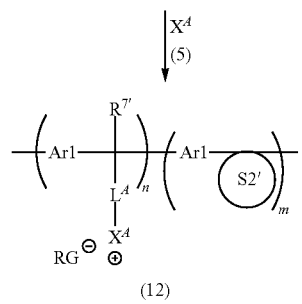

Scheme 1 provides a non-limiting reaction scheme for making a polymer. The reaction can proceed by providing a first structure agent (1) with a second structure agent (2), each having an optionally substituted arylene (—Ar1- or -continued

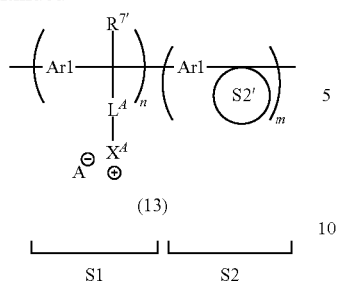

(13)

|_____|  |_____|
      S1             S2

Scheme 2 provides another non-limiting reaction scheme for making a polymer. The reaction can proceed by providing a first structure agent (9) having an optionally substituted arylene (—Ar1-) and leaving groups (LG, e.g., H) with a second structure agent (10) having a carbonyl carbon and an S2' moiety (e.g., a heterocycle or a cyclic aliphatic group). Also provided is a non-limiting Friedel-Crafts alkylation agent (3) in the optional presence of a strong acid (e.g., methanesulfonic acid), which can be employed to react between the monomeric units (provided by 9). For instance, the Friedel-Crafts alkylation agent can provide a carbocation intermediate having an electron-withdrawing moiety (e.g., $R^{7'}$) and a reactive group (RG, e.g., halo) attached to the carbonyl carbon by way of a linking moiety ($L^A$). Here, both the carbonyl carbon in (10) and (3) can provide a carbocation reactive intermediate for electrophilic addition to the aryl group Ar1 provided by agent (9). After the electrophilic addition reaction, the resulting initial polymer (11) includes the electron-withdrawing moiety (e.g., $R^{7'}$) and the reactive group (RG) attached by way of a linking moiety $L^A$ to a carbon in proximity to the arylene group (—Ar1-), as well as the S2' moiety in proximity to the arylene group (—Ar1-). In this way, a copolymer can include the same arylene moiety (—Ar—) in both the first and second structures.

Further reactions can include substituting the reactive group RG with an example ionizable reagent (5), thereby providing an ionic polymer (12) having an ionic moiety (—$X^{A+}$). Yet another step can include exchanging a counterion (RG$^-$) present in the ionic polymer (12) with another counterion ($A^-$) (7), thereby providing a further ionic polymer (13). As can be seen, ionic polymer (13) includes a non-limiting first structure (S1) and a non-limiting second structure (S2). Other steps can include exposing the initial polymer (11) or the ionic polymer (12, 13) to a crosslinking reagent to form one or more crosslinker between a combination of polymeric units, ionizable moieties, or ionic moieties.

Scheme 3

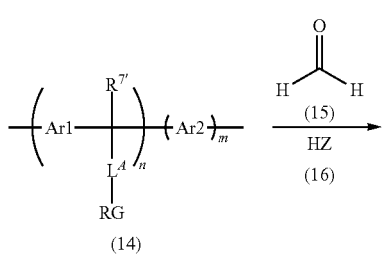

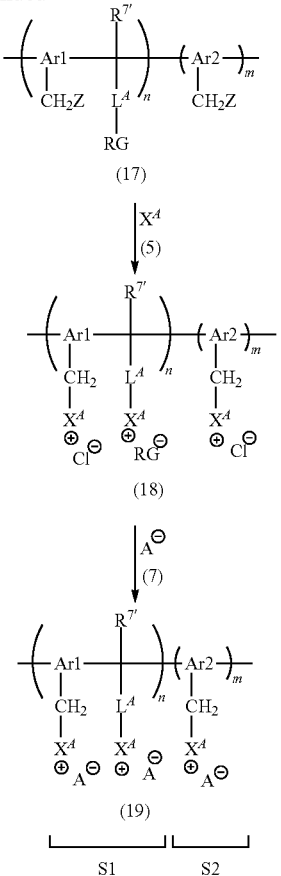

Alternatively, copolymers can be first formed and then functionalized to provide ionizable or ionic moieties. Scheme 3 provides a non-limiting reaction scheme for making a polymer. The reaction can proceed by providing an initial polymer (14) having an optionally substituted arylene (—Ar1- or —Ar2-), an electron-withdrawing moiety (e.g., $R^{7'}$), and a reactive group (RG, e.g., halo) attached to a carbon by way of a linking moiety ($L^A$). Also provided is a non-limiting alkylation agent (e.g., formaldehyde 15) in the presence of a hydrohalic acid (e.g., HZ (16), such as HCl, HBr, HI, or HF) and a catalyst (e.g., a Lewis acid, such as $ZnCl_2$ or $AlCl_3$), which can be employed to react with the aryl groups Ar1 and Ar2 (provided by 14). Here, the carbonyl carbon in (15) can provide a carbocation reactive intermediate for electrophilic addition to the aryl groups Ar1 and Ar2. After the electrophilic addition reaction and halide (Z) addition, the resulting initial polymer (17) includes a halomethyl (—$CH_2X$) group on aryl groups.

Further reactions can include substituting the halo group Z and the reactive group RG with an example ionizable reagent (5), thereby providing an ionic polymer (18) having an ionic moiety (—$X^{A+}$). Yet another step can include exchanging a counterion (RG$^-$) present in the ionic polymer (18) with another counterion ($A^-$) (7), thereby providing a further ionic polymer (19). As can be seen, ionic polymer (19) includes a non-limiting first structure (S1) and a non-limiting second structure (S2). Other steps can include exposing the initial polymer (14, 17) or the ionic polymer (18, 19) to a crosslinking reagent to form one or more crosslinker between a combination of polymeric units, ionizable moieties, or ionic moieties.

Scheme 4

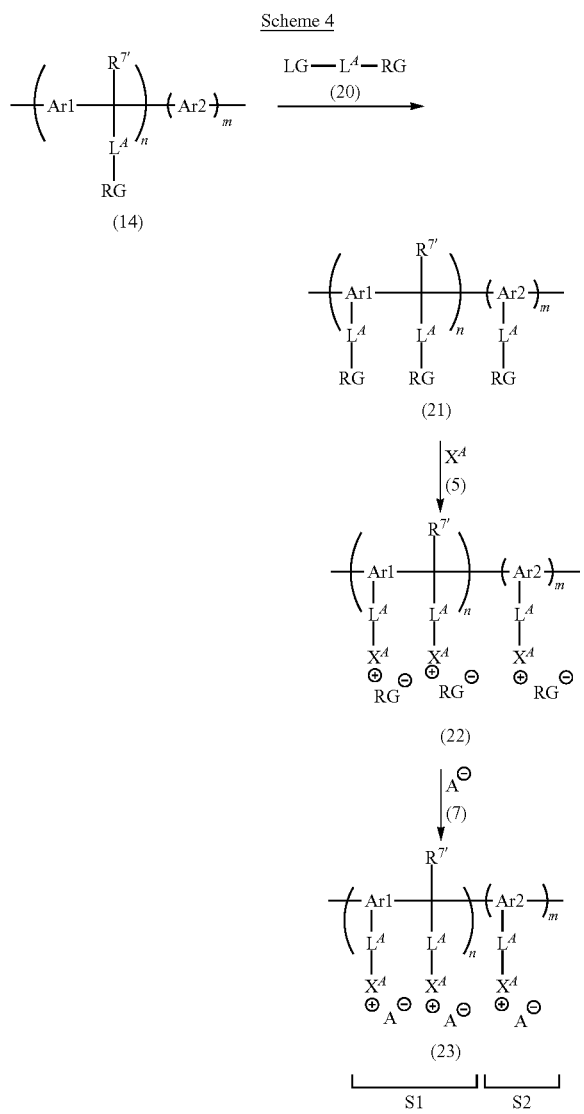

Scheme 4 provides another non-limiting reaction scheme for making a polymer. The reaction can proceed by providing an initial polymer (14) having an optionally substituted arylene (—Ar1- or —Ar2-), an electron-withdrawing moiety (e.g., $R^{7'}$), and a reactive group (RG, e.g., halo) attached to a carbon by way of a linking moiety ($L^A$). Also provided is a non-limiting Friedel-Crafts alkylation agent (20) in the optional presence of a strong acid (e.g., methanesulfonic acid), which can be employed to react with the aryl groups Ar1 and Ar2 (provided by 14). For instance, the Friedel-Crafts alkylation agent can provide a carbocation intermediate having a leaving group (LG, e.g., hydroxyl) and a reactive group (RG, e.g., halo) attached together by way of a linking moiety ($L^A$). After the electrophilic addition reaction, the resulting initial polymer (21) includes RG (e.g., halo) attached by way of linking moiety $L^A$ on aryl groups Ar1 and Ar2.

Further reactions can include substituting the reactive group RG with an example ionizable reagent (5), thereby providing an ionic polymer (22) having an ionic moiety (—$X^{A+}$). Yet another step can include exchanging a counterion ($RG^-$) present in the ionic polymer (22) with another counterion ($A^-$) (7), thereby providing a further ionic polymer (23). As can be seen, ionic polymer (23) includes a non-limiting first structure (S1) and a non-limiting second structure (S2). Other steps can include exposing the initial polymer (14, 21) or the ionic polymer (22, 23) to a cross-linking reagent to form one or more crosslinker between a combination of polymeric units, ionizable moieties, or ionic moieties.

Uses

The compositions herein can be employed to form a material, such as a film, a membrane (e.g., an ion exchange membrane), or a crosslinked polymeric matrix. The composition and material thereof can be employed within a device or apparatus, such as an electrochemical cell. In one embodiment, the electrochemical cell includes an anode, a cathode, and a polymer electrolyte membrane (PEM) disposed between the anode and the cathode. The PEM (or a component thereof) can include any composition or material described herein.

The compositions herein can be employed as a component for a membrane electrode assembly (MEA). A non-limiting MEA can include a cathode layer having a reduction catalyst and a first ion-conducting polymer, an anode layer having an oxidation catalyst and a second ion-conducting polymer, a membrane layer having a third ion-conducting polymer between the anode layer and the cathode layer, and a cathode buffer layer having a fourth ion-conducting polymer between the cathode layer and the membrane layer. The membrane layer (e.g., PEM) can provide ionic communication between the cathode layer and the anode layer or can conductively connect the cathode layer and the anode layer. The cathode buffer layer can conductively connect the cathode layer and the membrane layer. Any of the polymers in the MEA (e.g., as a first, second, third, and/or fourth ion-conducting polymer) can include a composition as described herein.

In some embodiments, the cathode buffer layer has a first porosity between about 0.01 and 95 percent by volume (e.g., wherein the first porosity is formed by the inert filler particles, such as diamond particles, boron-doped diamond particles, polyvinylidene difluoride (PVDF) particles, and polytetrafluoroethylene (PTFE) particles).

In other embodiments, at least two of the first, second, third, and fourth ion-conducting polymers are from different classes of ion-conducting polymers. There are three classes of ion-conducting polymers: anion-conductors, cation-conductors, and cation-and-anion-conductors. The ionic or ionizable moiety can be selected to provide any one of these classes.

The term, "ion-conducting polymer" is used herein to describe a polymer electrolyte having greater than approximately 1 mS/cm specific conductivity for anions and/or cations. The term, "anion-conductor" and/or "anion-conducting polymer" describes an ion-conducting polymer that conducts anions primarily (although there will still be some small amount of cation conduction) and has a transference number for anions greater than approximately 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material.

The compositions herein can be employed in a reactor. Non-limiting reactors include an electrolyzer, a carbon dioxide reduction electrolyzer, an electrochemical reactor, a gas-phase polymer-electrolyte membrane electrolyzer, but can additionally or alternatively include any other suitable reactors. The reactor may include one or more: electrodes (e.g., anode, cathode), catalysts (e.g., within and/or adjacent the cathode and/or anode), gas diffusion layers (e.g., adjacent the cathode and/or anode), and/or flow fields (e.g., defined within and/or adjacent the electrodes and/or gas diffusion layers, such as one or more channels defined opposing the cathode across the gas diffusion layer). In some embodiments, the reactor includes a membrane stack or membrane electrode assembly (MEA) having one or more polymer electrolyte membranes (PEMs), providing ionic communication between the anode and cathode of the reactor. In certain embodiments, the reactor includes a membrane stack including: a cathode layer including a reduction catalyst and an ion-conducting polymer, a PEM membrane (e.g., bipolar membrane, monopolar membrane, etc.; membrane including one or more anion conductors such as anion exchange membranes (AEMs), proton and/or cation conductors such as proton exchange membranes, and/or any other suitable ion-conducting polymers; membrane including one or more buffer layers; etc.); and an anode layer including an oxidation catalyst and an ion-conducting polymer. The ion-conducting polymers of each layer can be the same or different ion-conducting polymers. In particular embodiments, the membrane, membrane stack, membrane electrode assembly (MEA), polymer electrolyte membrane (PEM), and/or ion-conducting polymer includes a composition described herein.

In one embodiment, the carbon dioxide reduction electrolyzer includes a membrane electrode assembly (MEA). The MEA can include one or more ion-conducting polymer layers (e.g., including any composition described herein) and a cathode catalyst for facilitating chemical reduction of carbon dioxide to carbon monoxide.

In some configurations, a bipolar MEA has the following stacked arrangement; cathode layer/cathode buffer layer (an anion-conducting layer)/cation-conducting layer (with may be a PEM)/anode layer. In some implementations, the bipolar MEA has a cathode layer containing an anion-conducting polymer and/or an anode layer containing a cation-conducting layer. In some implementations, the bipolar MEA has an anode buffer layer, which may contain a cation-conducting material, between the cation-conducting layer and the anode layer. The cathode layer, cathode buffer layer, anion-conducting layer, cation-conducting layer, and/or anode layer can include any composition described herein.

In some configurations, a bipolar MEA has the following stacked arrangement: cathode layer/cation-conducting layer (with may be a PEM)/anion-conducting layer/anode layer. In some applications, a bipolar MEA having this arrangement is configured in a system for reducing a carbonate and/or bicarbonate feedstock such as an aqueous solution of carbonate and/or bicarbonate. The cathode layer, cation-conducting layer, anion-conducting layer, and/or anode layer can include any composition described herein.

In some configurations, an MEA has the following stacked arrangement: cathode layer/anion-conducting layer/bipolar interface/cation-conducting layer/anode layer. The bipolar interface can include, e.g., a cation-and-anion conducting polymer, a third polymer different from the polymers of the anion-conducting polymer layer and the cation-conducting polymer layer, a mixture of an anion-conducting polymer and a cation-conducting polymer, or a cross-linking of the cation-conducting polymer and anion-conducting polymer. The cathode layer, anion-conducting layer, bipolar interface, cation-conducting layer, and/or anode layer can include any composition described herein.

In some configurations, an MEA has the following stacked arrangement: cathode layer/anion-conducting layer/anode layer. In some implementations, this MEA has no cation-conducting layers between the cathode layer and the anode layer. In some applications, an MEA containing only anion-conducting material between the cathode and anode is configured in a system for reducing carbon monoxide feedstock. The cathode layer, anion-conducting layer, and/or anode layer can include any composition described herein.

The compositions herein can be provided in a layer (e.g., a membrane layer or others herein) having any suitable porosity (including, e.g., no porosity or a porosity between 0.01-95%, 0.1-95%, 0.01-75%, 1-95%, 1-90%, etc.). In some embodiments, the composition can provide a layer (e.g., a membrane) that is chemically and mechanically stable at a temperature of 80° C. or higher, such as 90° C. or higher, or 100° C. or higher. In other embodiments, the composition is soluble in a solvent used during fabrication of a layer (e.g., an organic solvent, such as methanol, ethanol, isopropanol, tetrahydrofuran, chloroform, toluene, or mixtures thereof). In particular embodiments, the composition, a layer thereof, or a membrane thereof is characterized by an ion exchange capacity (IEC) from about 0.2 to 3 milliequivalents/g (meq./g), such as from 0.5 to 3 meq./g, 1 to 3 meq./g, or 1.1 to 3 meq./g. In some embodiments, the composition, a layer thereof, or a membrane thereof is characterized by a water uptake (wt. %) from about 2 to 180 wt. %, such as from 10 to 180 wt. %, 20 to 180 wt. %, 50 to 180 wt. %, 10 to 90 wt. %, 20 to 90 wt. %, or 50 to 90 wt. %. In other embodiments, the composition, a layer thereof, or a membrane thereof is characterized by an ionic conductivity of more than about 10 mS/cm. In any embodiment herein, a layer, a membrane, or a film including a composition herein has a thickness from about 10 to 300 µm, such as from 20 to 300 µm, 20 to 200 µm, or 20 to 100 µm. In any embodiment herein, the composition, a layer thereof, or a membrane thereof is characterized by minimal or no light absorbance at wavelength from about 350 nm to 900 nm, about 400 nm to 800 nm, or about 400 nm to 900 nm.

A layer or a membrane can be formed in any useful manner. In one embodiments, a composition (e.g., an initial polymer or an ionic polymer) can be dissolved in a solvent (e.g., any described herein, such as an organic solvent, including methanol, ethanol, isopropanol, tetrahydrofuran, chloroform, toluene, o-dichlorobenzene, m-dichlorobenzene, p-dichlorobenzene, naphthalene, α-naphthol, or combinations thereof) to from a casting solution. The casting solution can be optionally filtered, applied to a substrate, and then dried to form a film. Application to a substrate can include doctor blade coating, solution casting, spraying, dip coating, spin coating, extrusion, melt casting, or a combination of any technique. The film can be optionally further treated, such as by immersion in any reagents herein (e.g., ionizable reagent, crosslinking reagent, counterion, solvent including water, etc., and combinations thereof).

Further uses, membranes, assemblies, and configurations are described in U.S. application Ser. No. 15/586,182, filed May 3, 2017, published as U.S. Pat. Pub. No. 2017-0321334, by Kuhl et al., entitled "Reactor with advanced architecture for the electrochemical reaction of $CO_2$, CO and other chemical compounds"; U.S. Appl. No. 63/060,583, filed Aug. 3, 2020, and International Appl. No. PCT/US2021/044378, filed Aug. 3, 2020, by Flanders et al., entitled "System and method for carbon dioxide reactor control"; and U.S. Appl. No. 62/939,960, filed Nov. 25, 2019, and International Publication No. WO 2021/108446, by Huo et al., entitled "Membrane electrode assembly for COx reduction," each of which are incorporated herein by reference in its entirety.

As a person skilled in the art will recognize from the previous detailed description and from the figures and claims, modifications and changes can be made to the disclosed embodiments of the disclosure without departing from the scope of this disclosure defined in the following claims.

The invention claimed is:

1. A composition comprising a first structure and a second structure, wherein:
(i) the first structure comprises:

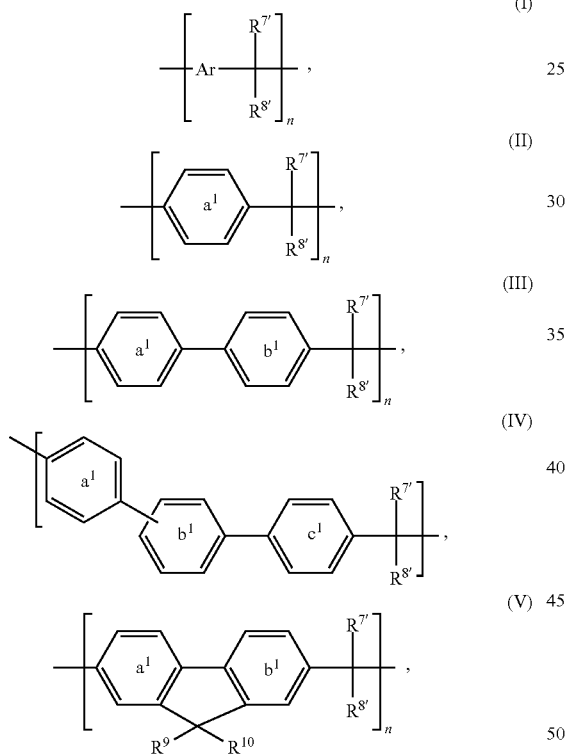

or a salt thereof, wherein:
each of $R^{7'}$ and $R^{8'}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, wherein at least one of $R^{7'}$ or $R^{8'}$ comprises the electron-withdrawing moiety or wherein $R^{7'}$ and $R^{8'}$ can be taken together to form an optionally substituted cyclic group;
each of $R^{9'}$ and $R^{10'}$ is, independently, H, optionally substituted aliphatic, optionally substituted alkyl, optionally substituted heteroaliphatic, optionally substituted heteroalkyl, optionally substituted aromatic, optionally substituted aryl, or optionally substituted arylalkylene, or wherein $R^{9'}$ and $R^{10'}$ can be taken together to form an optionally substituted cyclic group;
Ar comprises or is an optionally substituted aromatic or optionally substituted arylene;
n is an integer of 1 or more; and
each of ring $a^1$, ring $b^1$, and/or ring $c^1$ can be optionally substituted;
wherein one or more of ring $a^1$, ring $b^1$, ring $c^1$, $R^{7'}$, $R^{8'}$, $R^{9'}$, and $R^{10'}$ comprises an ionizable moiety or an ionic moiety; and
(ii) the second structure comprises:

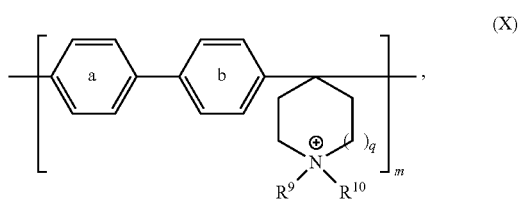

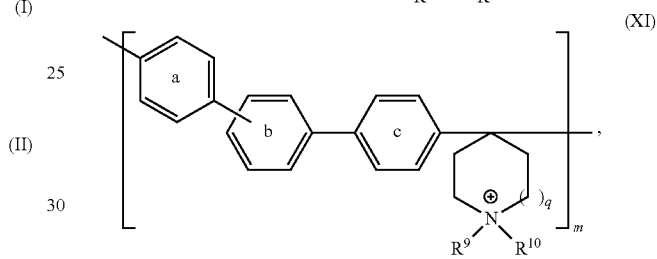

or a salt thereof, wherein:
each of $R^9$ and $R^{10}$ is, independently, an electron-withdrawing moiety, H, optionally substituted aliphatic, optionally substituted alkyl, optionally substituted heteroaliphatic, optionally substituted heteroalkyl, optionally substituted aromatic, optionally substituted aryl, optionally substituted aryloxy, or optionally substituted arylalkylene, wherein $R^9$ and $R^{10}$ can be taken together to form an optionally substituted cyclic group;
m is an integer of 1 or more;
q is 0, 1, 2, or more;
each of rings a, b, and c is optionally substituted; and
wherein one or more of rings a, b, and c and $R^9$ and $R^{10}$ optionally comprises an ionizable moiety or an ionic moiety.

2. The composition of claim 1, wherein the electron-withdrawing moiety of at least one of the first structure and the second structure is an optionally substituted haloalkyl, cyano, phosphate, sulfate, sulfonic acid, sulfonyl, difluoroboranyl, borono, thiocyanato, or piperidinium.

3. The composition of claim 1, wherein $R^{7'}$ is the electron-withdrawing moiety and $R^{8'}$ comprises the ionizable moiety or the ionic moiety.

4. The composition of claim 1, wherein the second structure comprises the ionizable moiety or h ionic moiety.

5. The composition of claim 4, wherein at least one of rings a, b, and c comprises h ionizable moiety or h ionic moiety.

6. The composition of claim 1, wherein the ionizable moiety or the ionic moiety of at least one of the first structure and the second structure comprises $-L^A-X^A$ or $-L^A-(L^{A'}-X^A)_{L2}$ or $-L^A-(X^A-L^{A'}-X^{A'})_{L2}$ or $-L^A-X^A-L^{A'}-X^{A'}$ or $-L^A-X^A-L^{A'}-X^{A'}-L^{A''}-X^{A''}$ wherein:

each $L^A$, $L^{A'}$, and $L^{A''}$ is a linking moiety;

each $X^A$, $X^{A'}$, and $X^{A''}$ comprises, independently, an acidic moiety, a basic moiety, or a multi-ionic moiety; and L2 is an integer of 1 or more.

7. The composition of claim 6, wherein each $L^A$, $L^{A'}$, and $L^{A''}$ comprises, independently, an optionally substituted alkylene, optionally substituted alkyleneoxy, optionally substituted heteroalkylene, optionally substituted arylene, and/or optionally substituted aryleneoxy.

8. The composition of claim 6, wherein each $X^A$, $X^{A'}$, and $X^{A''}$ comprises, independently, sulfo, sulfonate anion, sulfonium cation, carboxy, carboxylate anion, phosphono, phosphonate anion, phosphonium cation, phosphazenium cation, amino, ammonium cation, heterocyclic cation, piperidinium cation, azepanium cation, or a salt form thereof.

9. The composition of claim 1, wherein the optionally substituted arylene of the first structure, the optionally substituted ring $a^1$, ring $b^1$, and/or ring $c^1$ of the first structure, or the optionally substituted ring a, b, and/or c of the second structure is substituted with one or more substituents, and wherein each substituent of the one or more substituents is selected from the group consisting of alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl.

10. The composition of claim 1, wherein the composition comprises a polymer or a copolymer.

11. The composition of claim 1, wherein the composition comprises a film, a membrane, or a cross-linked polymeric matrix.

12. An electrochemical cell comprising:
an anode;
a cathode; and
a polymer electrolyte membrane disposed between the anode and the cathode, wherein the polymer electrolyte membrane comprises a composition of claim 1.

13. The composition of claim 1, wherein $R^{8'}$ in the first structure comprises the ionizable moiety or the ionic moiety.

14. The composition of claim 1, wherein the first structure comprises Formula (III), Formula (IV), or a salt thereof.

15. The composition of claim 1, wherein the ionizable moiety or the ionic moiety of at least one of the first structure and the second structure comprises an ammonium moiety.

16. The composition of claim 1, wherein ring a, ring b, ring c, $R^9$, or $R^{10}$ of the second structure comprises the ionizable moiety or the ionic moiety.

17. The composition of claim 1, wherein at least one of $R^9$ and $R^{10}$ of the second structure is an optionally substituted aliphatic or an optionally substituted heteroaliphatic.

18. The composition of claim 1, wherein at least one of $R^9$ and $R^{10}$ of the second structure is an optionally substituted alkyl or an optionally substituted heteroalkyl.

19. The composition of claim 1, wherein the ionizable moiety or the ionic moiety of at least one of the first structure and the second structure comprises, independently, sulfo, sulfonate anion, sulfonium cation, carboxy, carboxylate anion, phosphono, phosphonate anion, phosphonium cation, phosphazenium cation, amino, ammonium cation, heterocyclic cation, piperidinium cation, azepanium cation, or a salt form thereof.

20. The composition of claim 1, wherein the ionizable moiety or the ionic moiety of at least one of the first structure and the second structure comprises a piperidinium moiety.

21. The composition of claim 1, wherein the ionizable moiety or the ionic moiety of at least one of the first structure and the second structure comprises an azepanium moiety.

* * * * *

UNITED STATES PATENT AND TRADEMARK OFFICE
CERTIFICATE OF CORRECTION

| | | |
|---|---|---|
| PATENT NO. | : 12,421,392 B2 | Page 1 of 1 |
| APPLICATION NO. | : 17/451628 | |
| DATED | : September 23, 2025 | |
| INVENTOR(S) | : Lihui Wang et al. | |

It is certified that error appears in the above-identified patent and that said Letters Patent is hereby corrected as shown below:

On the Title Page

Item (72), Line 1, change the city of inventor, Lihui Wang, from "Berkeley" to -- Alameda --.

Signed and Sealed this
Eighteenth Day of November, 2025

John A. Squires
*Director of the United States Patent and Trademark Office*